(12) United States Patent
Suzuki et al.

(10) Patent No.: US 6,757,422 B1
(45) Date of Patent: Jun. 29, 2004

(54) VIEWPOINT POSITION DETECTION APPARATUS AND METHOD, AND STEREOSCOPIC IMAGE DISPLAY SYSTEM

(75) Inventors: Masahiro Suzuki, Tokyo (JP);
Hiroyuki Yamamoto, Chigasaki (JP);
Tomoshi Takikawa, Yokohama (JP);
Hideki Morishima, Kawasaki (JP);
Naosato Taniguchi, Urawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/395,365

(22) Filed: Sep. 14, 1999

(30) Foreign Application Priority Data

Nov. 12, 1998 (JP) ............................................. 10-322139
Mar. 25, 1999 (JP) .......................................... 11-082455

(51) Int. Cl.[7] ................................................. G06K 9/00
(52) U.S. Cl. ........................ 382/154; 382/103; 348/42
(58) Field of Search ................................ 382/103, 117, 382/154; 348/51, 53, 42; 359/462, 466

(56) References Cited

U.S. PATENT DOCUMENTS

| | | | |
|---|---|---|---|
| 5,016,282 A | 5/1991 | Tomono et al. | ............. 382/117 |
| 5,218,387 A | 6/1993 | Ueno et al. | ................. 351/210 |
| 5,231,674 A | 7/1993 | Cleveland et al. | .......... 382/117 |

(List continued on next page.)

FOREIGN PATENT DOCUMENTS

| | | |
|---|---|---|
| JP | 2-50145 | 2/1990 |
| JP | 7-288732 | 10/1995 |
| JP | 8-287216 | 11/1996 |
| JP | 9-224185 | 8/1997 |
| JP | 09-311294 | 12/1997 |
| JP | 10-078563 | 3/1998 |
| JP | 10-232367 | 9/1998 |
| JP | 10-232626 | 9/1998 |
| JP | 10-271536 | 10/1998 |
| JP | 10-510686 | 10/1998 |

OTHER PUBLICATIONS

"The Design of an Optical System Extracting Pupil Image for Eye Movement Detection", Tomono, Journal of the Institute of Electronics, Information and Communication Engineers D–II, J74–D–II, No. 6, pp. 736–747, Jun., 1991.
"Real–Time Facial Expression Recognition Based on the 2–Dimensional DCT", Sakaguchi, et al., Journal of the Institute of Electronics, Information and Communication Engineers D–II, vol. J80–D–II, No. 6, pp. 1547–1554, Jun., 1997.

*Primary Examiner*—Amelia M. Au
*Assistant Examiner*—Colin LaRose
(74) *Attorney, Agent, or Firm*—Fitzpatrick, Cella, Harper & Scinto

(57) ABSTRACT

This invention has as its object to provide a viewpoint detection apparatus and method, which can assure high-speed processing, high precision, and high tracking performance with a simple arrangement while suppressing adverse influences on the human body, and a stereoscopic image display apparatus using the same. The viewpoint position detection apparatus of this invention has an image sensing unit (1) and a viewpoint detection unit (2). The image sensing unit has a visible image sensing section (11) and infrared image sensing section (12). A pupil position detection processing section (24) detects the pupil position from an infrared image, and a template generation section (23) generates templates for a visible image using the pupil position obtained from the infrared image. A pattern matching discrimination section (22) executes pattern matching of a visible image. The infrared ray irradiation time upon capturing an infrared image can be minimized, and the load on processes can be reduced since pupil position information detected from the infrared image is used upon generating templates. An image display unit (3) as a stereoscopic image display apparatus is connected to the viewpoint position detection apparatus, and viewpoint position information is supplied to the image display unit, thus constructing a stereoscopic image display system having a broad stereovision range for the observer.

30 Claims, 52 Drawing Sheets

U.S. PATENT DOCUMENTS

| | | | |
|---|---|---|---|
| 5,293,427 A | 3/1994 | Ueno et al. | 382/103 |
| 5,748,776 A * | 5/1998 | Yoshida | 382/118 |
| 5,912,980 A * | 6/1999 | Hunke | 382/103 |
| 5,936,774 A | 8/1999 | Street | 359/630 |
| 5,949,390 A | 9/1999 | Nomura et al. | 345/32 |
| 6,075,557 A * | 6/2000 | Holliman et al. | 348/51 |
| 6,157,424 A | 12/2000 | Eichenlaub | 349/74 |
| 6,163,336 A * | 12/2000 | Richards | 348/42 |
| 6,394,557 B2 * | 5/2002 | Bradski | 382/103 |

* cited by examiner

REFLECTED IMAGE
(INFRARED IMAGE)

F I G. 21
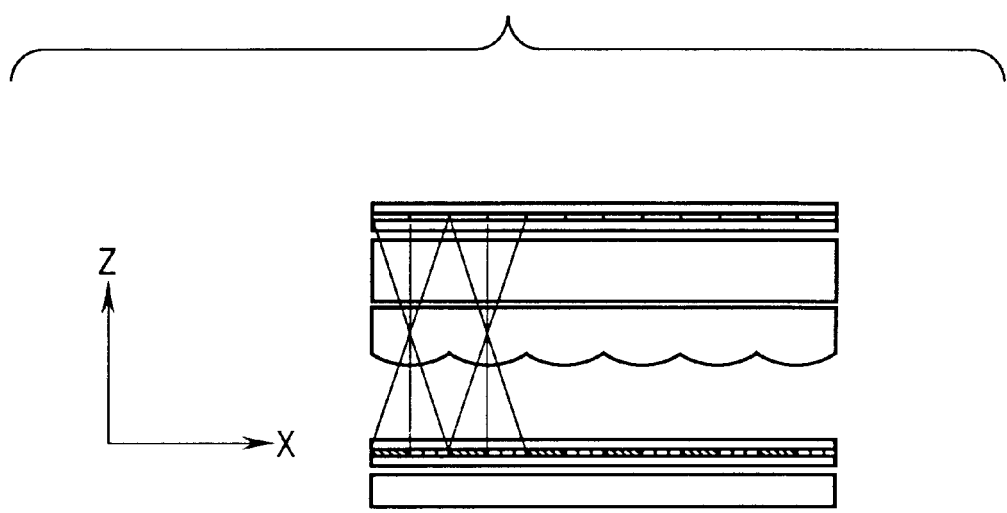

FIG. 25
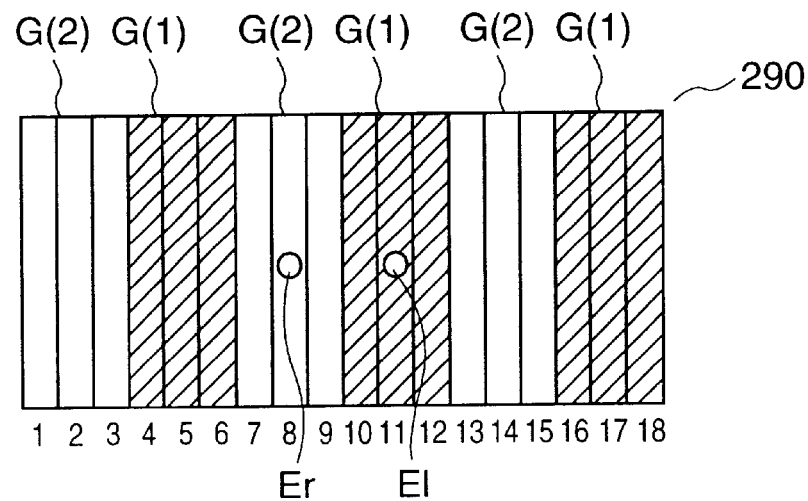
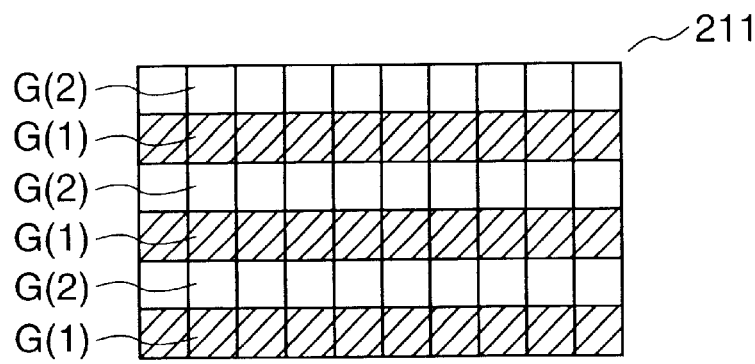
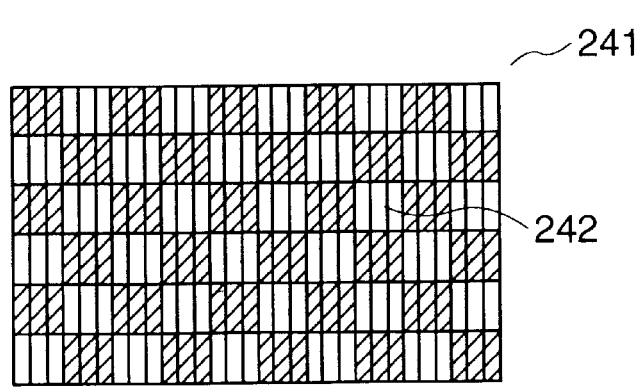

FIG. 26
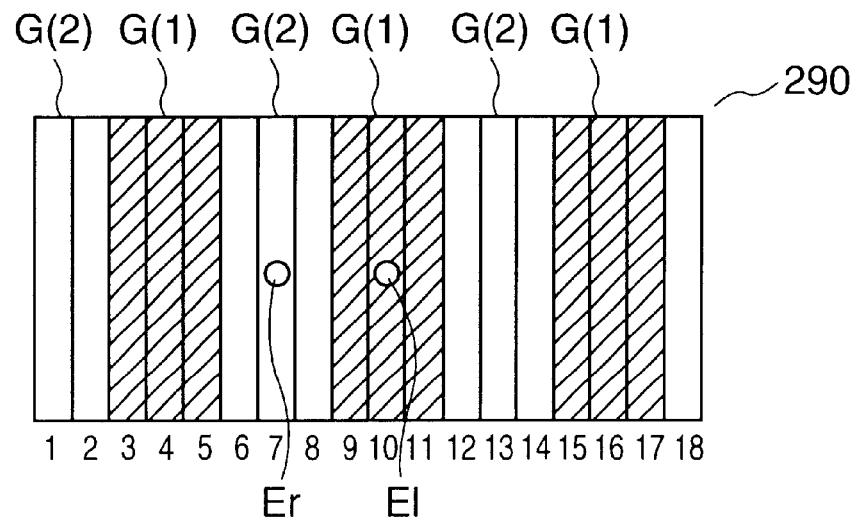
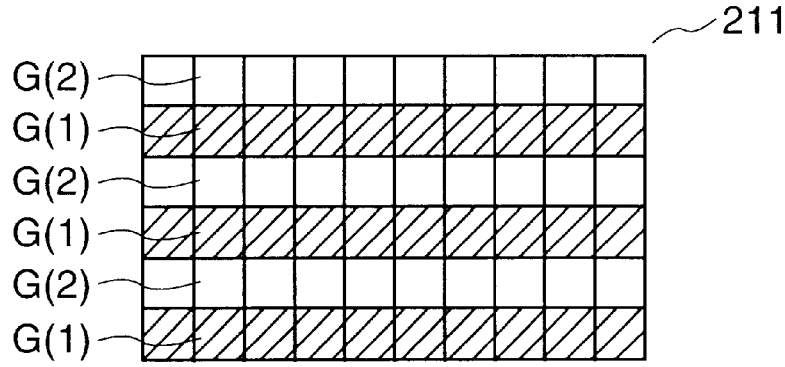
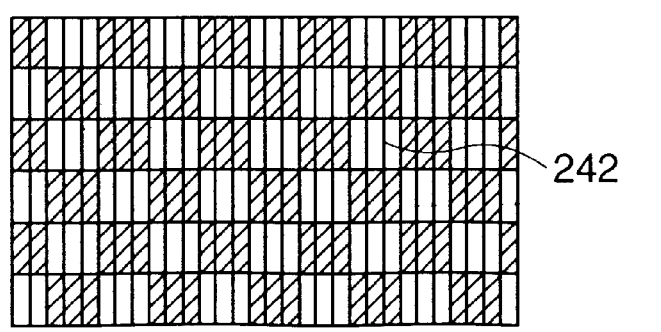

FIG. 27
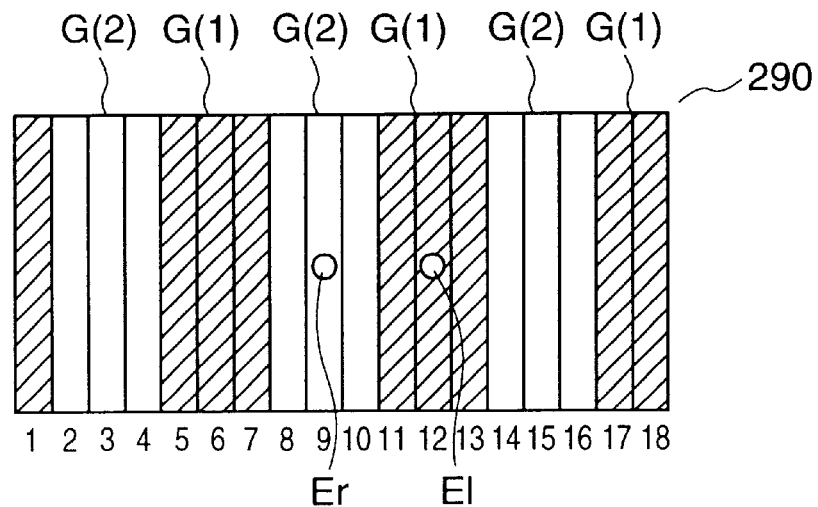
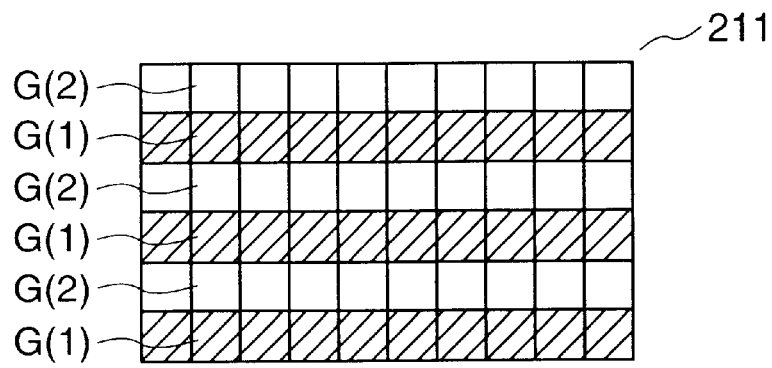
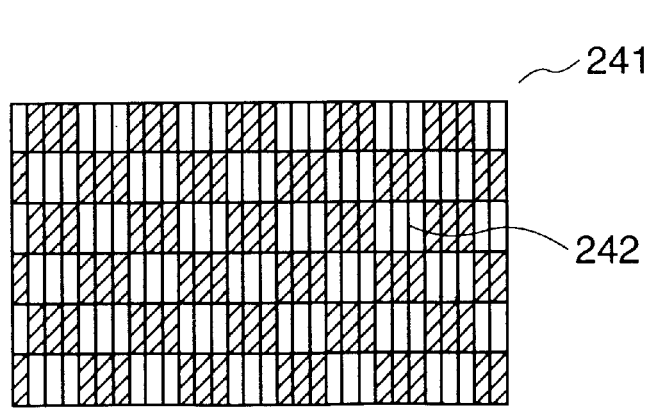

FIG. 28
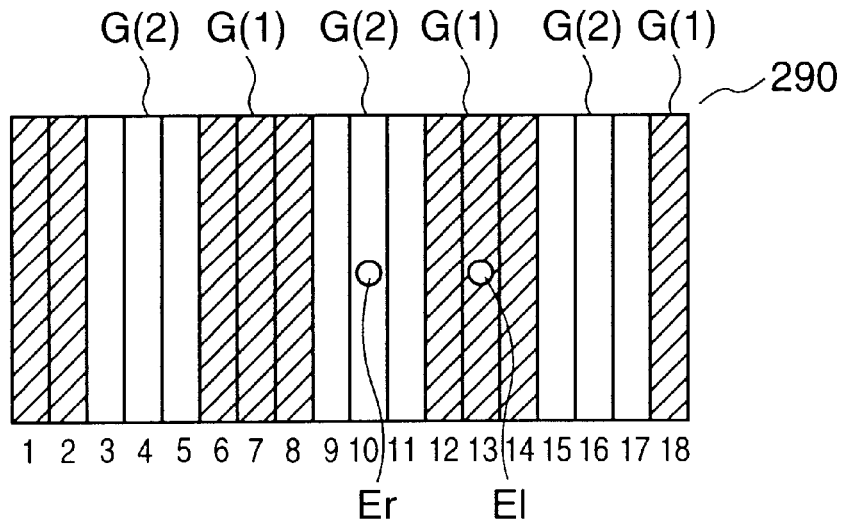
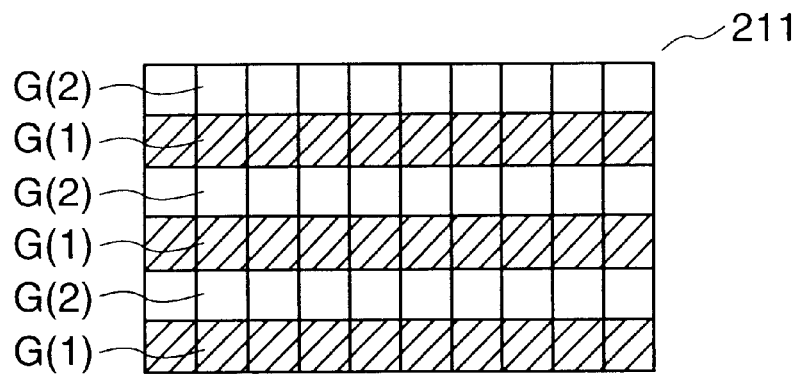
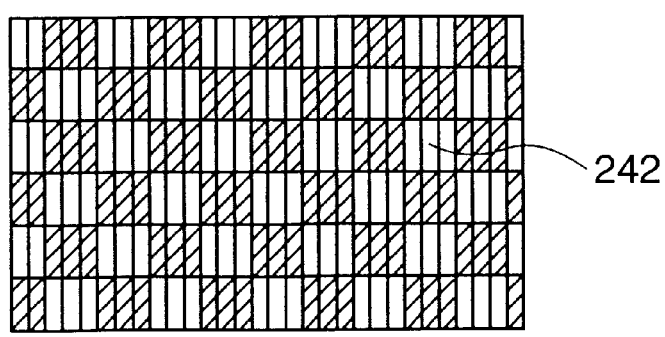

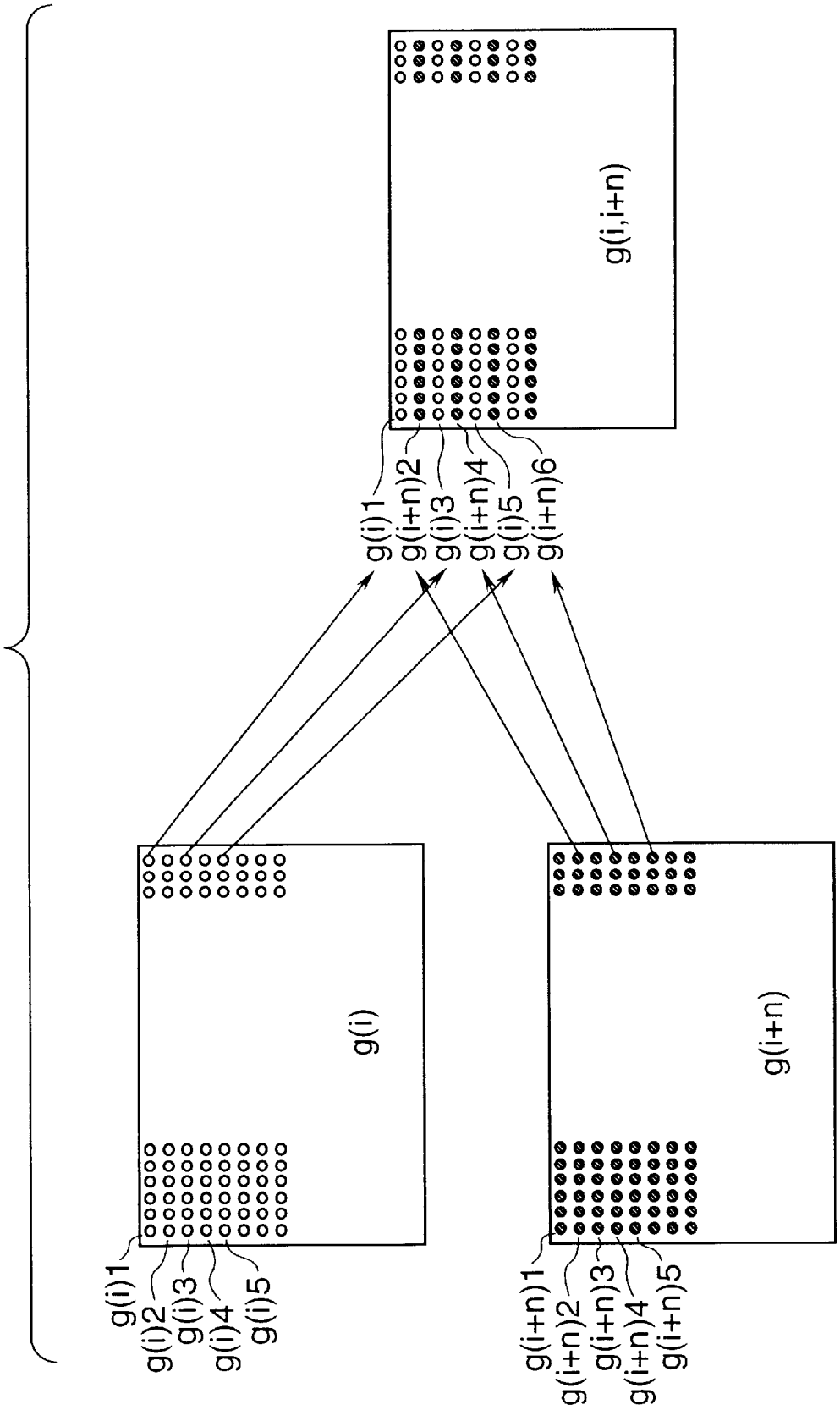

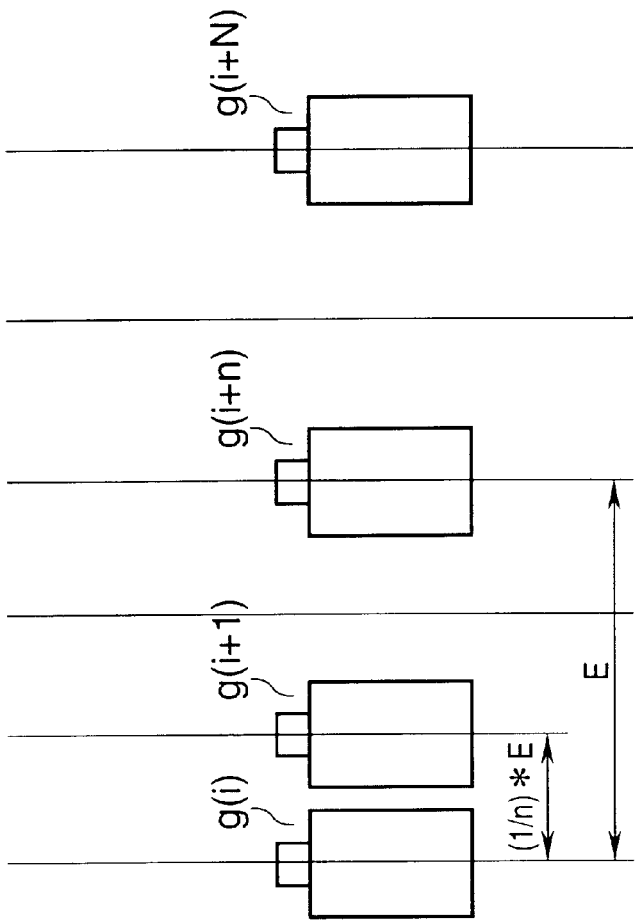
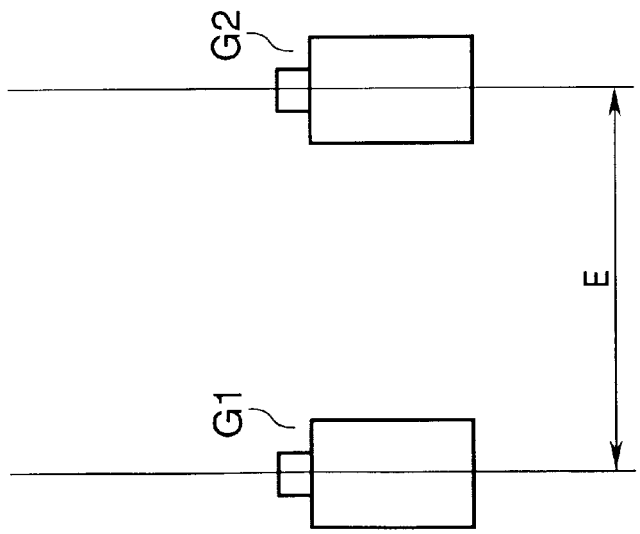

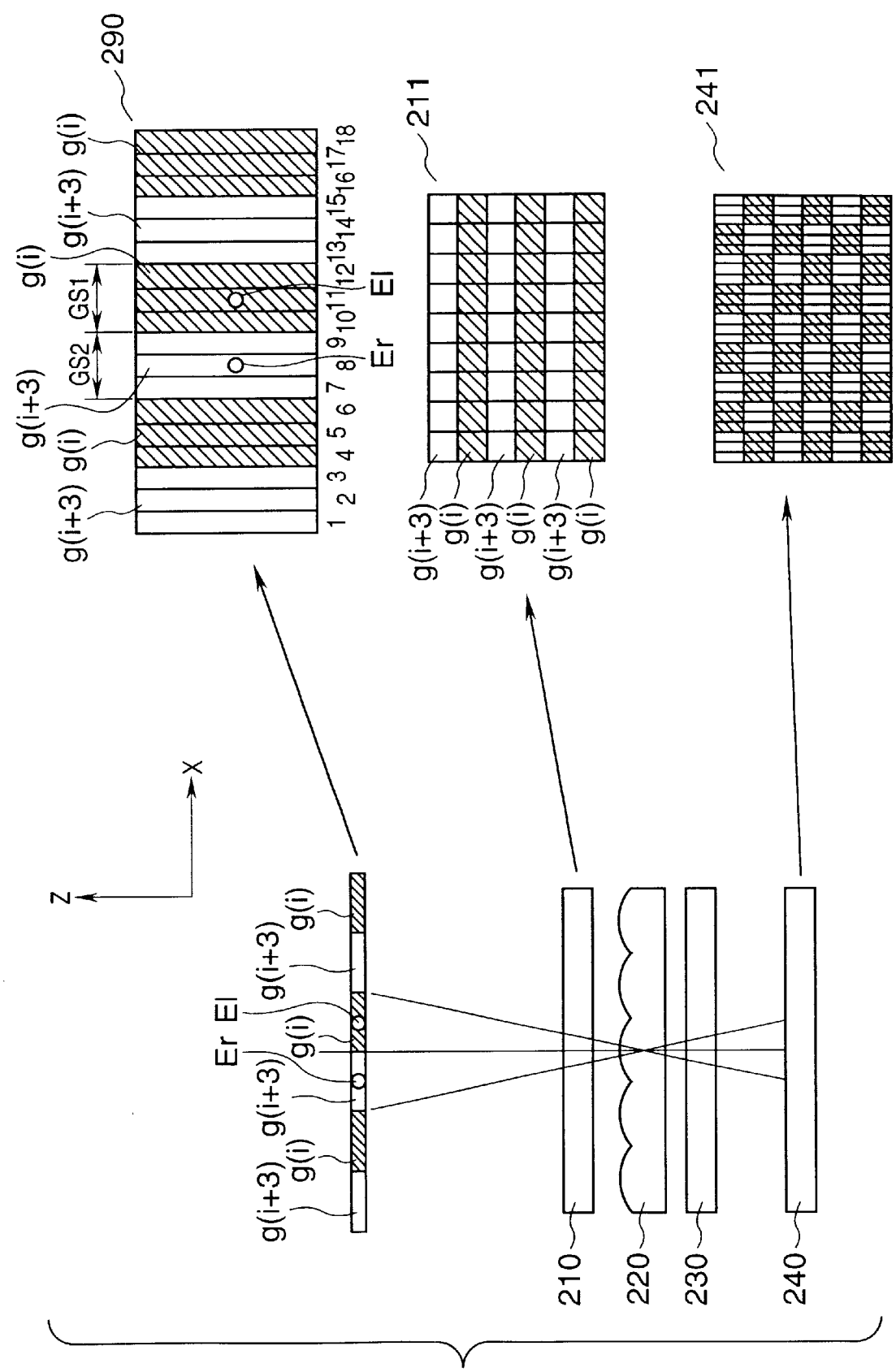

FIG. 39
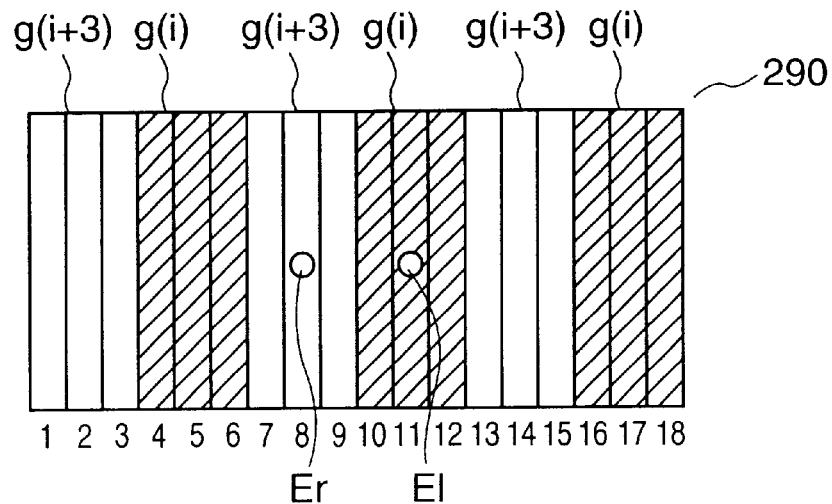
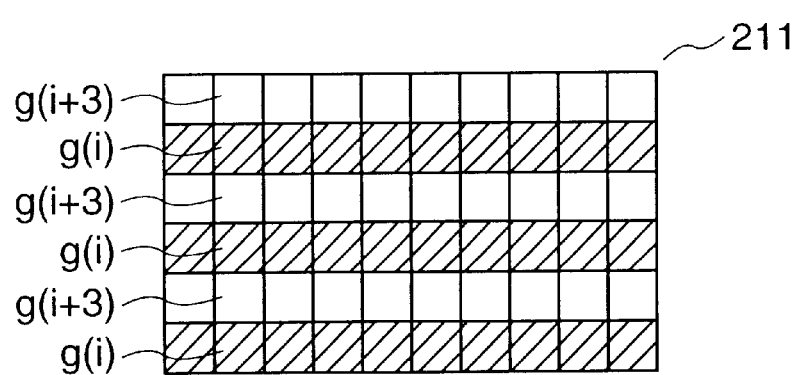
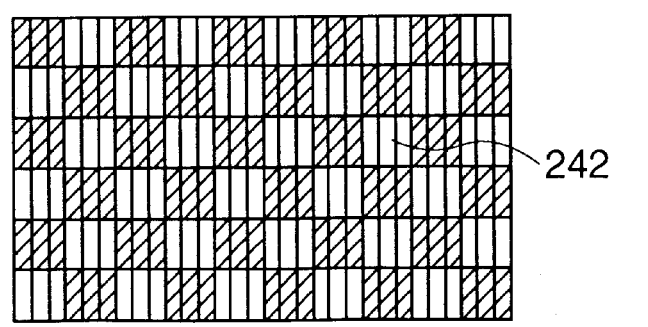

FIG. 40
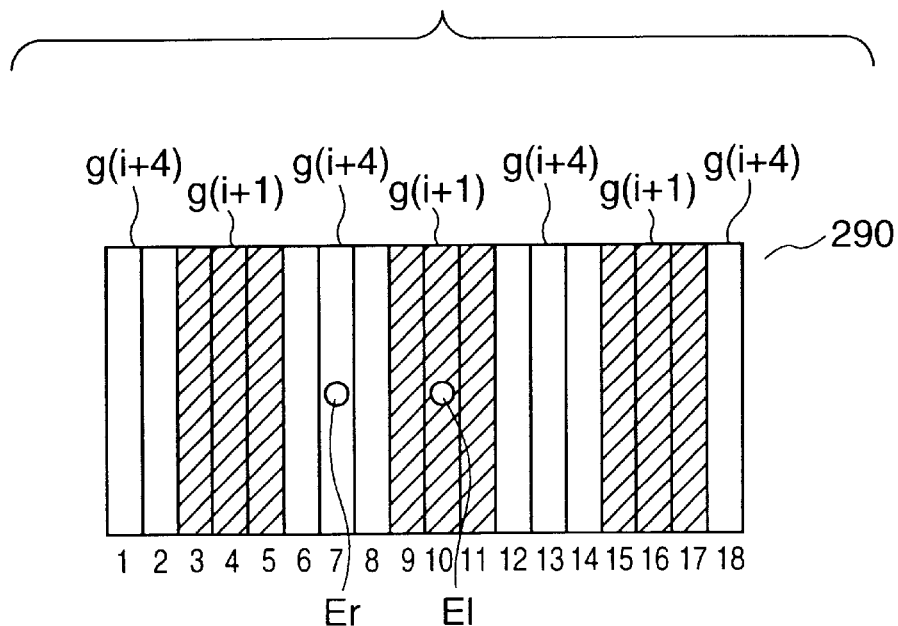
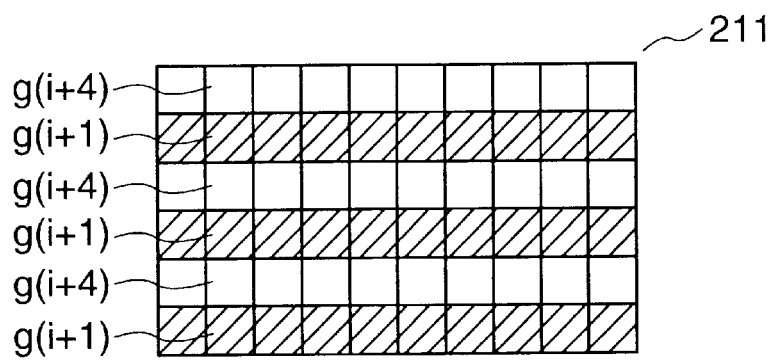
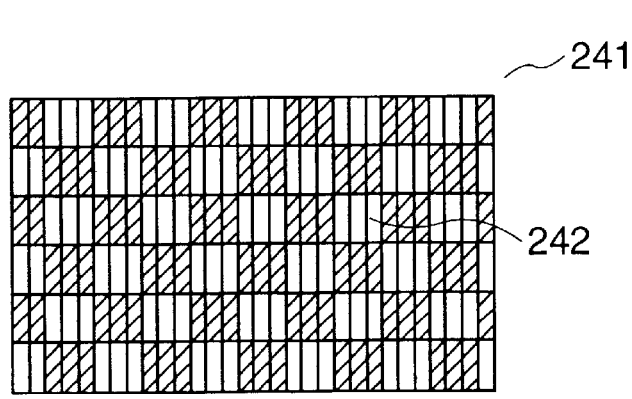

FIG. 41
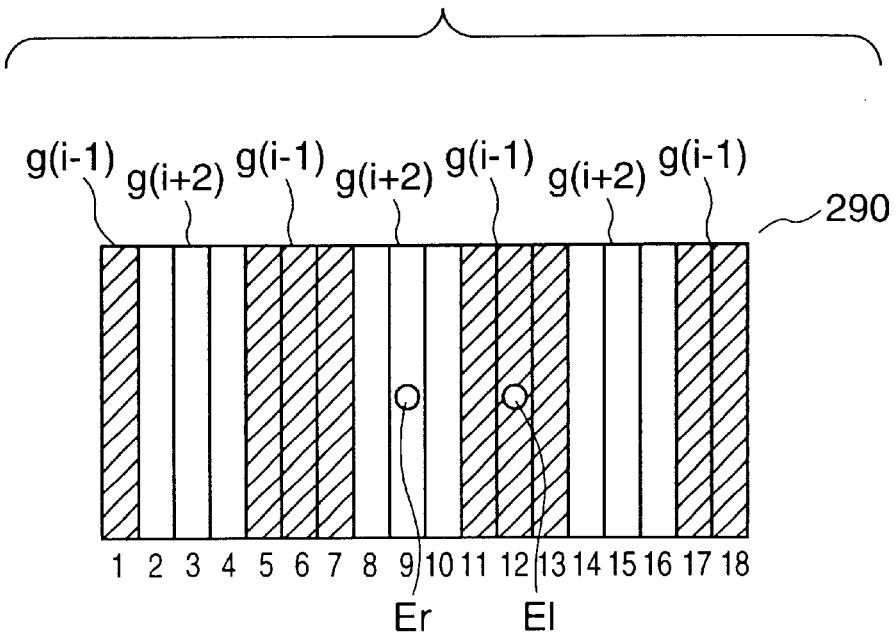
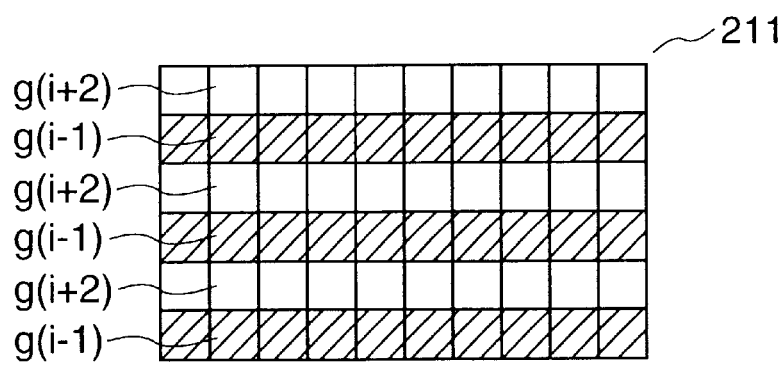
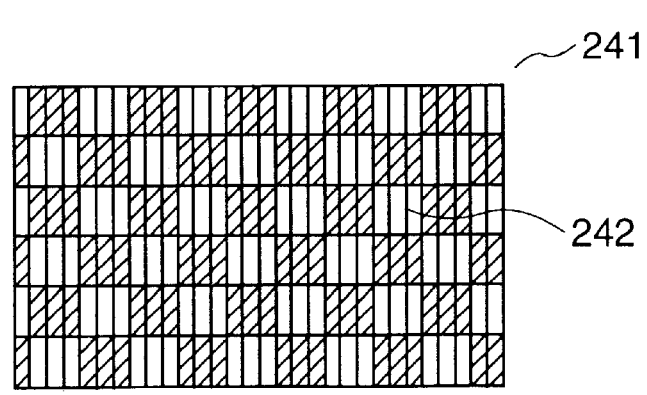

FIG. 42
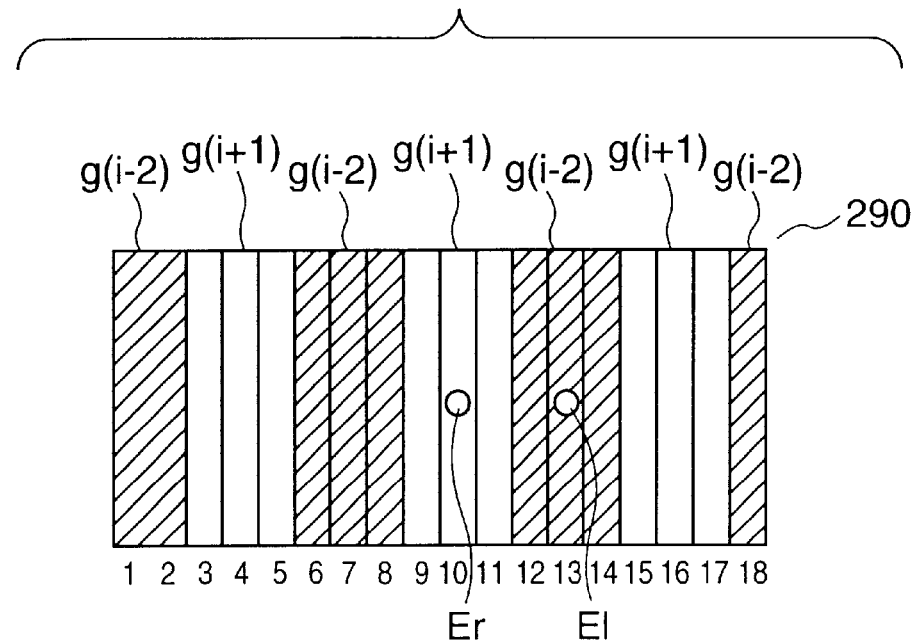
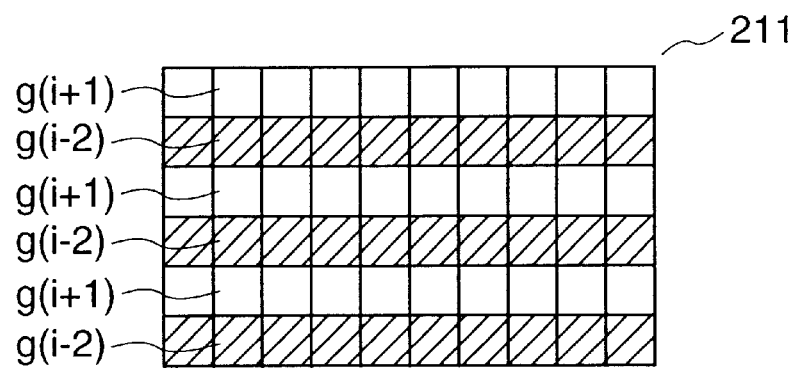
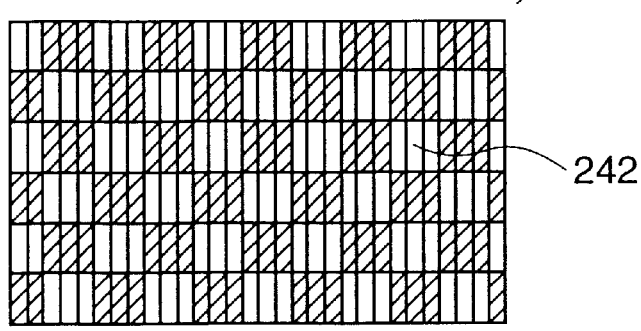

FIG. 50
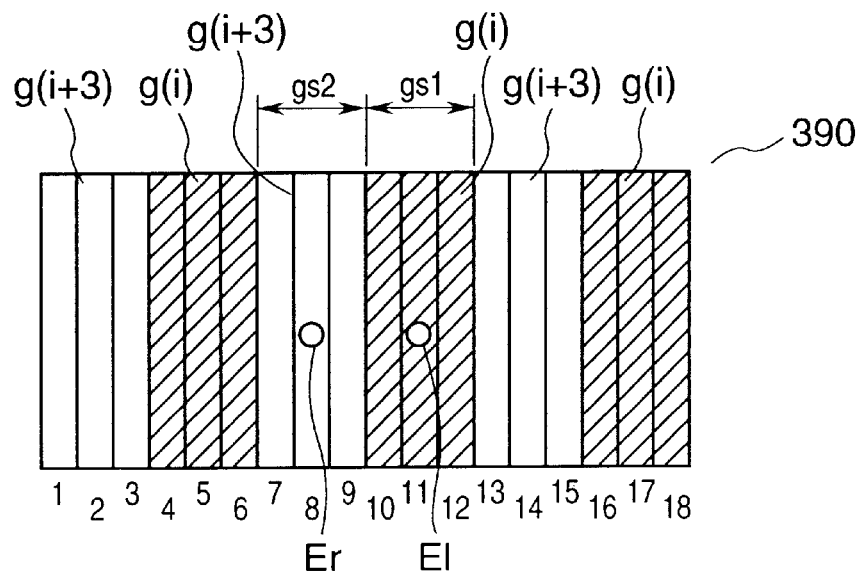
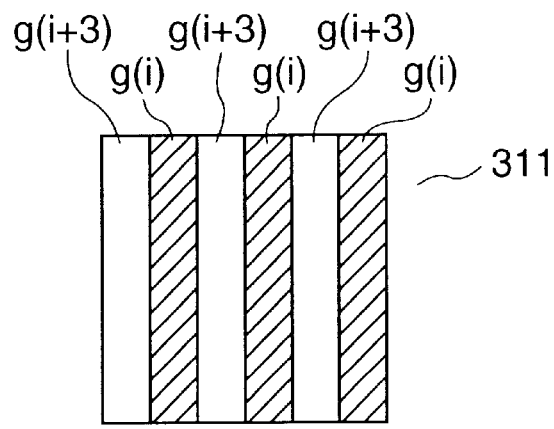
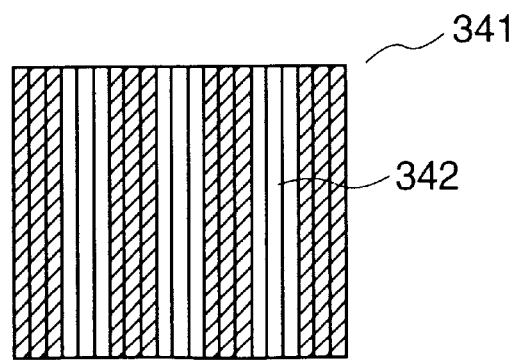

FIG. 51
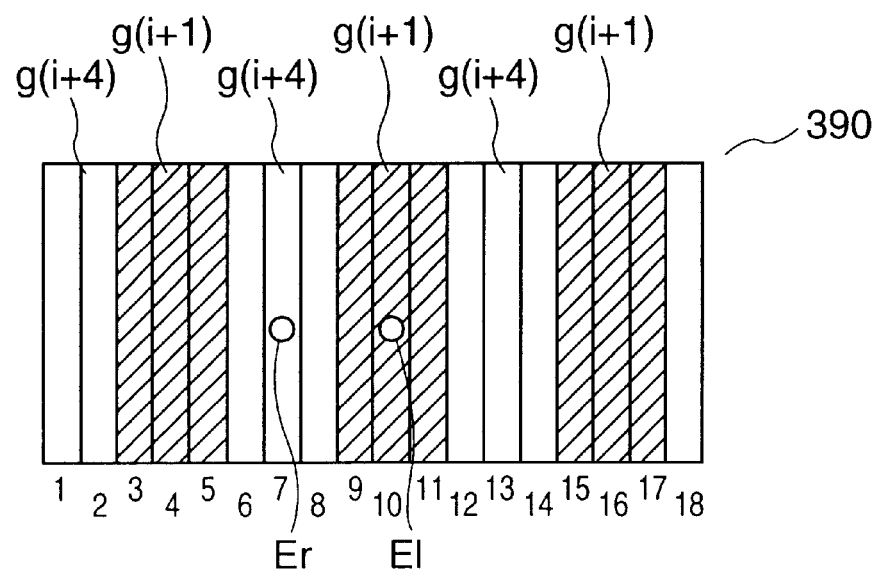
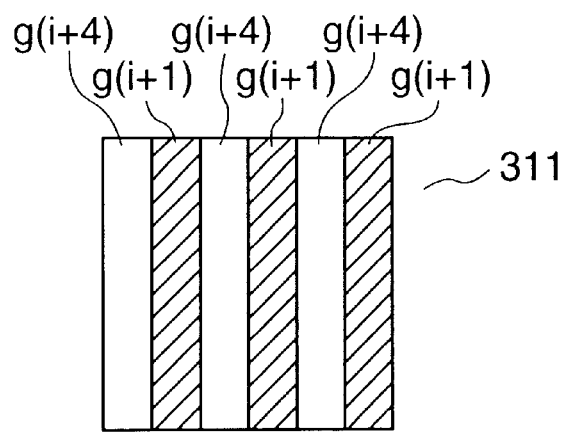
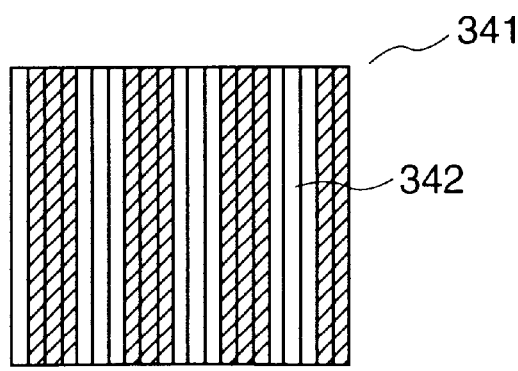

FIG. 52
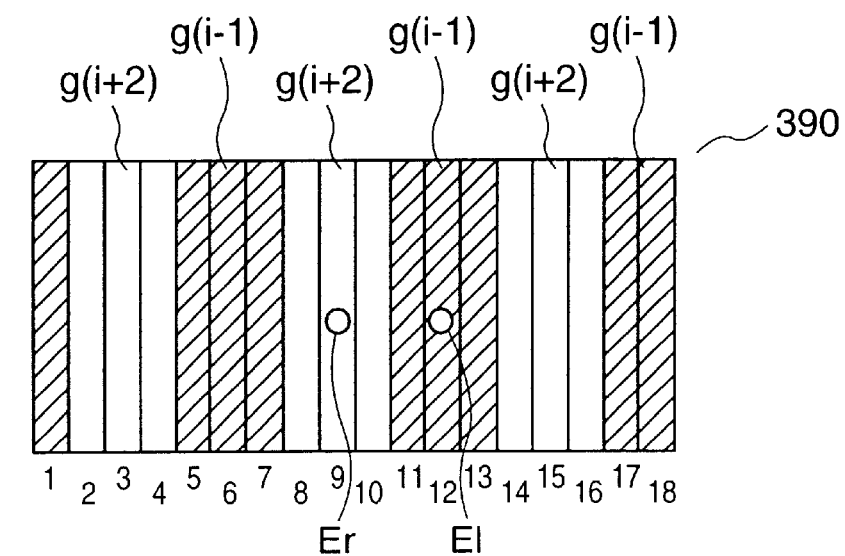
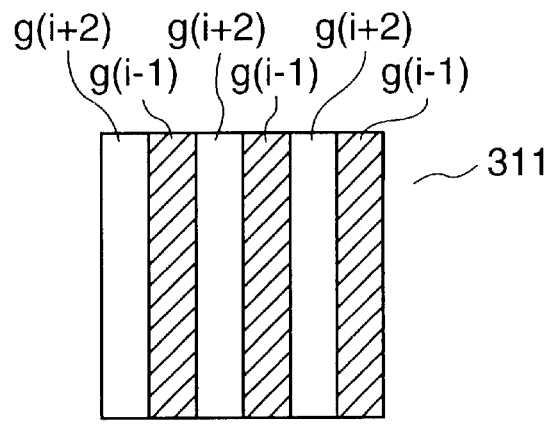
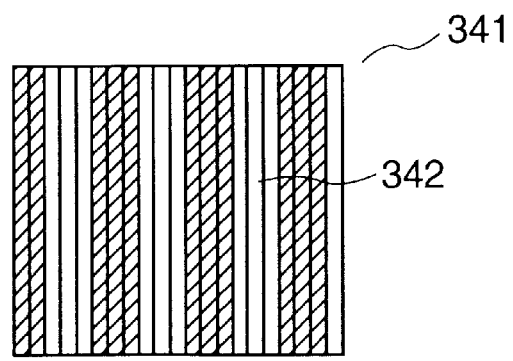

FIG. 53
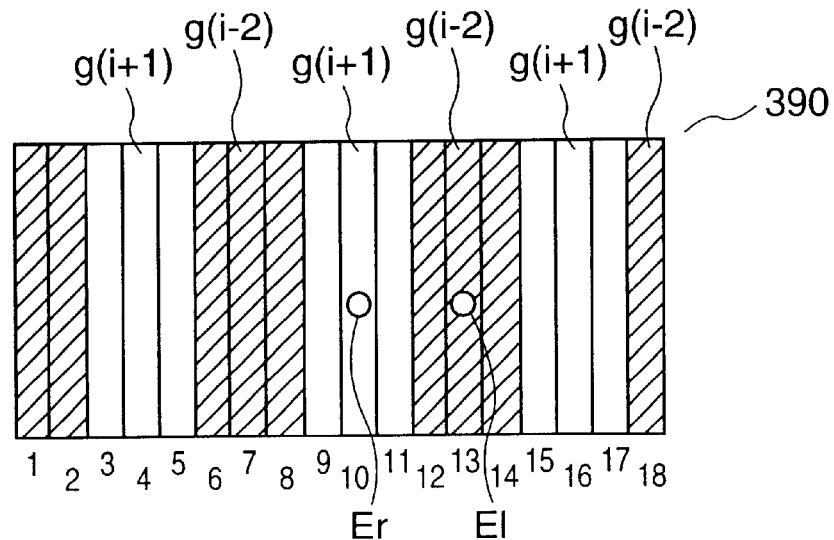
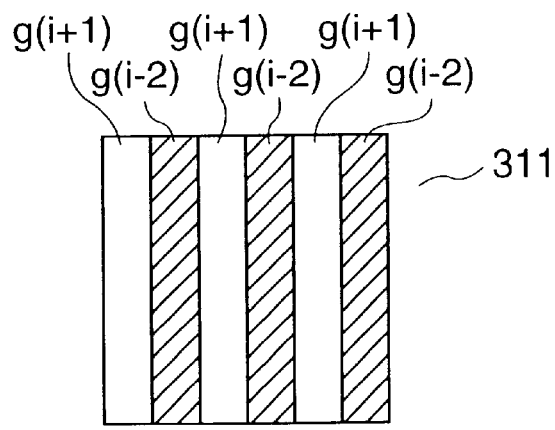
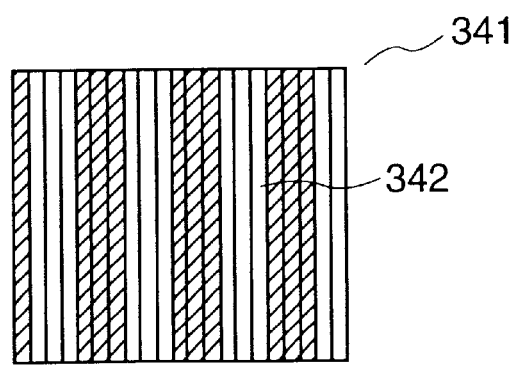

VIEWPOINT POSITION DETECTION APPARATUS AND METHOD, AND STEREOSCOPIC IMAGE DISPLAY SYSTEM

BACKGROUND OF THE INVENTION

The present invention relates to a viewpoint position detection apparatus and method for detecting the viewpoint position of a person to be measured and, more particularly, to a viewpoint position detection apparatus and method which can achieve both high-speed processing and high detection precision.

The present invention also relates to a stereoscopic image display apparatus and, more particularly, to an apparatus suitably used when image information is stereoscopically displayed on a display device (display) such as a television, video, computer monitor, game machine, or the like, and can be satisfactorily stereoscopically observed without using special spectacles.

As conventional stereoscopic image observation methods, a method of observing disparity images based on different polarized light states by the right and left eyes using polarized light spectacles, a method of guiding predetermined ones of a plurality of disparity images to the eyeballs of the observer using a lenticular lens, and the like have been proposed.

For example, Japanese Patent Laid-Open No. 09-311294 discloses an apparatus using a rear cross lenticular scheme. FIG. 11 is a perspective view showing principal part of an example of a stereoscopic image display apparatus using the rear cross lenticular scheme. Referring to FIG. 11, reference numeral 6 denotes a display device for displaying an image. The display device 6 comprises, e.g., a liquid crystal element (LCD). In FIG. 11, a polarization plate, color filter, electrodes, black matrix, anti-reflection film, and the like are not shown.

Reference numeral 10 denotes a backlight (surface illuminant) which serves as an illumination light source. A mask substrate (mask) 7 on which a mask pattern having checkered apertures 8 is placed between the display device 6 and backlight 10. The mask pattern is prepared by patterning a metal deposition film such as chromium, light absorbing material, or the like on the mask substrate 7 formed of glass or a resin. The backlight 10, mask substrate 7, and the like are building components of the light source.

First and second lenticular lenses 3 and 4 made of a transparent resin or glass are interposed between the mask substrate 7 and display device 6. The first lenticular lens 3 is a vertical cylindrical lens array constructed by lining up vertical cylindrical lenses, which are elongated in the vertical direction, in the right-and left direction, and the second lenticular lens 4 is a horizontal cylindrical lens array constructed by lining up horizontal cylindrical lenses, which are elongated in the horizontal direction, in the up-and-down direction.

An image to be displayed on the display device 6 is a horizontal stripe image, which is formed by segmenting right and left disparity images R and L into a large number of horizontal stripe pixels R and L in the up-and-down direction, and alternately arranging these pixels from the top of the screen in the order of, e.g., L, R, L, R, L, R, . . . , as shown in FIG. 11.

Light coming from the backlight 10 is transmitted through the apertures 8 of the mask substrate 7 and illuminates the display device 6, and right and left stripe pixels R and L are separately observed by the right and left eyes of the observer.

More specifically, the mask substrate 7 is illuminated with light coming from the backlight 10, and light components emerge from the apertures 8. The first lenticular lens 3 is placed on the observer side of the mask substrate 7, and the lens curvature is designed to locate the mask substrate 7 at nearly the focal point positions of the respective cylindrical lenses. In this section, since the second lenticular lens 4 has no optical effect, a light beam emerging from one point on the aperture 8 is converted into a nearly collimated light in this section.

A pair of aperture and light-shielding portion of the mask pattern are set to nearly correspond to one pitch of the first lenticular lens 3.

By determining the pitch of the first lenticular lens and that of the pair of aperture and light-shielding portion of the mask pattern on the basis of the relationship between the optical distance from a predetermined position of the observer to the first lenticular lens 3 and that from the first lenticular lens 3 to the mask pattern, light leaving the apertures 8 can be uniformly focused on the right or left eye across the total width of the screen. In this manner, the right and left stripe pixels on the display device 6 are separately observed by the right and left eye regions in the horizontal direction.

The second lenticular lens 4 focuses all light beams emerging from the respective points on the apertures 8 of the mask 7 onto the right- or left-eye stripe pixels on the display device 6. The light beams which illuminate and are transmitted through the display device 6 diverge only in the vertical direction in correspondence with NA upon focusing so as to provide an observation region where right and left stripe pixels can be uniformly separately observed from a predetermined eye level of the observer over the total height of the screen.

However, as the field angle of such stereoscopic image display apparatus is narrow, when the viewpoint of the observer falls outside the field angle, stereoscopic display cannot be recognized. For this reason, a technique for broadening the stereoscopic view region by detecting the viewpoint position of the observer and controlling image display in response to movement of the viewpoint position has been proposed. For example, Japanese Patent Laid-Open No. 10-232367 discloses a technique for broadening the stereoscopic view region by moving a mask pattern or lenticular lens parallel to the display surface.

FIG. 12 shows a stereoscopic image display apparatus disclosed in Japanese Patent Laid-Open No. 10-232367. The same reference numerals in FIG. 12 denote the same building components as those in FIG. 11, and a detailed description thereof will be omitted. Since the stereoscopic image display apparatus shown in FIG. 12 uses a single lenticular lens, it does not have the second lenticular lens 4 shown in FIG. 11.

In the stereoscopic image display apparatus with this arrangement, control according to the movement of an observer 54 is done as follows. A position sensor 51 detects any horizontal deviation of the observer 54 from a predetermined reference position, and sends that information to a control unit 52. The control unit 52 outputs an image control signal to a display drive circuit 50 in accordance with this deviation information. The display drive circuit 50 displays a first or second horizontal stripe image on the display 6. At the same time, the control unit 52 generates an actuator drive signal based on the deviation information to drive an actuator 53, which moves the mask pattern 7 in the horizontal direction, thereby moving the mask pattern 7 to the best position where the observer 54 can separate right and left stripe images. As a result, even when the viewpoint position of the observer 54 has changed, a broad stereovision range can be assured.

When display is controlled in accordance with the viewpoint position of the observer, low detection precision and long processing time for detection disturb image display suitable for the viewpoint position of the observer. For this reason, it is very important for the performance of the display apparatus to detect the viewpoint position of the observer with higher precision within a shorter period of time.

As methods for detecting the viewpoint position of the observer (person to be measured), the following methods are available:

1) Method of irradiating observer with infrared light, and detecting light reflected by retina (Reference 1-a) Banno, "Design Method of Pupil Photographing Optical System for Viewpoint Detection", Journal of The Institute of Electronics, Information and Communication Engineers D-II, Vol. J74-D-II, No. 6, pp. 736–747, June, 1991

(Reference 1-b) U.S. Pat. No. 5,016,282

2) Method of detecting eye of observer by image processing of visible image (e.g., Sakaguchi et al., "Real-time Face Expression Recognition Using Two-dimensional Discrete Cosine Transform of Image", Journal of The Institute of Electronics, Information and Communication Engineers D-II, Vol. J80-D-II, No. 6, pp. 1547–1554, June, 1997)

3) Method of detecting eye of observer by image processing using infrared image and visible image (e.g., Japanese Patent Laid-Open No. 8-287216)

Method 1) exploits the fact that the pupil of a human being recursively reflects near infrared light (returns light in a direction agreeing with the incoming direction). Light reflected by the pupil is obtained as a sharp reflection peak, and normally exhibits higher reflectance than, e.g., a face. Hence, by sensing an image of the observer using an infrared image sensing apparatus in which a light source is coaxial with the optical axis, only the pupil portion image can be sensed to have higher luminance. When the sensed image is binarized by an appropriate threshold value, an accurate viewpoint position can be detected from the extracted pupil position.

In method 2), the observer position within the image sensing range is limited in advance, and the observer is made to blink in that state, thereby extracting the eye region based on inter-frame images of that visible image, and detect eyes using pattern matching with templates generated by said extracted eye region.

In method 3), an infrared image and visible color image are sensed at the same time, and after face regions are extracted from these images, a feature region such as an eye is detected using, e.g., pattern matching. The infrared image is used to extract a person candidate region and to determine a temperature threshold value, which is used upon extracting a flesh tone region from the color image.

However, in method 1), since the observer must be continuously irradiated with relatively intense infrared light, there is a fear of adverse influences of infrared light on the observer. Also, since light reflected by the retina is used, detection is disabled if the observer blinks. Furthermore, when the observer wears spectacles, operation errors readily occur due to light reflected by the spectacles.

In addition, in the method of irradiating the object with infrared light, the intensity of infrared light must be adjusted in accordance with the observation distance, resulting in a complicated mechanism.

Furthermore, owing to dilation/constriction of the pupil depending on the ambient illuminance, and the direction of the line of sight of the person to be measured, the pupil reflected image is hard to track.

In method 2), since the observer is required to adjust his or her observation position and to blink, such method is cumbersome for the observer. Also, in order to prepare templates, the time for adjusting the observation position and making the observer blink is required, resulting in an unpractical method.

Furthermore, in method 3), the irradiation intensity of infrared light can be lower than that in method 1). However, after the intermediate processing result of an infrared image is obtained, a visible image is processed using that processing result, the face region is detected using the processing results of the infrared and visible images and, finally, pattern matching must be done, thus requiring very complicated processes. Also, it is not easy to prepare templates used in pattern matching.

Since face parts positions required for preparing pattern matching templates are detected from the visible image alone, positional precision is not so high.

In addition, as described in, e.g., Japanese Patent Laid-Open No. 2-50145, a method of estimating the viewpoint position of the observer by detecting infrared light reflected by the observer or the temperature of the observer using a plurality of infrared receivers, a method of detecting the position of the observer by placing a light source behind the observer, and measuring the lightness distribution using a light receiver placed in front of the observer, a method of sensing an image of the observer using a TV camera, and detecting the viewpoint by processing the sensed image by an image processing technique, and the like have been proposed. However, none of these methods are satisfactory in terms of processing speed and detection precision.

It is, therefore, an object of the present invention to provide a viewpoint position detection apparatus and method, which can assure high-speed process, high precision, and high tracking performance by a simple arrangement while suppressing the fear of adverse influences on the human body.

It is another object of the present invention to provide a stereoscopic display system having a stereoscopic image display apparatus which controls display using viewpoint position information obtained using the viewpoint position detection apparatus or method of the present invention.

It is still another object of the present invention to provide a stereoscopic image display apparatus which always allows the observer to enjoy normal stereoscopic observation over a broad observation range using a detection mechanism for detecting the viewpoint position with high precision, even when the observer has moved and his or her viewpoint position has changed while he or she is observing a stereoscopic image displayed on a display.

It is still another object of the present invention to provide a stereoscopic image display apparatus which always allows the observer to enjoy normal stereoscopic observation without switching to reversed stereo (pseudostereoscopic image display) and to observe a stereoscopic image in accordance with his or her viewpoint position, when disparity images to be displayed simultaneously consist of two disparity images corresponding to the right and left eyes, and even when the observer has moved and his or her viewpoint position has changed.

It is still another object of the present invention to provide a stereoscopic image display apparatus which can improve user's convenience by displaying a warning message when the observer is located outside the observation range of a stereoscopic image displayed on a display, and allowing a video camera for detecting the viewpoint position as a TV meeting camera or monitor camera.

SUMMARY OF THE INVENTION

More specifically, the gist of the present invention lies in a viewpoint position detection apparatus for detecting a viewpoint position of a person to be measured, and outputting viewpoint position information, characterized by comprising infrared image capturing means for capturing an infrared image of the person to be measured, visible image capturing means for capturing a visible image of the person to be measured, detection means for detecting a pupil position of the person to be measured from the infrared image captured by the infrared image capturing means, template generation means for generating a template for pattern matching using the pupil position from the visible image captured by the visible image capturing means, and matching means for detecting a viewpoint position of the person to be measured by pattern matching with the visible image captured by the visible image capturing means using the template generated by the template generation means, and outputting a result as the viewpoint position information.

Another gist of the present invention lies in a viewpoint position detection apparatus for detecting a viewpoint position of a person to be measured, and outputting viewpoint position information, characterized by comprising infrared image capturing means for capturing an infrared image of the person to be measured, visible image capturing means for capturing a visible image of the person to be measured, detection means for detecting a pupil position of the person to be measured from the infrared image captured by the infrared image capturing means, template generation means for generating a template for pattern matching using the pupil position from the visible image captured by the visible image capturing means, matching means for detecting a viewpoint position of the person to be measured by pattern matching with the visible image captured by the visible image capturing means using the template generated by the template generation means, and outputting a detection result as the viewpoint position information, and control means for controlling to generate the template again using the detection means and the template generation means when a predetermined condition is satisfied.

Still another gist of the present invention lies in a stereoscopic image display system, which has the viewpoint position detection apparatus according to the present invention, and a stereoscopic image display apparatus connected to the viewpoint position detection apparatus, characterized by controlling the stereoscopic image display apparatus using viewpoint position information received from the viewpoint position detection apparatus.

Still another gist of the present invention lies in a viewpoint position detection method for detecting a viewpoint position of a person to be measured, and outputting viewpoint position information, characterized by comprising the infrared image capturing step of capturing an infrared image of the person to be measured, the visible image capturing step of capturing a visible image of the person to be measured, the detection step of detecting a pupil position of the person to be measured from the infrared image captured in the infrared image capturing step, the template generation step of generating a template for pattern matching using the pupil position from the visible image captured in the visible image capturing step, and the matching step of detecting a viewpoint position of the person to be measured by pattern matching with the visible image captured in the visible image capturing step using the template generated in the template generation step, and outputting a result as the viewpoint position information.

Still another gist of the present invention lies in a viewpoint position detection method for detecting a viewpoint position of a person to be measured, and outputting viewpoint position information, characterized by comprising the infrared image capturing step of capturing an infrared image of the person to be measured, the visible image capturing step of capturing a visible image of the person to be measured, the detection step of detecting a pupil position of the person to be measured from the infrared image captured in the infrared image capturing step, the template generation step of generating a template for pattern matching using the pupil position from the visible image captured in the visible image capturing step, the matching step of detecting a viewpoint position of the person to be measured by pattern matching with the visible image captured in the visible image capturing step using the template generated in the template generation step, and outputting a detection result as the viewpoint position information, and the control step of controlling to generate the template again using the detection step and the template generation step when a predetermined condition is satisfied, and repeating the visible image capturing step and the matching step in other cases.

Still another gist of the present invention lies in a computer readable storage medium which stores the viewpoint position detection method according to the present invention as a program that can be executed by a computer.

A stereoscopic image display apparatus according to the present invention has the following characteristic features:

(1-1) In a stereoscopic image display apparatus which stereoscopically observes disparity images using a viewpoint detection apparatus for detecting a viewpoint of an observer, and a display device for displaying disparity images corresponding to right and left eyes of the observer while controlling the images to track viewpoint information, the viewpoint detection apparatus is characterized by having:

image sensing means for capturing an image of an observer as video information;

video processing means having a function of detecting a face region from the video information of the observer captured by the image sensing means, and detecting two eyes of the observer from the face region, and a function of tracking the detected two eyes; and camera control means for enlarging or reducing the face region detected by the video processing means.

Especially, the stereoscopic image display apparatus has the following characteristic features:

(1-1-1) the image sensing means has a video camera, and the camera control means has a mechanism for panning/tilting the video camera;

(1-1-2) the apparatus further comprises signal switching means for externally outputting a video signal from the image sensing means and a zoom/pan/tilt control signal from the camera control means;

(1-1-3) the video processing means identifies predetermined color information from the captured video information of the observer;

(1-1-4) the predetermined color information is a face tone of the observer or a standard flesh tone;

(1-1-5) when the video processing means identifies the predetermined color information, and when a region corresponding to the color is not detected from the captured video information, a focal length of the video camera is controlled to a short focal length side, and when the region is detected, the focal length of the video camera is controlled to a predetermined focal length;

(1-1-6) the apparatus further comprises alarm means for generating an alarm to the observer when the video processing means identifies the predetermined color information, and when a region corresponding to the color is not detected from the captured video information;

(1-1-7) the video processing means identifies a predetermined pattern region from the captured video information of the observer;

(1-1-8) the predetermined pattern is an eye of the observer, a standard eye, a vicinity of an eye, or a partial image that forms an eye such as an iris or the like;

(1-1-9) the apparatus further comprises video processing means for generating the predetermined color or pattern from face image information of the observer, and video recording means for recording the generated information;

(1-1-10) the apparatus further comprises switching means for displaying face image information of the observer captured by the video camera on a display unit;

(1-1-11) the apparatus further comprises operation means for allowing the observer to manually set the face image of the observer displayed on the display unit at a predetermined position and a size on a display screen;

(1-1-12) the video processing means tracks a specific pattern by pattern recognition; and (1-1-13) the specific pattern is an eye of the observer, a standard eye, a vicinity of an eye, or a partial image that forms an eye such as an iris or the like, and the apparatus further comprises alarm means for generating an alarm when a spacing between two eyes (captured from the video camera) is other than a prescribed value upon tracking the two eyes.

(1-2) A stereoscopic image display apparatus having a display device which includes an optical modulator having a discrete pixel structure, a mask pattern formed on a display surface of the optical modulator by aligning a plurality of transmitting and intercepting portions at a predetermined pitch in horizontal and vertical directions, light source means for irradiating the optical modulator with light, a display which has a discrete pixel structure and displays a synthesized disparity image using scanning lines, and which irradiates disparity images displayed on the display with a light beam patterned by the mask pattern, guides light beams based on the disparity images to right and left eyes of an observer, and allows the observer to stereoscopically observe image information displayed on the display, and a viewpoint detection apparatus for detecting viewpoint information of the observer, is characterized in that the synthesized disparity image is formed by two original disparity images corresponding to the right and left eyes, and a pattern shape of the mask pattern and original disparity images that form the synthesized disparity image are switched and displayed on the basis of the viewpoint information from the viewpoint detection apparatus.

Especially, the stereoscopic image display apparatus has the following characteristic features:

(1-2-1) the two original disparity images that form the synthesized disparity image are images observed from a viewpoint corresponding to a distance between eyes; and (1-2-2) a horizontal element of each transmitting portion of the mask pattern of the optical modulator is composed of a plurality of pixels, and a stripe irradiated region to be projected at an observation position is controlled upon being segmented into a plurality of regions.

A stereoscopic image display method of the present invention is characterized by including:

(2-1) the step of capturing an image of an observer who is observing a stereoscopic image based on disparity images displayed on a display as video information; the step of detecting a face region of the observer on the basis of the video information of the observer; the step of detecting eyeballs of the observer from the face region of the observer; the step of tracking the eyeballs of the observer; the step of detecting viewpoint information of the observer from the detected eyeballs of the observer; and the step of controlling to track the disparity images to be displayed on the display on the basis of the viewpoint information of the observer.

Especially, the stereoscopic image display method has the following characteristic features:

(2-1-1) the method further comprises the step of identifying predetermined color information from the captured video information of the observer;

(2-1-2) the method further comprises the step of changing a capturing method of the video information of the observer when predetermined color information is not present in the captured video information of the observer; and (2-1-3) the method further comprises the step of generating an alarm signal when the predetermined color information is not present in the captured video information of the observer.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 21 is an explanatory view of an optical effect according to the sixth embodiment of the present invention;

FIG. 25 is an explanatory view of the display method of a synthesized disparity image and mask pattern according to the sixth embodiment of the present invention;

FIG. 26 is an explanatory view of the display method of a synthesized disparity image and mask pattern according to the sixth embodiment of the present invention;

FIG. 27 is an explanatory view of the display method of a synthesized disparity image and mask pattern according to the sixth embodiment of the present invention;

FIG. 28 is an explanatory view of the display method of a synthesized disparity image and mask pattern according to the sixth embodiment of the present invention;

FIG. 34 is an explanatory view of disparity image synthesis according to the seventh embodiment of the present invention;

FIGS. 35(A) and 35(B) are explanatory views of an image sensing method of disparity images used in the seventh embodiment of the present invention;

FIG. 36 is an explanatory view of the display method of a synthesized disparity image and mask pattern according to the seventh embodiment of the present invention;

FIG. 39 is an explanatory view of the display method of a synthesized disparity image and mask pattern according to the seventh embodiment of the present invention;

FIG. 40 is an explanatory view of the display method of a synthesized disparity image and mask pattern according to the seventh embodiment of the present invention;

FIG. 41 is an explanatory view of the display method of a synthesized disparity image and mask pattern according to the seventh embodiment of the present invention;

FIG. 42 is an explanatory view of the display method of a synthesized disparity image and mask pattern according to the seventh embodiment of the present invention;

FIG. 50 is an explanatory view of the display method of a synthesized disparity image and mask pattern according to the eighth embodiment of the present invention;

FIG. 51 is an explanatory view of the display method of a synthesized disparity image and mask pattern according to the eighth embodiment of the present invention;

FIG. 52 is an explanatory view of the display method of a synthesized disparity image and mask pattern according to the eighth embodiment of the present invention;

FIG. 53 is an explanatory view of the display method of a synthesized disparity image and mask pattern according to the eighth embodiment of the present invention;

DETAILED DESCRIPTION OF THE PREFERRED EMBODIMENTS

The preferred embodiments of the present invention will be described in detail hereinafter with reference to the accompanying drawings. In the following description, a stereoscopic image display system constructed by connecting a viewpoint position detection apparatus and stereoscopic image display apparatus according to the present invention will be explained. However, the application of the viewpoint position detection apparatus of the present invention is not limited to the stereoscopic image display system.

In the present invention, a viewpoint position means the coordinate value of a given point indicating the position of the eye of the observer. However, viewpoint position information output from the viewpoint position detection apparatus of the present invention need not always indicate the coordinate value of a given point but may be information indicating a given region. In some applications, the position of the entire eye need only be roughly detected, and the range of the viewpoint position information can be appropriately selected depending on applications.

First Embodiment

Figure 1:
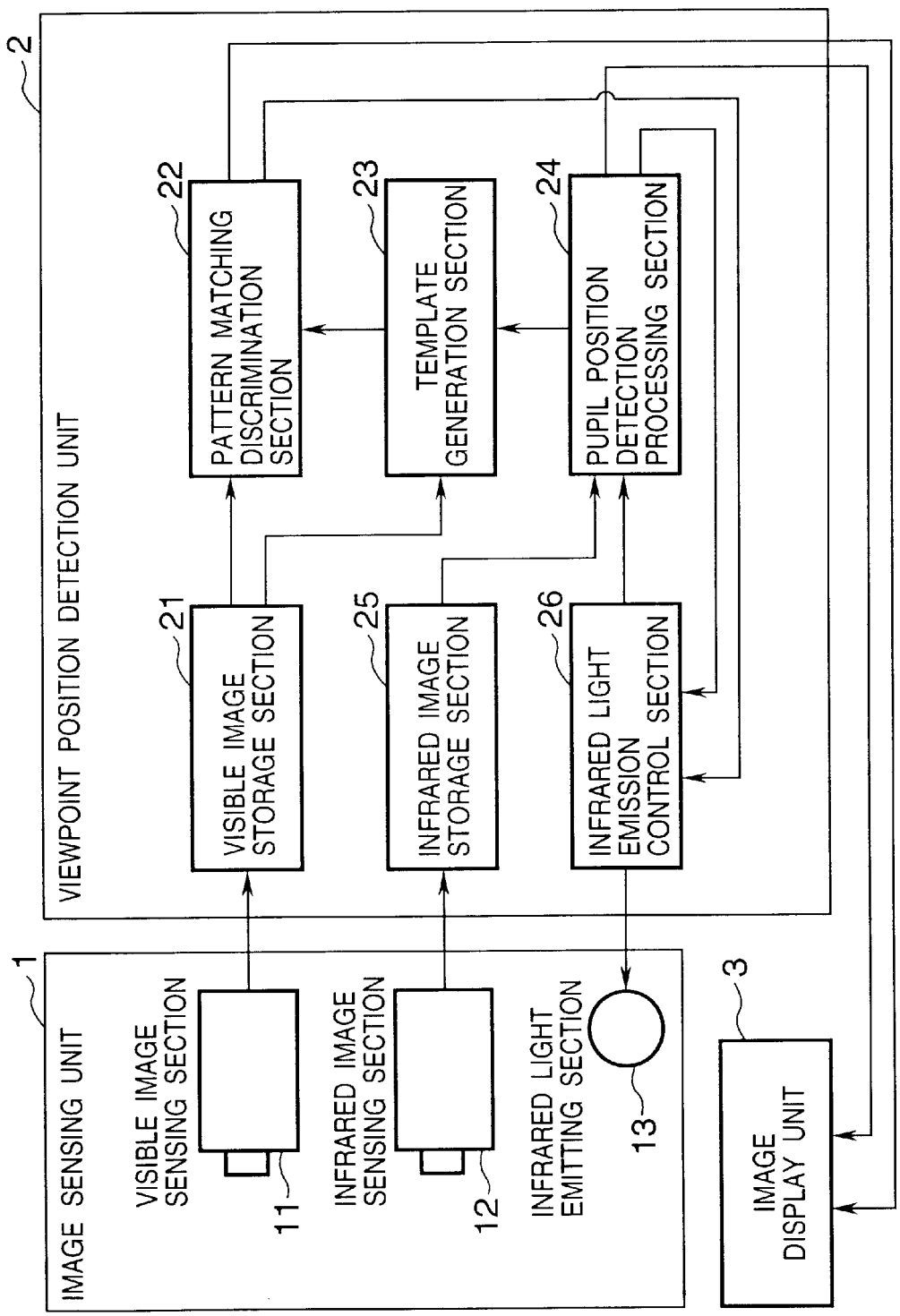
FIG. 1 is a block diagram showing the arrangement of a viewpoint position detection apparatus according to the first embodiment of the present invention.

FIG. 1 is a block diagram showing the arrangement of a viewpoint position detection apparatus according to the present invention. In this embodiment, the viewpoint position detection apparatus comprises an image sensing unit 1 and a viewpoint position detection unit 2, and an image display unit 3 corresponds to the aforementioned stereoscopic image display apparatus. In the following description, a combination of the viewpoint position detection apparatus and image display unit 3 will sometimes be referred to as a stereoscopic image display system.

The image sensing unit 1 comprises a visible image sensing section 11, infrared image sensing section 12, and infrared light emitting section 13, and senses visible and infrared images of the observer. Both the visible image sensing section 11 and infrared image sensing section 12 can be constructed by video cameras, and the infrared image sensing section 12 inputs only infrared light onto the internal light-receiving element via a filter and the like. The infrared light emitting section 13 can be constructed by an infrared light emitting element such as an LED or the like, and is designed to obtain an amount of light required for obtaining retinal reflection at a distance falling within a normal range between the observer and the image sensing unit 1.

The viewpoint position detection unit 2 comprises a visible image storage section 21, pattern matching discrimination section 22, template generation section 23, pupil position detection processing section 24, infrared image storage section 25, and infrared light emission control section 26. The viewpoint position detection unit 2 can be constructed by, e.g., a general computer system which can store an image signal output from the image sensing unit 1.

The visible image storage unit 21 and infrared image storage unit 25 are used as means for storing image data sensed by the corresponding image sensing sections 11 and 12, and may comprise semiconductor memories such as RAMs, or the like, or storage devices such as magnetic disks, optical disks, or the like.

The pattern matching discrimination section 22 outputs, to the image display unit 3, position information of a region having highest correlation with a template of an image stored in the visible image storage section 21 using the template supplied from the template generation section 23. On the other hand, when pattern matching fails, the section 22 supplies an output signal to the infrared light emission control section 26 to make it control the infrared light emitting section 13 to emit light.

The template generation section 23 generates a template for pattern matching used in the pattern matching discrimination section 22 on the basis of image data stored in the visible image storage section 21 using position information supplied from the pupil position detection processing section 24.

The pupil position detection processing section 24 receives a signal which indicates that the infrared light emission control section 26 has controlled the infrared light emitting section 13 to emit light, detects the pupil position from an infrared image stored in the infrared image storage section 25 on the basis of that signal information, and supplies the position information to the template generation section 23. The position information may be supplied to the image display unit 3.

The infrared light emission control section 26 controls emission of the infrared light emitting section 13 under the control of a control section (not shown), the pupil position detection processing section 24, a pattern matching processing section, and the like.

These building components of the viewpoint position detection unit 2 operate under the control of the control section (not shown).

Figure 2:
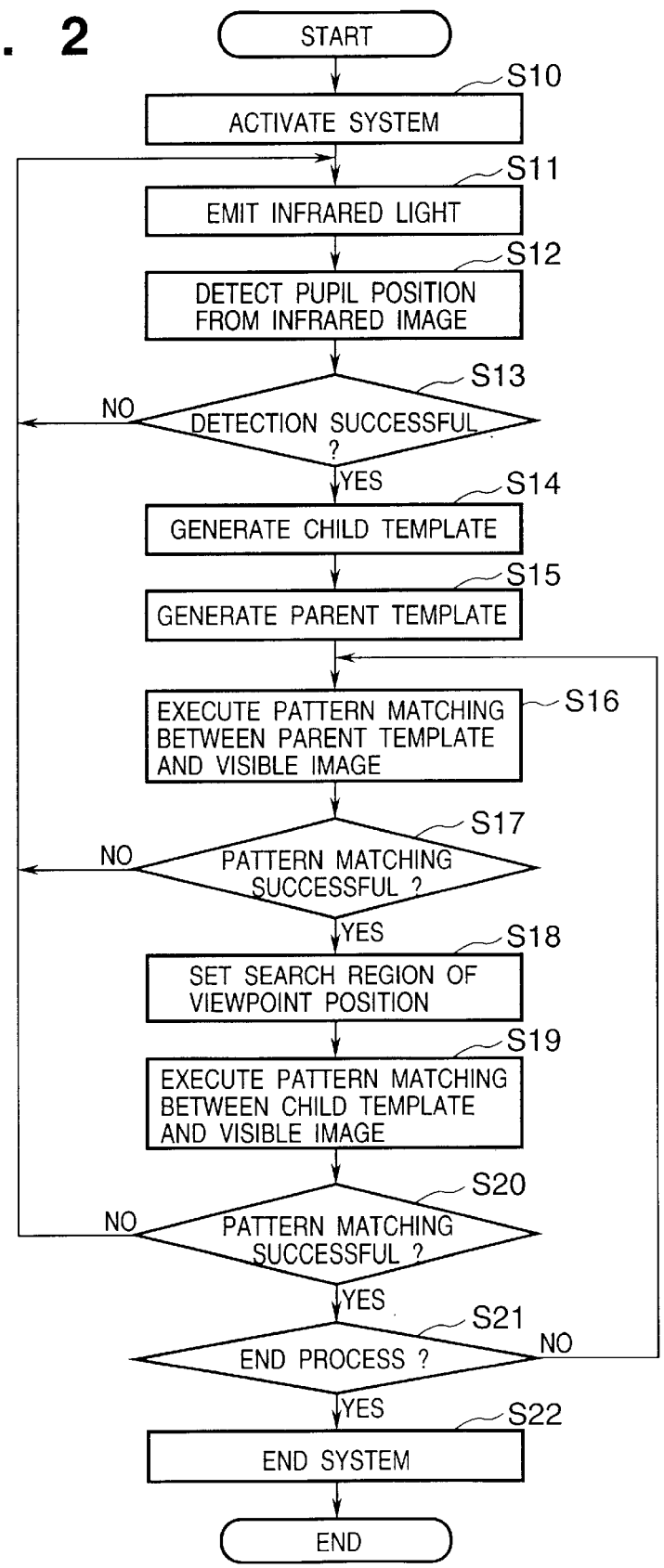
FIG. 2 is a flow chart for explaining the operation of the first embodiment of the present invention.

The operation of the system shown in FIG. 1 will be explained in detail below using FIGS. 2 to 4(b). FIG. 2 is a flow chart showing the operation of the viewpoint position detection apparatus in this embodiment.

The respective units are activated (e.g., the image sensing unit 1, viewpoint position detection unit 2, and image display unit 3 are turned on, initialized, and so forth) (step S10). The control section (not shown) instructs the infrared light emission control section 26 to emit infrared light. In response to this instruction, the infrared light emission control section 26 controls the infrared light emitting section 13 to emit light (step S11), and informs the pupil position detection processing section 24 that the infrared light has been emitted. A visible image sensed by the visible image sensing section 11 and an infrared image sensed by the infrared image sensing section 12 are respectively stored in the visible image storage section 21 and infrared image storage section 25, and the infrared light emitting section 13 is turned off. In this case, in order to generate templates and to execute pattern matching with high precision, the images are preferably stored in the image storage sections at substantially the same timing (frame).

Emission of infrared light may be started by arbitrary methods. For example, a sensor for detecting the presence/absence of the observer may be provided, and emission may be started after the presence of the observer has been confirmed by the sensor. Or the observer may press a button to start emission.

Figure 3:
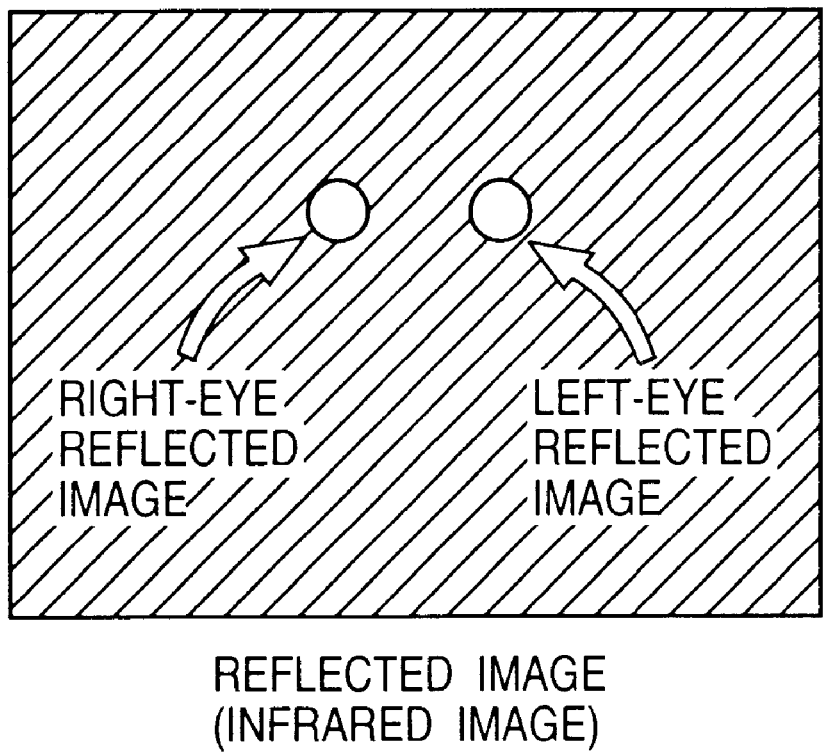
FIG. 3 shows an example of an image obtained by infrared light.

The pupil position detection processing section 24 detects the pupil position from the infrared image stored in the infrared image storage section 25 (step S12). The pupil position is basically detected by binarizing an image. Note that a reflected image which appears on the left side in the infrared image is the right eye of the observer, and a reflected image which appears on the right side is the left eye of the observer. FIG. 3 shows an example of the infrared image, and pupil portions have much higher luminance than other portions due to retinal reflection of near infrared light.

Since each reflected image formed by retinal reflection corresponds to a local region in the image, the position of that reflected image detected in step S12 is not a pin-point coordinate value that indicates one point in the image. The process for obtaining the pupil position as a pin-point infra-image coordinate position from each reflected image can be appropriately done before templates for pattern matching are generated.

If it is determined in step S13 that two points can be detected, the flow advances to step S14; if detection has failed due to, e.g., blinking of the observer, the flow returns to step S11 to capture images again.

If it is determined in step S13 that pupil position detection has succeeded, template generation is started. Templates for pattern matching used in this embodiment include two child templates and one parent template. These different types of templates will be described in detail below with reference to FIGS. 4A and 4B.

Figure 4B:
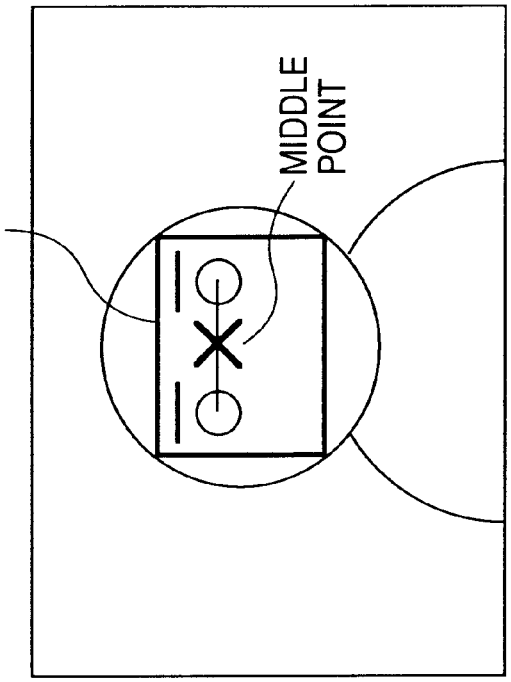
FIGS. 4A and 4B are views for explaining the arrangements of templates used in the embodiment of the present invention.
Figure 4A:
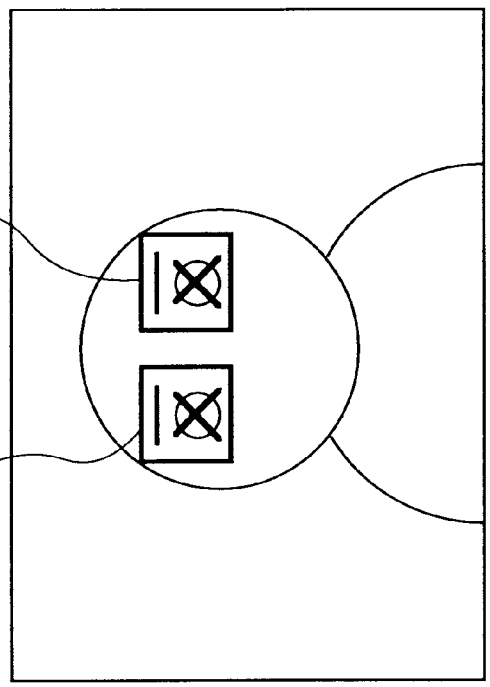

FIGS. 4A and 4B are views for respectively explaining the child templates and parent template used in this embodiment. As shown in FIGS. 4A and 4B, the two child templates have the viewpoint positions of the right and left eyes as base points (indicated by x in FIGS. 4A and 4B), respectively, and the parent template includes the viewpoint positions of the right and left eyes, and has the middle point of these viewpoint positions as a base point. Note that the viewpoint position in each template is a coordinate value indicating one point in intra-image coordinates.

In this embodiment, template generation starts from the child templates. The template generation section 23 generates child template 1 having the viewpoint position of the right eye as a base point, and child template 2 having the viewpoint position of the left eye as a base point from the visible image stored in the visible image storage section 21 using the pupil positions (the coordinate values on the image) of the right and left eyes detected from the infrared image by the pupil position detection processing section 24 (step S14). The size of each child template is calculated based on the distance between the viewpoint positions of the right and left eyes by:

distance between viewpoint positions of right and left eyes of average person: measured distance between viewpoint positions of right and left eyes=size in which eye and eyebrow of average person roughly fall: size of child template Note that the average values of the distance between the viewpoint positions and the size in which the eye and eyebrow fall can use, e.g., statistically obtained values.

Upon completion of generation of the child templates, the template generation section 23 generates a parent template (step S15). As described above, the parent template includes the two viewpoint positions to have the middle point of the two viewpoint positions of the right and left eyes as a base point. The size of the parent template is determined based on the distance between the viewpoint positions of the right and left eyes by:

distance between viewpoint positions of right and left eyes of average person: measured distance between viewpoint positions of right and left eyes=size in which face of average person roughly falls: size of parent template As in generation of the child templates, the average values may use statistically obtained values. The templates generated by the template generation section 23 are supplied to the pattern matching discrimination section 22.

Upon completion of generation of the templates, pattern matching is done using the visible image stored in the visible image storage section 21 and the templates generated by the template generation section 23. The pattern matching discrimination section 22 executes pattern matching between the parent template and visible image first (step S16). Pattern matching can be implemented using, e.g., a normalized correlation function. Pattern matching using a normalized correlation function is described in, e.g., "Matrox Imaging Library Version 5.1 User Guide", pp. 154–155. The value obtained by the normalized correlation function is expressed by 0 to 100 (%), and 100% means perfect matching.

In this embodiment, when a correlation value exceeding, e.g., 85% is obtained, it is determined that pattern matching has succeeded. Upon pattern matching immediately after the templates are generated, since a source image of the templates is the same as image data to be subjected to pattern matching, a correlation value of nearly 100% should be basically obtained.

If the pattern matching result between the parent template and visible image satisfies a predetermined correlation value, it is determined in step S17 that pattern matching has succeeded, and the flow advances to step S18. On the other hand, if the correlation value is smaller than the predetermined value, it is determined that templates must be generated again, and the flow returns to step S11 to capture an infrared image again.

If pattern matching using the parent template has succeeded, the pattern matching discrimination section 22 sets search regions of the viewpoint positions (step S18). That is, the section 22 sets the left half in the parent template to be the search region of the right eye viewpoint position, and right half to be the search region of the left eye viewpoint position. Based on the set search regions, pattern matching between the child templates and visible image is done (step S19). In this manner, since pattern matching is done step by step to limit the search range and to restrict the viewpoint positions of the right and left eyes, wrong viewpoint positions can be prevented from being detected (not a failure), thus achieving high-precision tracking.

As a result of pattern matching, if the maximum correlation value satisfies a predetermined correlation value, it is determined in step S20 that pattern matching has succeeded, and the flow advances to step S21. On the other hand, if the maximum correlation value is smaller than the predetermined correlation value, the flow returns to step S11 to capture an infrared image again. In this case, the pattern matching discrimination section 22 instructs the infrared light emission control section 26 to emit infrared light again.

If it is determined in step S20 that pattern matching has succeeded, the pattern matching discrimination section 22 outputs the finally obtained viewpoint position information (viewpoint position coordinate values) to the image display unit 3 in units of right and left eyes. It is checked in step S21 if the system is to end. If the end of the system operation is not instructed, a visible image is captured from the visible image sensing section 11, and is stored in the visible image storage section 21. The flow then returns to step S16.

After that, pattern matching for a visible image is continued, and if pattern matching fails, infrared light is automatically emitted to generate templates again. If the end of processing is instructed in step S21, a predetermined end process is done (step S22), thus ending a series of processes.

Figure 12:
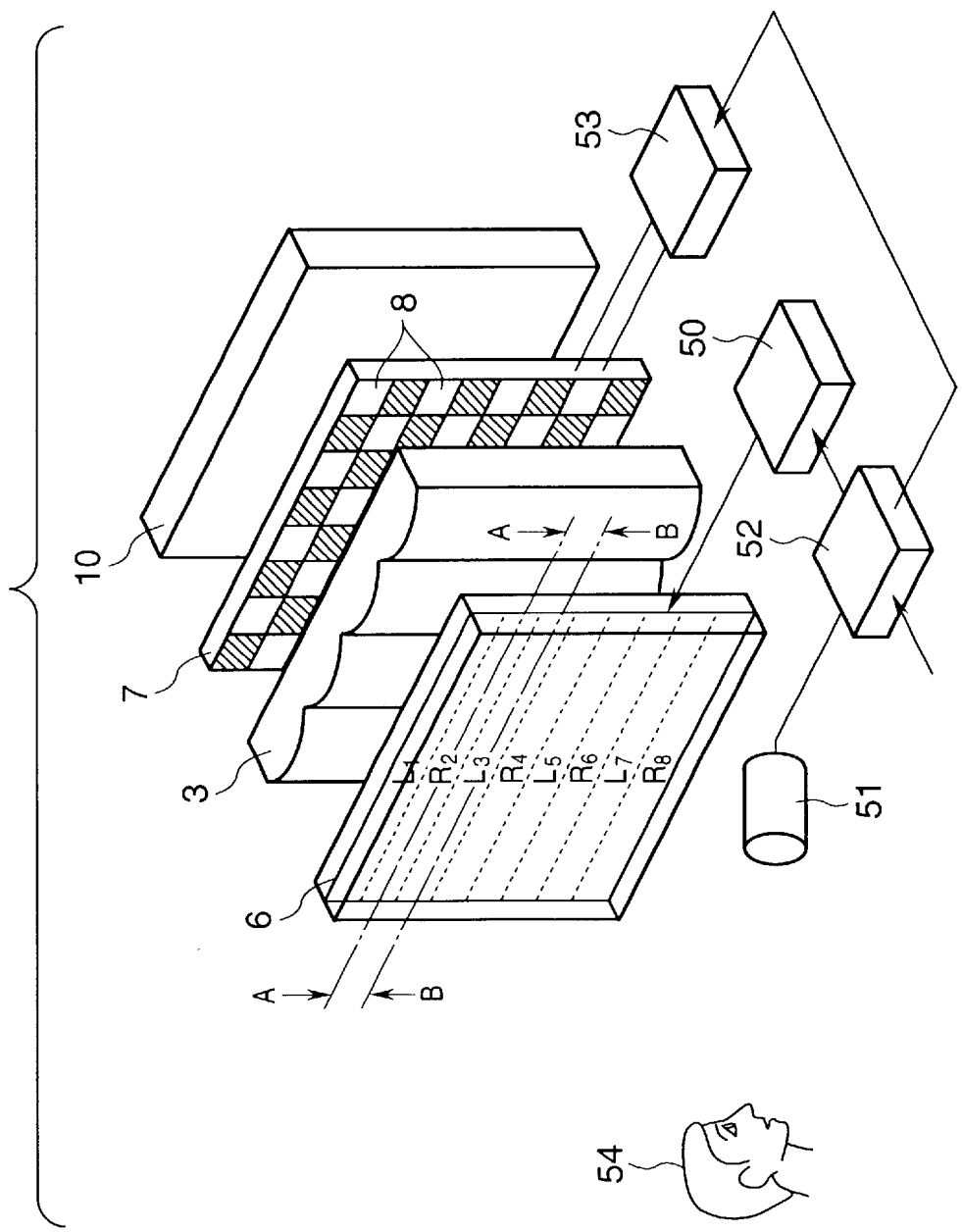
FIG. 12 is a perspective view showing an example of a stereoscopic image display apparatus which makes display control in accordance with the viewpoint position.

In this manner, since a retina reflected image formed by infrared light, from which high-precision information can be obtained as viewpoint position information upon generating templates, is used, the irradiation time of infrared time can be minimized, and the fear of adverse influences on the observer can be eliminated. If pattern matching has failed, since templates are automatically generated again, an accurate pattern matching result can be stably obtained, and can be suitably used in display control of, e.g., the stereoscopic image display apparatus shown in FIG. 12.

Second Embodiment

In the first embodiment, when pattern matching has failed, an infrared image is captured again to attain pattern matching with high precision and high tracking performance. In an environment in which the person to be measured moves only slightly, the same effect as in the first embodiment can be expected by periodically re-generating templates. In this embodiment, this arrangement will be explained.

Figure 5:
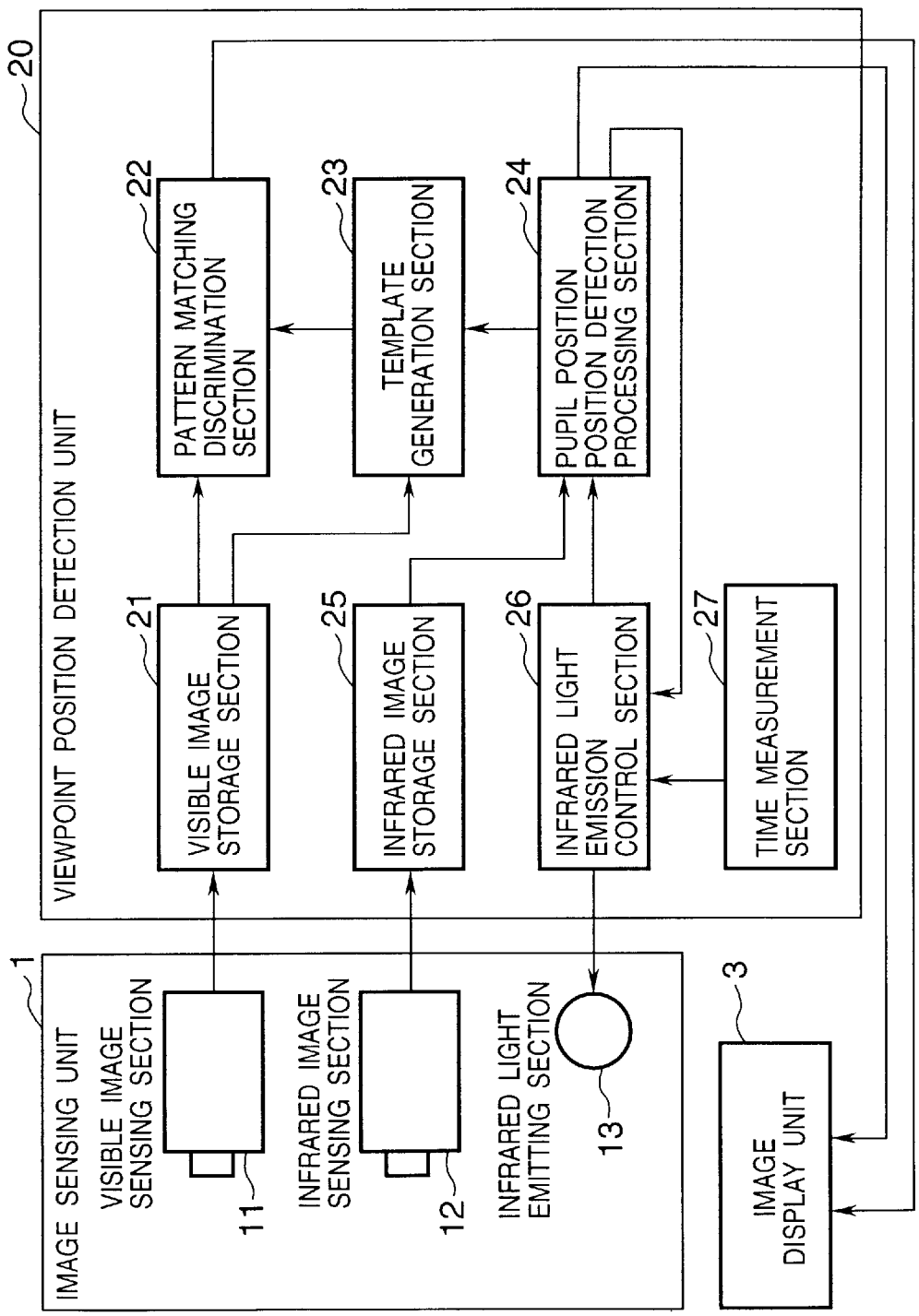
FIG. 5 is a block diagram showing the arrangement of a viewpoint position detection apparatus according to the second embodiment of the present invention.

FIG. 5 is a block diagram showing the arrangement of a viewpoint position detection apparatus according to the second embodiment of the present invention. FIG. 5 shows a stereoscopic image display system built by connecting the image display unit 3 to the viewpoint position detection apparatus, as in FIG. 1. The same reference numerals in FIG. 5 denote the same building components as those in FIG. 1 in the first embodiment, and a detailed description thereof will be omitted.

This embodiment is different from the first embodiment in that the viewpoint position detection unit 20 has a time measurement section 27. The time measurement section 27 is a so-called timer means, and generates signals at predetermined time intervals. This output signal is input to the infrared light emission control section 26, which controls the infrared light emitting section 13 to emit infrared light in response to that signal. In this manner, the same process as that upon activating the system is started.

Figure 6:
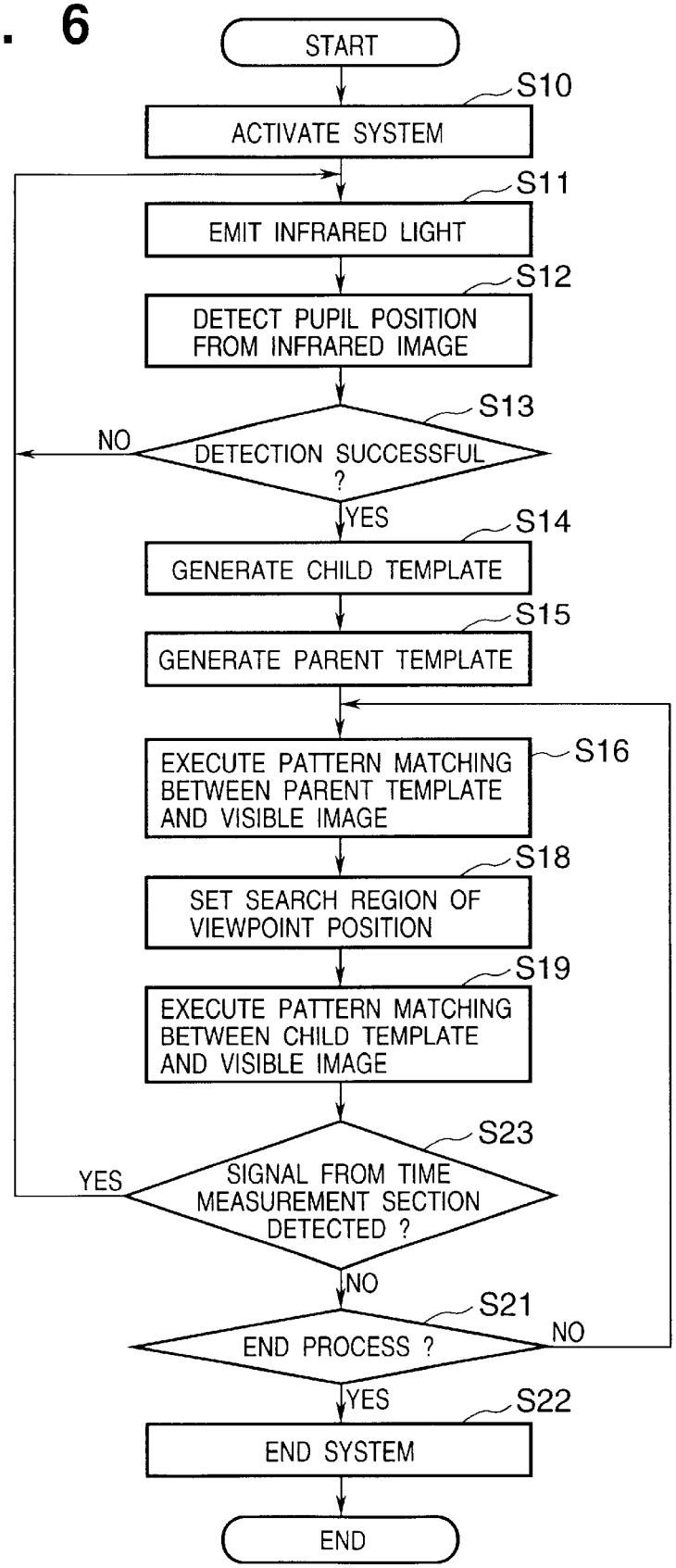
FIG. 6 is a flow chart for explaining the operation of the second embodiment of the present invention.

The operation will be described in detail below using FIG. 6. FIG. 6 is a flow chart showing the operation of this embodiment. The same step numbers in FIG. 6 denote the same steps as those in FIG. 2, and a detailed description thereof will be omitted.

As can be seen from FIG. 6, in this embodiment, the steps of checking if pattern matching has succeeded (steps S17 and S20) are removed from the processing steps shown in FIG. 2, and step S23 of checking the presence/absence of the output from the time measurement section 27 is added.

From step S10 of activating the system to step S16 of executing pattern matching between the parent template and visible image, the same processes as those in FIG. 2 are done. Immediately after completion of pattern matching, the search regions of the viewpoint positions are set (step S18), and pattern matching between the child templates and visible image is done (step S19).

Upon completion of pattern matching between the child templates and visible image in step S19, it is checked in step S23 if the output signal from the time measurement section 27 is detected. If the output signal is not detected, the flow advances to step S21, and capturing of the next visible image and pattern matching repeat themselves or the system end process (step S22) is done depending on whether or not the end of system operation is instructed. On the other hand, if the output signal from the time measurement section 27 is detected, the flow returns to the infrared light emission step (step S11) to restart processes from capturing of an infrared image, thereby updating the child and parent templates.

If the output signal from the time measurement section 27 is detected during the pattern matching processes in steps S16 to S19, the infrared light emission control section 26 stores data indicating detection of the output signal in, e.g., its internal memory area, and instructs the infrared light emitting section 13 to emit infrared light after completion of pattern matching (step S19) between the child templates and visible image and also instructs the pupil position detection processing section 24 to detect the pupil positions from the infrared image.

The signal generation cycle of the time measurement section 27 can be appropriately determined on the basis of conditions such as the use environment of the image display unit 3 (e.g., whether or not the observer moves a lot, the observer changes frequently, and so forth), the processing time required for generating templates, and the like.

With this arrangement, in this embodiment, both high processing speed and high detection precision can be achieved by a simple arrangement.

Third Embodiment

In this embodiment, processes as a combination of the first and second embodiments are done. That is, templates are forcibly updated at predetermined time intervals in addition to a case wherein it is determined that pattern matching has failed.

Figure 7:
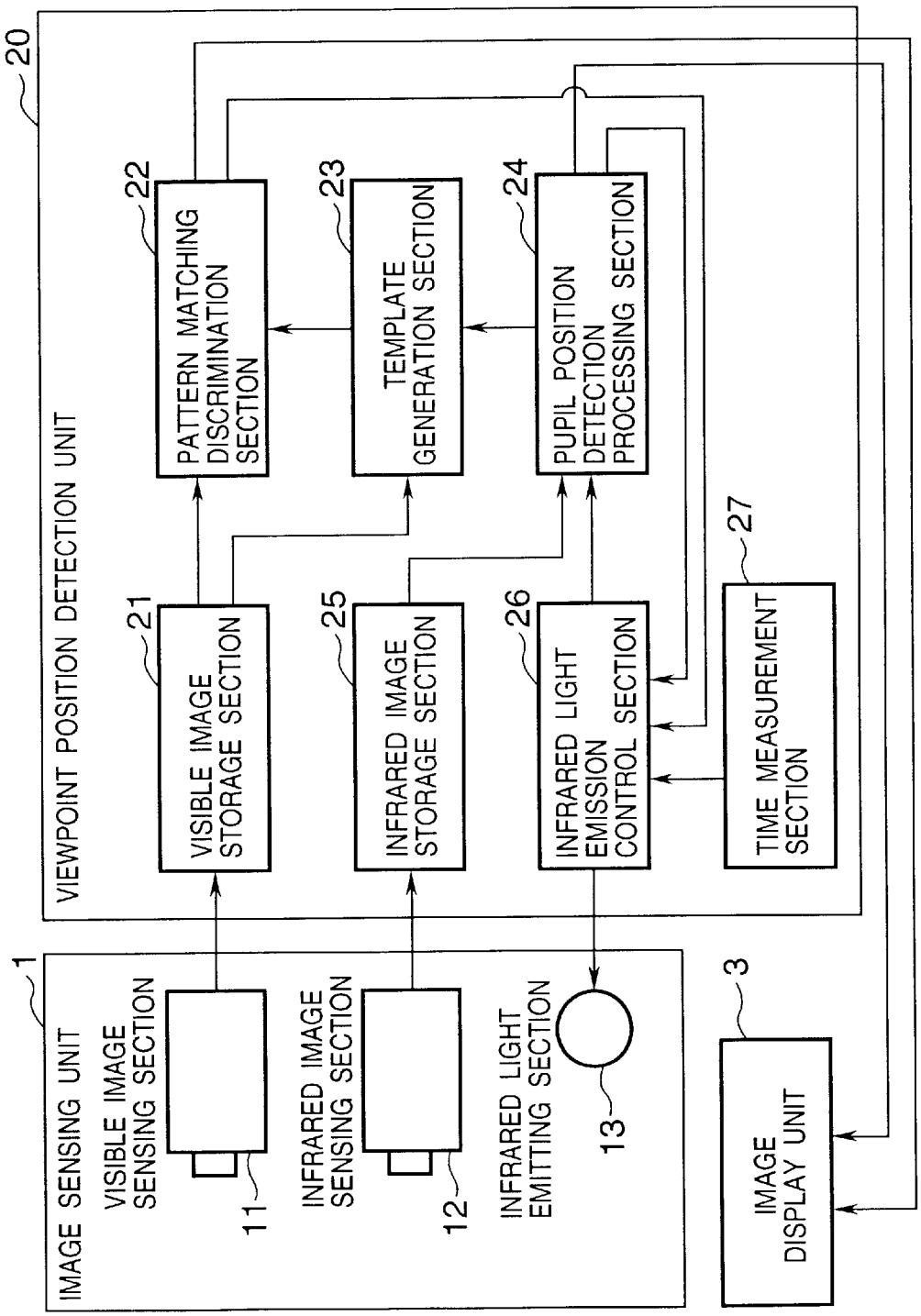
FIG. 7 is a block diagram showing the arrangement of a viewpoint position detection apparatus according to the third embodiment of the present invention.

FIG. 7 is a block diagram showing the arrangement of a viewpoint position detection apparatus according to the third embodiment of the present invention. FIG. 7 shows a stereoscopic image display system built by connecting the image display unit 3 to the viewpoint position detection apparatus, as in FIG. 1. The same reference numerals in FIG. 7 denote the same building components as those in FIG. 5, and a detailed description thereof will be omitted. Since the arrangements shown in FIGS. 7 and 5 have common building components but different connections, a description of the arrangement will be omitted, and the operation will be explained using FIG. 8.

Figure 8:
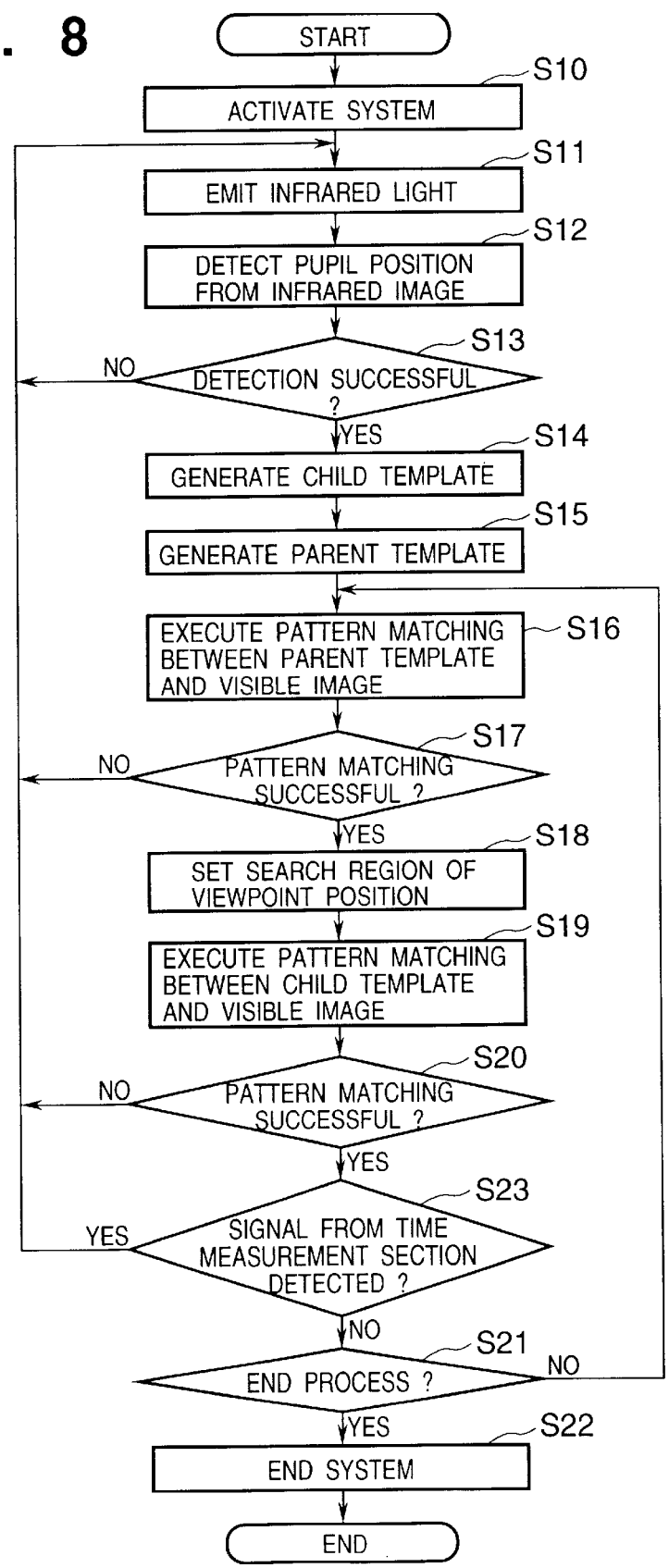
FIG. 8 is a flow chart for explaining the operation of the third embodiment of the present invention.

FIG. 8 is a flow chart showing the viewpoint position detection operation in this embodiment. The same step numbers in FIG. 8 denote the same steps as those in FIGS. 2 and 6, and a detailed description thereof will be omitted. As is apparent from comparison among FIGS. 2, 6, and 8, this embodiment is characterized in that step S23 of checking if the output signal from the time measurement section is detected is added between pattern matching result evaluation step S20 after pattern matching using the child template, and step S21 of checking if an end instruction is detected in the first embodiment (FIG. 2).

By adding this step S23, the templates are updated (generated) at signal output cycles of the time measurement section 27 even if pattern matching does not fail, in addition to a case wherein it is determined in one of two pattern matching result evaluation steps S17 and S20 that pattern matching has failed. As a result, the templates are periodically optimized, and position detection with higher precision can be implemented.

Fourth Embodiment

As described above, pupil position detection using an infrared image exploits the near infrared ray reflection characteristics of the retina. Normally, a person does not have any other portions that reflect infrared rays (like retinas). However, when the observer wears an object (e.g., spectacles) that can reflect infrared rays on the image sensing range such as a face, forehead, or the like, three or more reflected images may be detected on an infrared image, or a very large reflected image may be detected. From such infrared image, pupil positions cannot be detected at all or suffer large errors, i.e., have incorrect information, if they can be detected.

Since the above embodiments are achieved on the condition that two reflected images are clearly detected from an infrared image in the pupil position detection process, if detection has failed, capturing of an infrared image and pupil position detection from the captured infrared image (steps S11 and S12 in FIG. 2, 6, or 8) unconditionally repeat themselves.

However, in some cases, correct pupil positions cannot be detected from an infrared image due to reflection by spectacles or the like even if the processes are repeated. For this reason, in this embodiment, if pupil position detection from an infrared image successively fails a predetermined number of times, it is determined that pupil position detection by infrared light is unlikely to end successfully as the observer wears spectacles, or the like, and templates are generated from only visible image information.

Since the arrangement of a viewpoint position detection apparatus according to this embodiment can be the same as that shown in FIG. 1, a detailed description of building components will be omitted, and the operation will be explained with the aid of FIG. 9.

Figure 9:
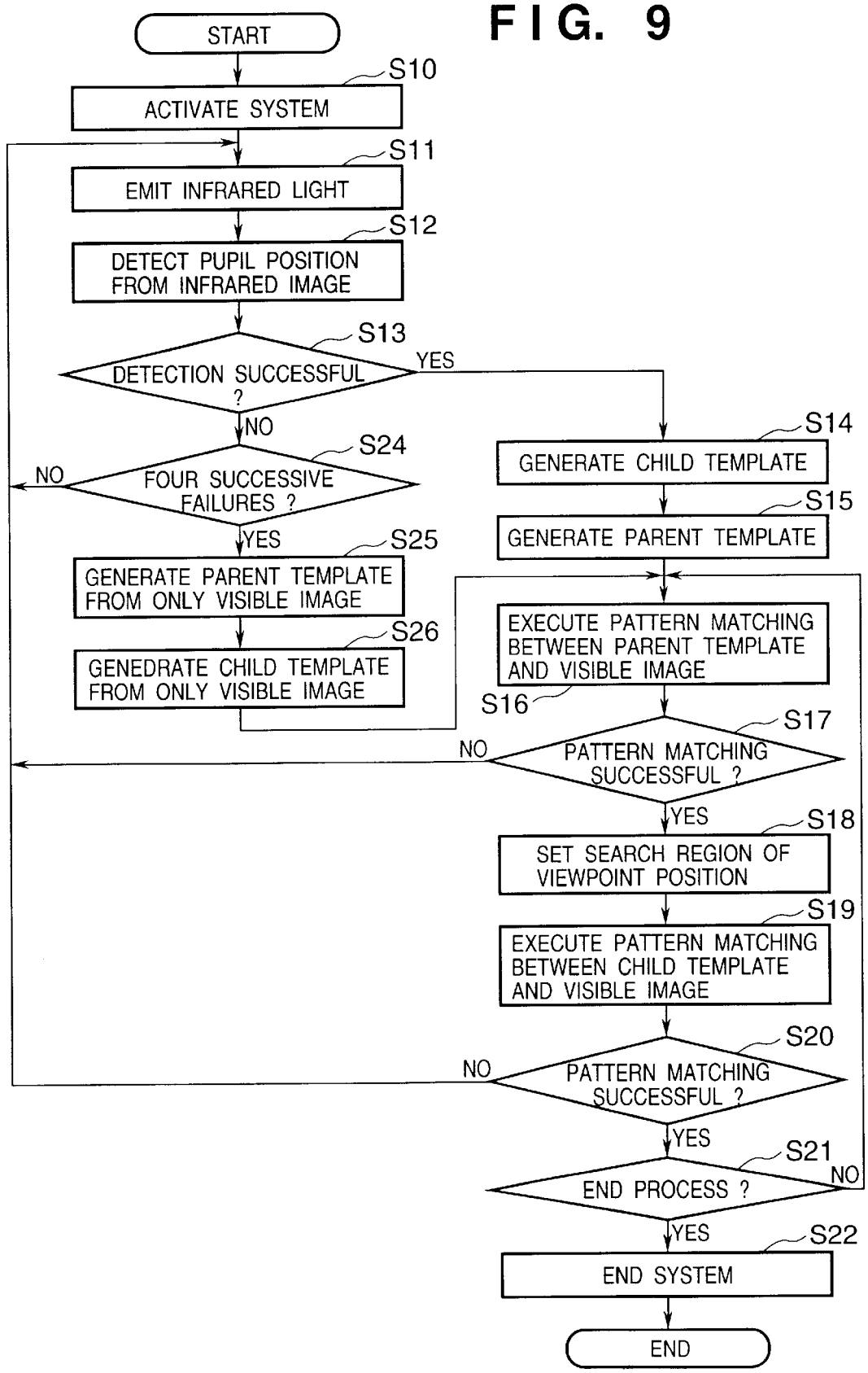
FIG. 9 is a flow chart for explaining the operation of the fourth embodiment of the present invention.

FIG. 9 is a flow chart showing the operation of the viewpoint position detection apparatus according to this embodiment. The same step numbers in FIG. 9 denote the same steps as those in FIG. 2, and a detailed description thereof will be omitted. Also, a case will be exemplified below wherein pupil position detection from an infrared image is given up if pupil position detection from an infrared image successively has failed four times.

As shown in FIG. 9, in this embodiment, the processes in steps S24 to S26 are added to the operation in the first embodiment shown in FIG. 2. From activation of the system to the evaluation step (step S13) of the pupil position detection result using an infrared image, the same processes as those in the first embodiment are done.

If it is determined in step S13 that pupil position detection from an infrared image has succeeded, the flow advances to step S14 and, after that, the same processes as those in the first embodiment are executed. On the other hand, if it is determined in step S13 that pupil position detection has failed, it is checked if the number of successive failures has reached a predetermined value (in this case, four) (step S24). For example, the pupil position detection processing section 24 stores the number of successive failures in its internal memory. If the number of successive failures is smaller than the predetermined value, the flow returns to the infrared image capturing step (step S11) to make a reattempt of pupil position detection from an infrared image.

On the other hand, if the number of successive failures has reached the predetermined value (four in this embodiment), pupil position detection from an infrared image is given up, and templates are generated from only a visible image. That is, the control section (not shown) instructs the template generation section 23 to extract regions by image processing of image data stored in the visible image storage section 21 and to generate templates. In this case, since pupil position information from an infrared image is not available, template generation starts from a parent template. More specifically, the profile of the face is detected, and a parent template is generated (step S25). Next, eye regions are searched for in the right and left regions of the parent template, thus generating child templates (step S26). After that, the flow advances to step S16, and the processes after pattern matching are done as in the first embodiment.

In this embodiment, if it is determined in the pattern matching result evaluation steps (steps S17 and S20) that pattern matching has failed, the processes are redone from capturing of an infrared image. In such case, if pupil position detection successively has failed four times and templates are generated from only a visible image, the processes may be redone from step S25 in place of returning to step S11, or the number of successive failures of pattern matching may also be counted, and only when it has exceeded a predetermined value, the processes may be redone from capturing of an infrared image.

As described above, according to the present invention, problems that may occur actually can be adequately coped with, and the worst case, i.e., viewpoint position detection failure can be avoided.

Fifth Embodiment

In the fourth embodiment, if pupil position detection from an infrared image cannot be done as the person to be measured wears spectacles, or the like, two types of templates are generated from only a visible image. However, this embodiment is characterized in that one template is generated using infrared image information.

Since the arrangement of a viewpoint position detection apparatus according to this embodiment can be the same as that shown in FIG. 1, a detailed description of building components will be omitted, and the operation will be explained with the aid of FIG. 10.

Figure 10:
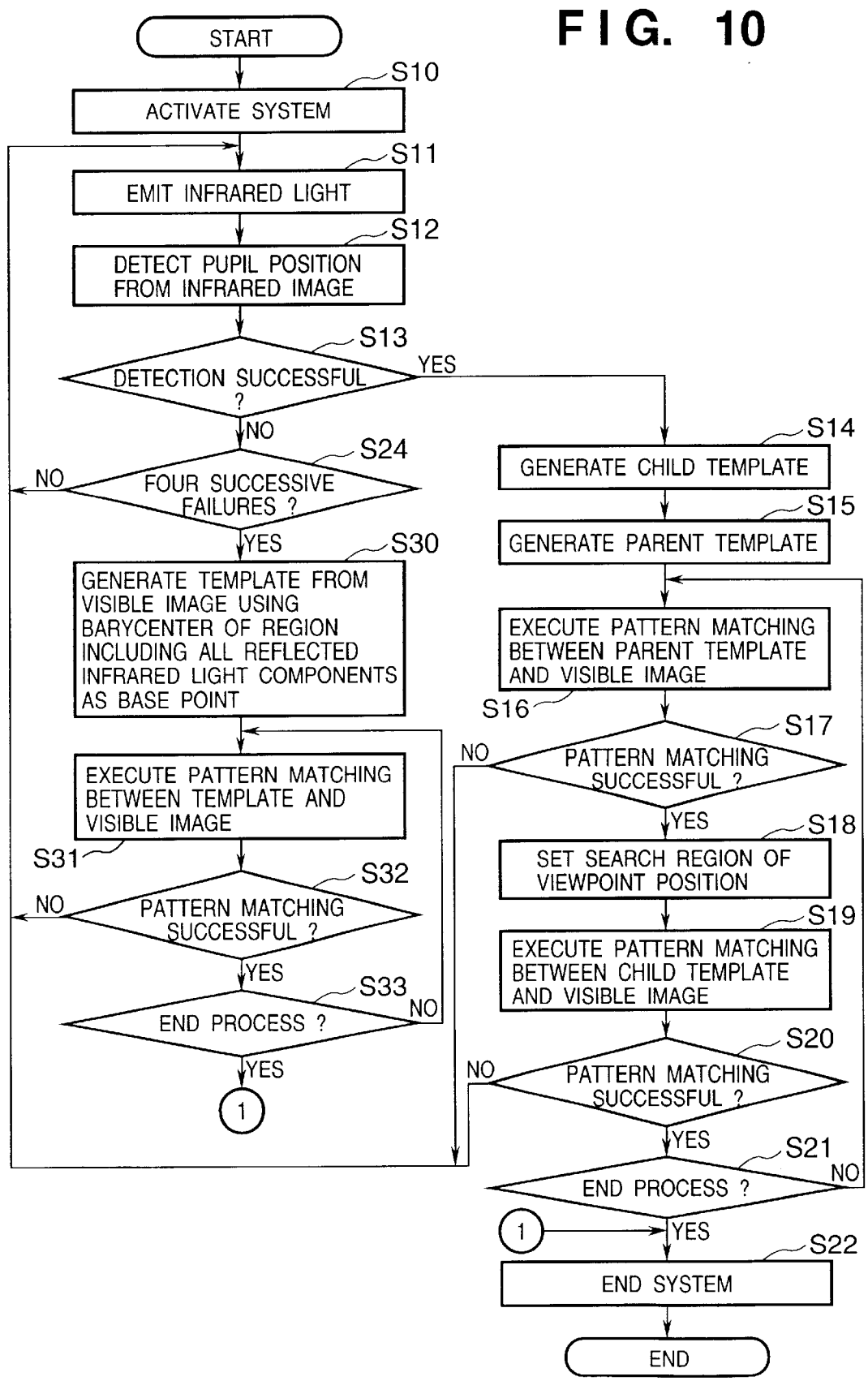
FIG. 10 is a flow chart for explaining the operation of the fifth embodiment of the present invention.
Figure 11:
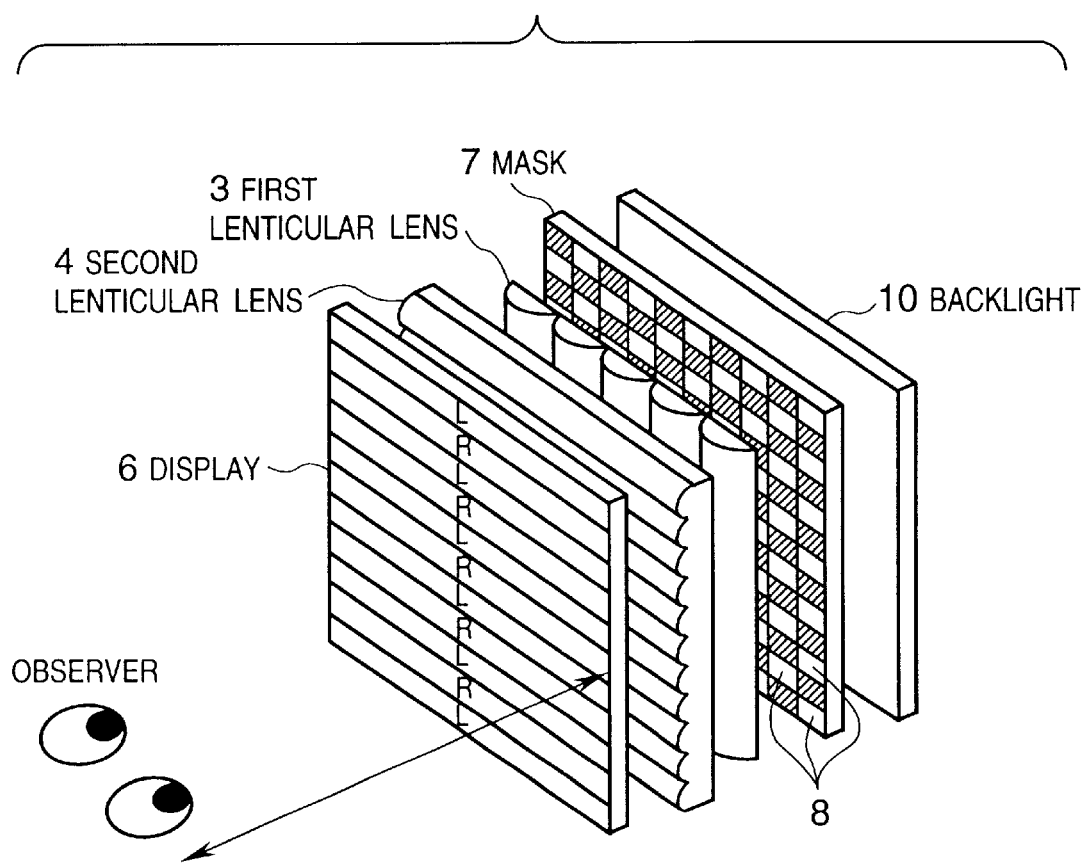
FIG. 11 is a perspective view showing the arrangement of a rear cross lenticular stereoscopic image display apparatus.

FIG. 10 is a flow chart showing the operation of the viewpoint position detection apparatus according to this embodiment. The same step numbers in FIG. 10 denote the same steps as those in FIG. 2, and a detailed description thereof will be omitted. Also, a case will be exemplified below wherein pupil position detection from an infrared image is given up if pupil position detection from an infrared image successively fails four times, as in the fourth embodiment.

As shown in FIG. 10, in this embodiment, the processes in steps S30 to S33 are added to the operation in the fourth embodiment shown in FIG. 9. From activation of the system to the evaluation step (step S13) of the pupil position detection result using an infrared image, the same processes as those in the first embodiment are done.

If it is determined in step S13 that pupil position detection from an infrared image has succeeded, the flow advances to step S14 and, after that, the same processes as those in the first embodiment are executed. On the other hand, if it is determined in step S13 that pupil position detection has failed, it is checked if the number of successive failures has reached a predetermined value (in this case, four) (step S24). For example, the pupil position detection processing section 24 stores the number of successive failures in its internal memory. If the number of successive failures is smaller than the predetermined value, the flow returns to the infrared image capturing step (step S11) to make a reattempt of pupil position detection from an infrared image.

On the other hand, if the number of successive failures has reached the predetermined value (four in this embodiment), pupil position detection from an infrared image is given up, and a template is generated from a visible image using information obtained from the infrared image. Even when the person to be measured wears spectacles, and pupil position detection from an infrared image is disabled by reflection by the frame or lenses of the spectacles, the spectacles are present at eye positions, and pupils are highly likely to be present in the reflected image. Therefore, that reflected image can be effectively used as base point position information upon generating a template.

For this reason, in this embodiment, the pupil position detection processing section 24 calculates the barycenter of a region including all reflected light components included in the infrared image, and the template generation section 23 generates a template from the visible image using the calculated barycenter as a base point (step S30). In this case, both the parent and child templates are generated in the fourth embodiment, but the number of templates generated in this embodiment is one. The size of the template is determined from information such as the width, height, and the like of the region including all reflected light components.

After the template is generated, positions where viewpoints are highly likely to be present in the template are estimated, and are set to be the viewpoint positions of the right and left eyes.

Upon completion of generation of the template, pattern matching with the visible image is done using that template (step S32). If it is determined that pattern matching has succeeded, and no instruction of the end of processing is detected, the flow returns to step S31 to continue processes. On the other hand, if it is determined in step S32 that pattern matching has failed, the flow returns to step S11 to capture an infrared image again. In case of this embodiment, since a high-precision pattern matching result cannot be expected, the evaluation criterion of the pattern matching result in step S32 may be set to be slightly lower than that in the first embodiment that can attain precise pupil position detection from an infrared image.

In this embodiment, if it is determined in the evaluation step of the pattern matching result (step S32) that pattern matching has failed, processes are redone from capturing an infrared image. Alternatively, if pattern matching has successively failed four times, and templates are generated using information of an infrared image, processes may be redone from step S30 in place of returning to step S11, or they may be redone from capturing of an infrared image only when the number of successive failures has exceeded a predetermined value.

As described above, according to this embodiment, problems that may occur actually can be adequately coped with, and the worst case, i.e., viewpoint position detection failure can be avoided.

In the aforementioned embodiments, viewpoint position detection is done at the initiative of the viewpoint position detection apparatus of the present invention. For example, when the stereoscopic image display system including the image display unit 3 is used, a button or the like that the user can operate may be provided to the image display unit 3 or a remote controller, and when the user fails to normally recognize images in stereovision, he or she may press that button to restart pupil position detection starting from infrared image capturing. With this arrangement, templates can be updated at an adequate timing, and viewpoint position detection with higher precision can be achieved. As a result, a stereoscopic image display system with a broad stereovision range can be realized.

Upon emitting infrared light, its emission amount may be changed in correspondence with the luminance of the image display unit 3 or the distance to the observer, or may be changed (set to be higher or lower than) from the previous one when pupil position detection from an infrared image has failed and processes must be redone. Such emission amount control raises the probability of successful pupil position detection from an infrared image, and leads to acquisition of a high-precision viewpoint position detection result.

In the above embodiments, the detection result of the viewpoint position detection apparatus according to the present invention is supplied to the stereoscopic image display apparatus. However, the viewpoint position detection apparatus according to the present invention can be used for arbitrary purposes.

Also, the detailed methods explained in the above embodiments, e.g., the pattern matching method, template generation method, and the like are not limited to those explained in the above embodiments, and equivalently applicable methods may be used.

In the above embodiments, the viewpoint positions as pin point coordinate positions are output. However, like in the above embodiments, when the finally obtained viewpoint positions are used in control of the stereoscopic image display apparatus, if the central position between the right and left eyes can be detected, minimum required control can be made. Hence, the central position of the template may be output to the image display unit 3. Especially, when accurate pupil position information cannot be obtained from an infrared image as in the fourth and fifth embodiments, such arrangement is effective.

In the fourth and fifth embodiments in which an alternative method is selected if pupil position detection from an infrared image has failed, for example, a means (e.g., a button or the like) for instructing the viewpoint position detection apparatus of the present invention that the person to be measured wears spectacles may be provided, and alternative steps may be executed from the beginning when this button has been pressed. In this case, in the fourth embodiment, a visible image is acquired in step S10 in FIG. 9, and the flow then directly jumps to step S25, or if it is determined in step S13 for the first time that pupil position detection from infrared light has failed, the flow jumps to step S25.

Likewise, in the fifth embodiment, an infrared image is captured in step S11, and the flow directly jumps to step S30, or if it is determined in step S13 for the first time that pupil position detection from infrared light has failed, the flow jumps to step S30.

Sixth Embodiment

The sixth embodiment and the following embodiments are stereoscopic image display apparatus according to the present invention, respectively.

Now, the sixth embodiment will be explained below with reference to FIGS. 13 to 33.

Figure 13:
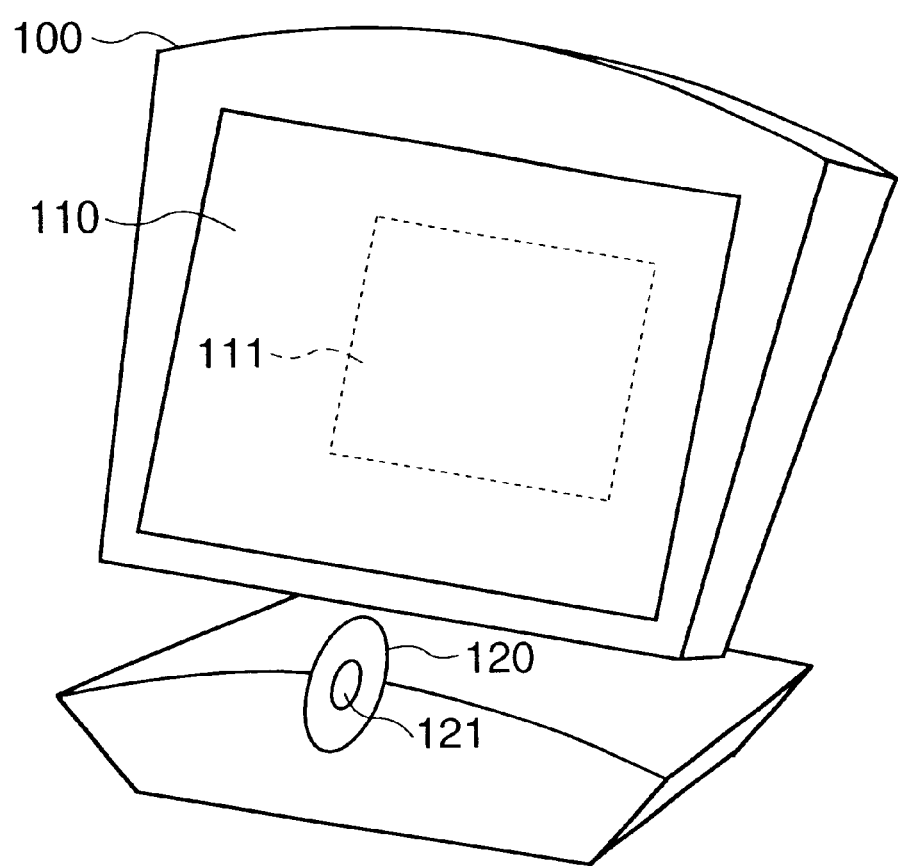
FIG. 13 is a perspective view showing the outer appearance of the sixth embodiment of the present invention.

FIG. 13 shows the outer appearance of the stereoscopic image display apparatus according to the present invention. Referring to FIG. 13, reference numeral 100 denotes a main body and depicts the overall apparatus of this embodiment. Reference numeral 110 denotes a display unit. Reference numeral 111 denotes a 3D window on which a stereoscopic image (disparity images) is displayed. Reference numeral 120 denotes an eyeball detection means for detecting eyeball information of the observer, e.g., a viewpoint detection apparatus for detecting the viewpoints of the observer; and 121, a video camera as one building component of the viewpoint position detection apparatus.

Figure 14:
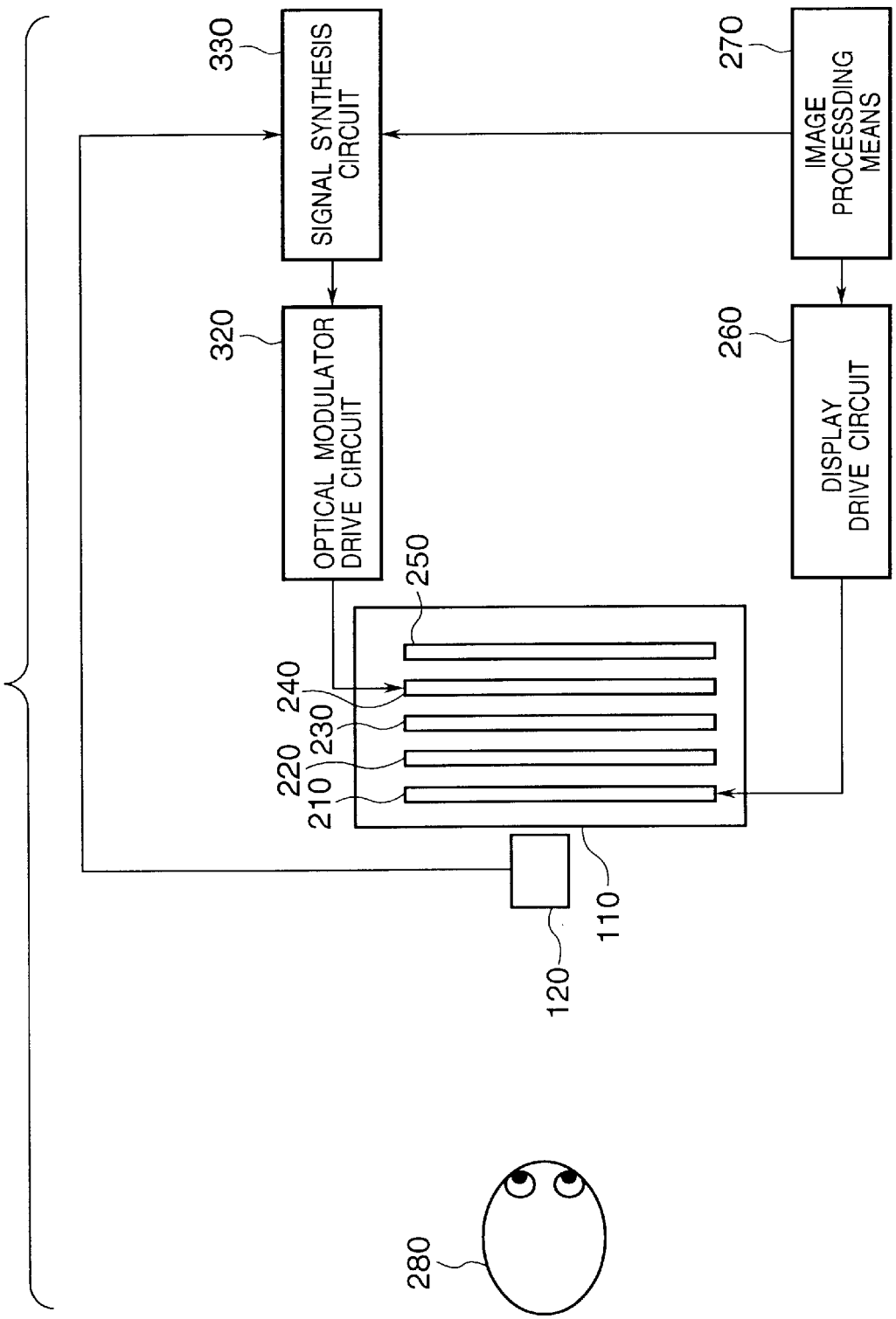
FIG. 14 is a system block diagram of the sixth embodiment of the present invention.

FIG. 14 is a system block diagram for explaining the system of the sixth embodiment. Referring to FIG. 14, the display unit 110 comprises a transmission display device (display) 210 such as a liquid crystal display device or the like, an optical modulator 240 composed of a liquid crystal or the like having a discrete pixel structure, a backlight source (light source means) 250, and two lenticular lenses 220 and 230 which are inserted between the display 210 and optical modulator 240 so that their generator directions are perpendicular to each other.

The display 210 displays a stereoscopic image (disparity images) having disparity or a normal two-dimensional image having no disparity. A region where the disparity images are displayed corresponds to the 3D window 111 shown in FIG. 13.

Reference numeral 260 denotes a display drive circuit for displaying an image on the display 210 on the basis of signals from an image processing means 270. The image processing means 270 outputs the size and position information of the 3D window 111 to a signal synthesis circuit 330.

The viewpoint information of an observer 280 detected by the viewpoint detection apparatus 120 is also output to the signal synthesis circuit 330.

The signal synthesis circuit 330 generates information for driving the optical modulator 240 on the basis of these two pieces of information, and outputs the generated information to an optical modulator drive circuit 320.

The optical modulator 240 is driven by the optical modulator drive circuit 320, and displays a checkered mask pattern on a region corresponding to a 3D window portion or a uniform gray scale pattern on a region corresponding to a two-dimensional image display portion on its display surface.

Reference numeral 280 denotes an observer of the display 210.

Figure 15:
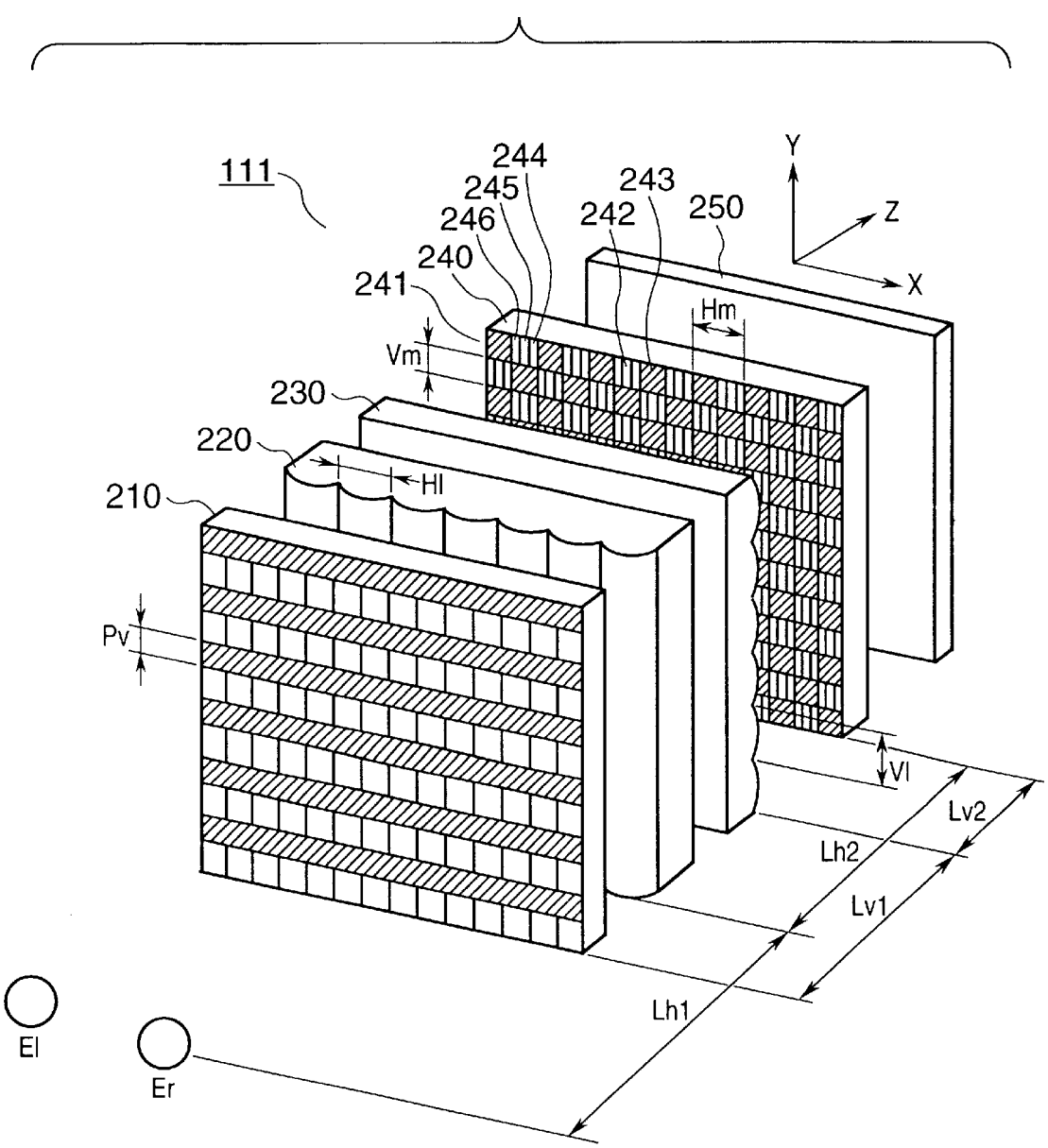
FIG. 15 is a schematic perspective view showing principal part of a display unit according to the sixth embodiment of the present invention.

FIG. 15 is a schematic perspective view of the 3D window 111.

Referring to FIG. 15, reference numeral 250 denotes a backlight source (light source means); and 240, an optical modulator having a discrete pixel structure. On the display surface of the optical modulator 240, a mask pattern 241 defined by transmitting portions (apertures) 242 that transmit light and intercepting portions 243 is formed.

Reference numeral 230 denotes a horizontal lenticular lens (horizontal cylindrical lens array) having a generator agreeing with a horizontal direction X, and constructed by aligning a large number of plano-convex, horizontal cylindrical lenses in a vertical direction Y. The lens curvature of the horizontal lenticular lens 230 is set so that the transmitting portions 242 and intercepting portions 243 of the mask pattern 241 are imaged on the image display surface of the display device 210. A lens pitch (width) Vl of the horizontal lenticular lens 230 is set to correspond to a value equal to or twice a width Vm of the transmitting portions 242 and intercepting portions 243 of the mask pattern 241 in the vertical direction. In this embodiment, Vl=2 Vm.

Reference numeral 220 denotes a vertical lenticular lens (vertical cylindrical lens array) having a generator agreeing with the vertical direction Y, and constructed by aligning a large number of plano-convex, vertical cylindrical lenses in the horizontal direction X. The lens curvature of the cylindrical lenses that construct the vertical lenticular lens 220 is set so that the mask pattern 241 is imaged at the observation position.

A horizontal pitch Hm of the transmitting portions 242 and intercepting portions 243 of the mask pattern 241 corresponds to one pitch (width) Hl of the vertical cylindrical lens of the vertical lenticular lens 220.

In FIG. 15, a cover glass, polarization plate, electrodes, and the like of the display device 210 and optical modulator 240 are not shown, and a display image on the display surface and mask pattern are schematically illustrated.

Reference symbols Er and El denote the right and left eyes of the image observer 280.

Figure 16:
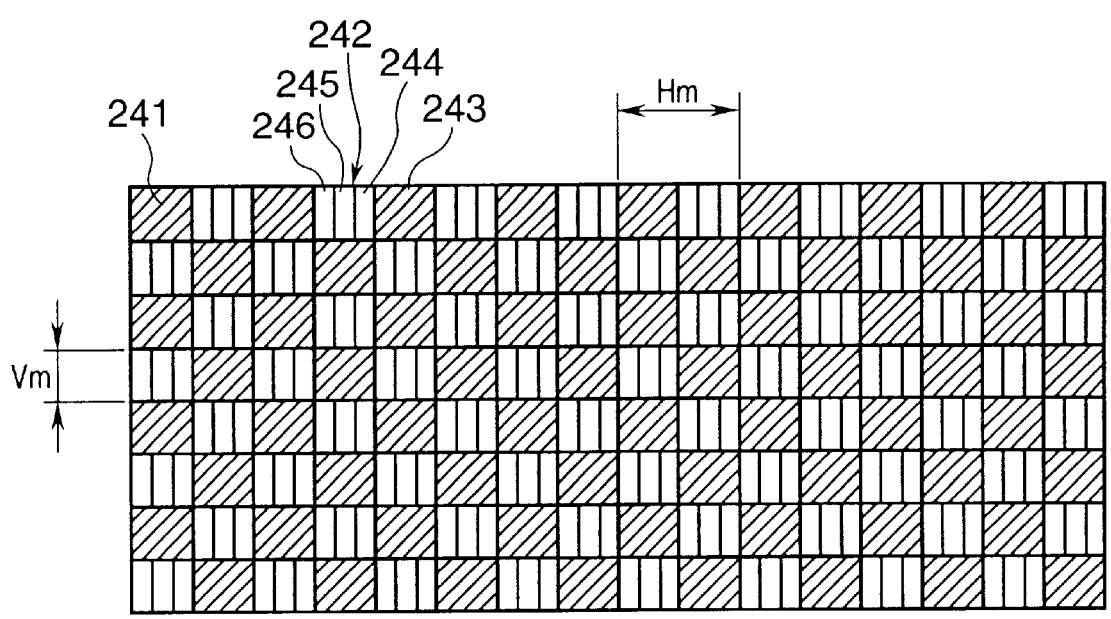
FIG. 16 is an explanatory view of a mask pattern according to the sixth embodiment of the present invention.

The mask pattern 241 which is to be displayed on the optical modulator 240 and is defined by the transmitting portions 242 and intercepting portions 243 will be described below with reference to FIG. 16. FIG. 16 is a front view of the mask pattern 241 shown in FIG. 15.

As shown in FIG. 16, the mask pattern 241 is defined by the transmitting portions 242 and intercepting portions 243 having the horizontal pitch Hm and vertical width Vm. Each transmitting portion 242 is composed of three pixels 244, 245, and 246, and each intercepting portion 243 is similarly composed of three pixels.

Figure 17:
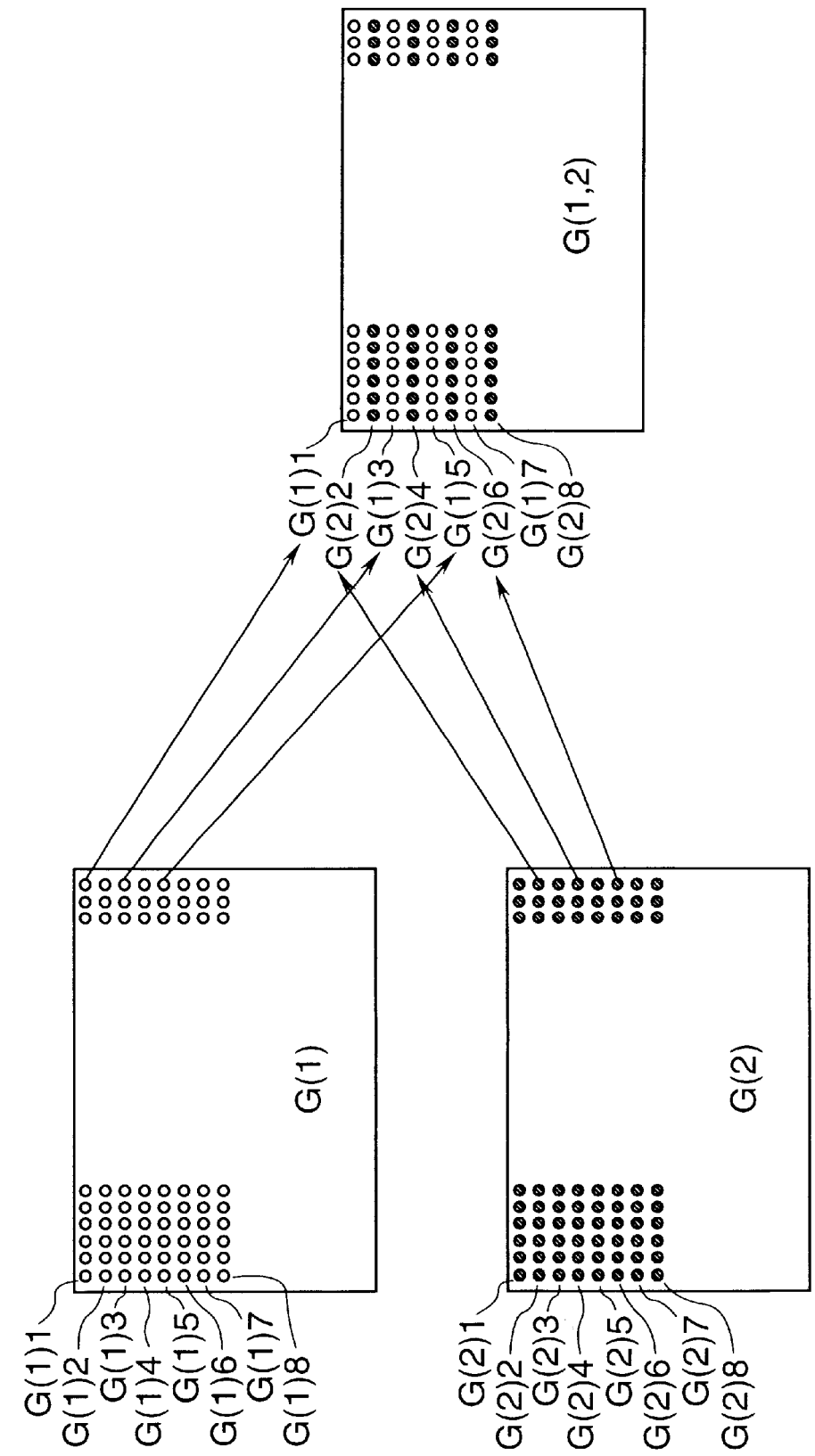
FIG. 17 is an explanatory view of disparity image synthesis according to the sixth embodiment of the present invention.

Disparity images to be displayed on the display device 210 will be explained below using FIG. 17. As shown in FIG. 17, two disparity images G(1) and G(2) corresponding to the right and left eyes are segmented into a large number of horizontal stripe images, and stripe images G(1)i and G(2)i as elements of the disparity images G(1) and G(2) are rearranged in units of scanning lines to form a synthesized disparity image G(1, 2).

The stereoscopic image display operation will be explained below with the aid of FIGS. 18 to 21.

Figure 18:
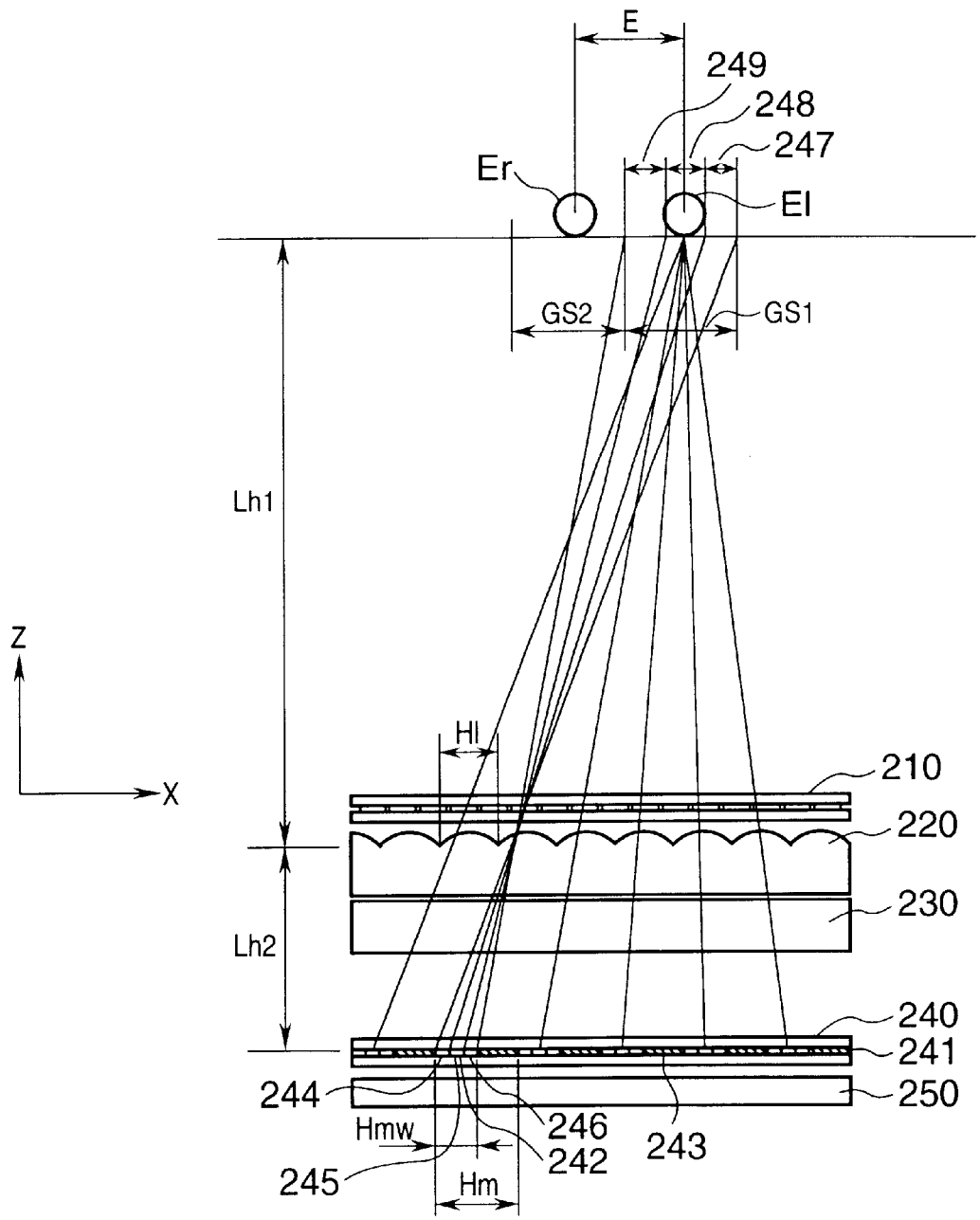
FIG. 18 is an explanatory view of an optical effect according to the sixth embodiment of the present invention.

FIG. 18 is a horizontal sectional view (X-Z section) of the 3D window 111.

Referring to FIG. 18, light emitted by the backlight source 250 emerges from the transmitting portions 242 of the mask pattern 241 of the optical modulator 240, and is transmitted through the horizontal lenticular lens 230 (the horizontal lenticular lens does not have any special optical effect in this sectional direction).

An irradiated disparity image region GS1 at the position of the observer is irradiated with the light beams coming from the transmitting portions 242 of the mask pattern 241 by the cylindrical lenses that construct the vertical lenticular lens 220.

The light beams with which the irradiated disparity image region GS1 is irradiated is modulated by a synthesized disparity image displayed on the display device 210 placed between the vertical lenticular lens 220 and the observer. In this section, for example, since light passes through stripe image elements G(1)1, G(1)3, G(1)5, . . . of the disparity image G(1) that forms the synthesized disparity image G(1, 2) shown in FIG. 17, the disparity image G(1) is observed on the irradiated disparity image region GS1.

Since each transmitting portion 242 of the mask pattern is comprised of the three pixels 244, 245, and 246, regions 247, 248, and 249 are respectively irradiated with light beams transmitted through the respective pixels.

Figure 19:
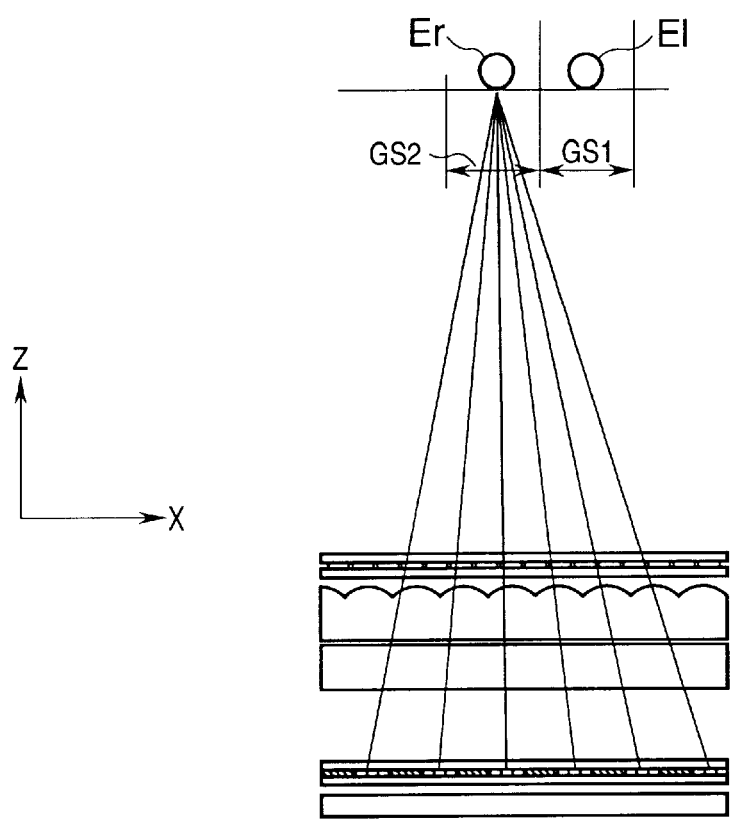
FIG. 19 is an explanatory view of an optical effect according to the sixth embodiment of the present invention.

Likewise, as shown in FIG. 19, an irradiated disparity image region GS2 is irradiated with light beams in a section corresponding to one scanning line below or above in FIG. 18. The light beams with which the irradiated disparity image region GS2 is irradiated are modulated by the synthesized disparity image displayed on the display device 210 placed between the vertical lenticular lens 220 and the observer. In this section, since light passes through stripe image elements G(2)2, G(2)4, G(2)6, . . . of the disparity image G(2) that forms the synthesized disparity image G(1, 2) shown in FIG. 17, the disparity image G(2) is observed on the irradiated disparity image region GS2. This region also consists of three partial regions.

Figure 20:
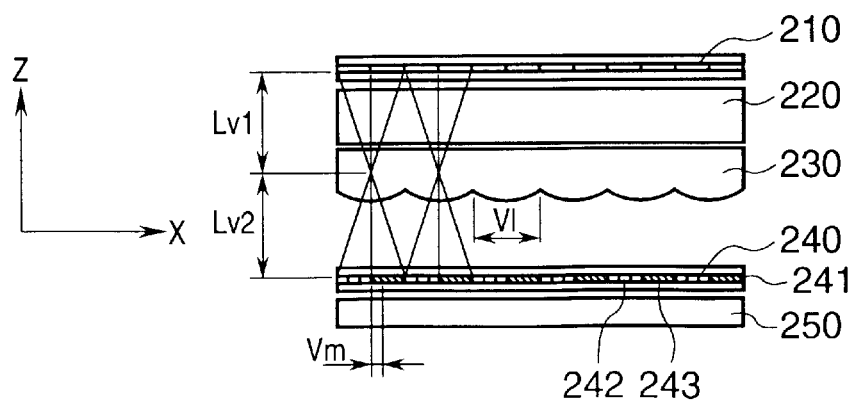
FIG. 20 is an explanatory view of an optical effect according to the sixth embodiment of the present invention.

FIG. 20 is a vertical sectional view (Y-Z section) of the window 111 for displaying a stereoscopic image. In this section, an image of each transmitting portion 242 of the mask pattern 241 irradiated with light emitted by the backlight source 250 is formed on the image display surface of the display device 210. In this case, the image is formed at a magnification at which the width of each transmitting portion 242 of the optical modulator 240 equals the pixel width of the display device 210. For this reason, by appropriately setting the positions of the optical modulator 240, display device 210, and horizontal lenticular lens 230, for example, only stripe image elements of the disparity image G(1) are irradiated with light.

Likewise, as shown in FIG. 21, in a horizontal pixel array in FIG. 20, only stripe image elements of the disparity image G(2) are irradiated with light.

Hence, when the disparity images G(2) and G(1) are set to be those corresponding to the eyeballs Er and El, and the eyeballs Er and El are placed on the irradiated disparity image regions GS2 and GS1, the observer separately and independently observes the disparity images with the right and left eyes, i.e., can observe a stereoscopic image.

Figure 22:
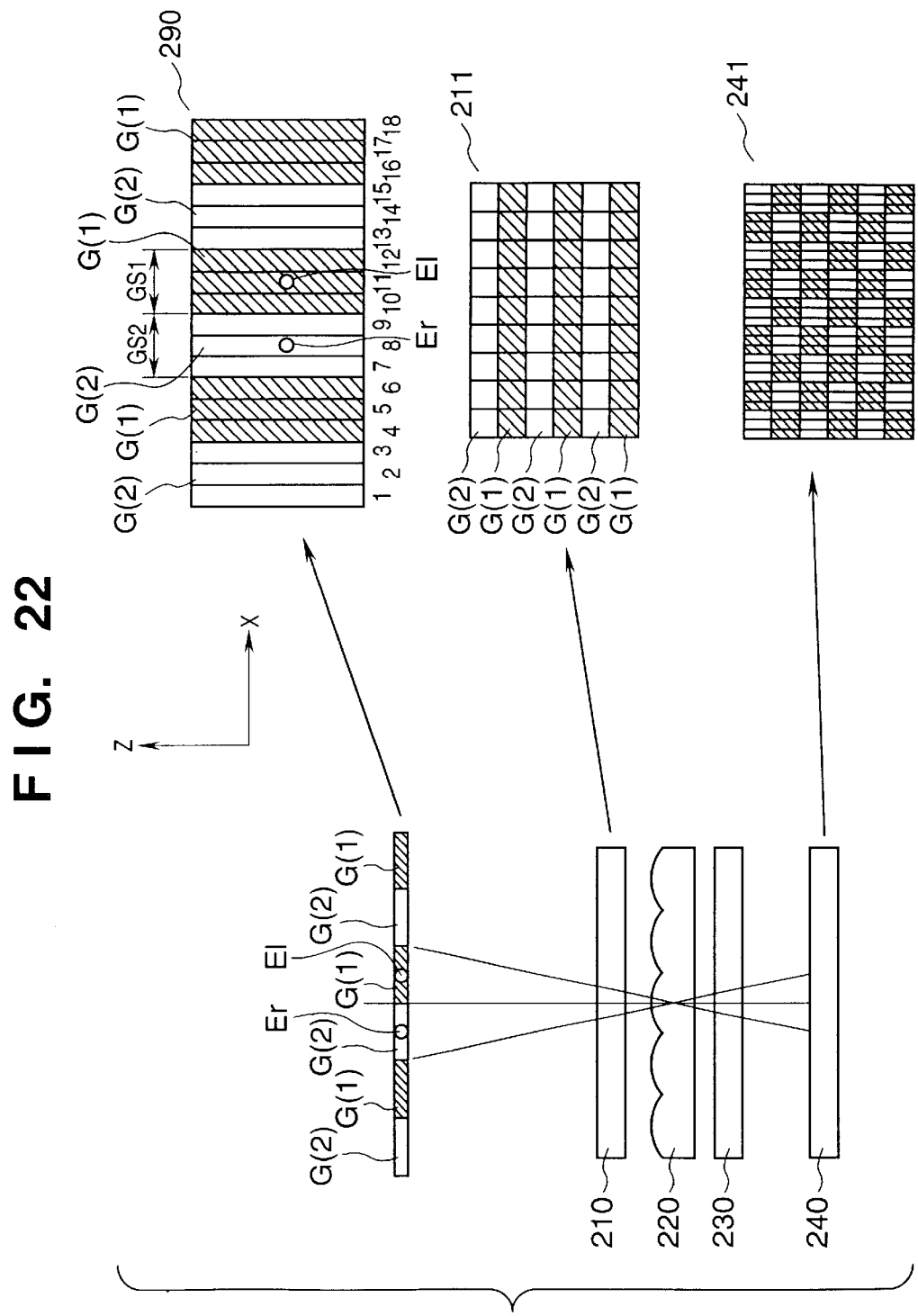
FIG. 22 is an explanatory view of the display method of a synthesized disparity image and mask pattern according to the sixth embodiment of the present invention.
Figure 23:
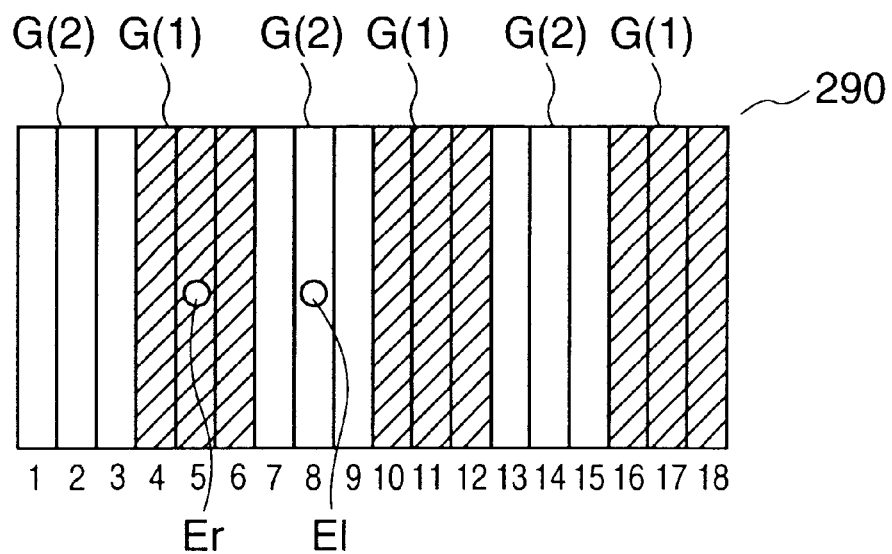
FIG. 23 is an explanatory view of the display method of a synthesized disparity image and mask pattern according to the sixth embodiment of the present invention.
Figure 24:
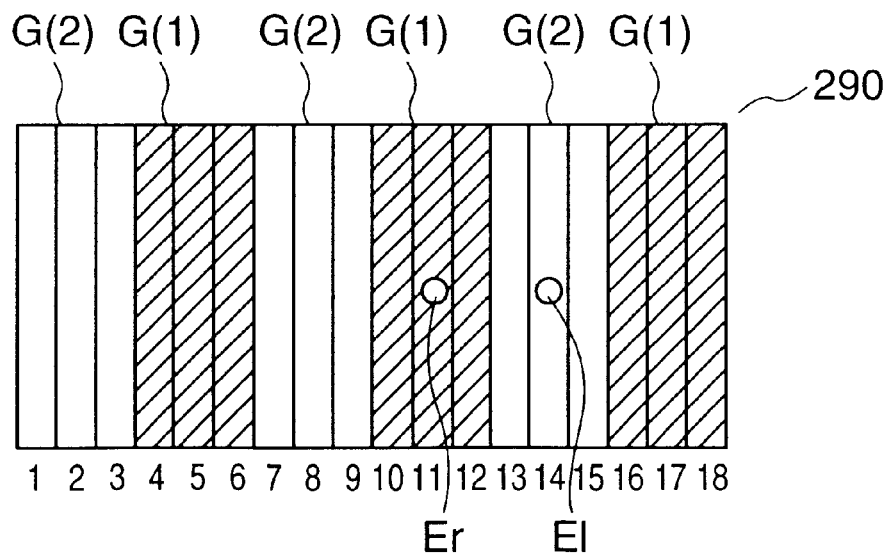
FIG. 24 is an explanatory view of the display method of a synthesized disparity image and mask pattern according to the sixth embodiment of the present invention.

FIGS. 22 to 24 are explanatory views for explaining the above operation.

Referring to FIG. 22, the left drawing illustrates principal part of the horizontal section (X-Z section) of the display, and the right drawing illustrates the mask pattern 241 of the optical modulator 240, a synthesized disparity image 211 displayed on the display device 210, and an irradiated disparity image 290 formed at the observer position.

The irradiated disparity image 290 consists of the disparity images G(1) and G(2), and FIG. 22 shows a state wherein the right and left eyeballs Er and El of the observer are located at the positions of the disparity images G(2) and G(1).

When the observer has moved from this state to the left, i.e., a state shown in FIG. 23, or to the right, i.e., a state shown in FIG. 24, that is, when the right and left eyes Er and El respectively observe the disparity images G1 and G2, the image is displayed in reversed stereo, and normal stereoscopic observation is disabled.

The building conditions of the optical system in the horizontal section (X-Z section) will be explained below using FIG. 18.

Note that this specification uses a converted distance as the distance between neighboring optical elements. That is, the converted distance is a so-called optical distance obtained by converting the distance between two optical elements into a value in air using, as reference points, the image display surface and mask pattern display surface of the display device 210 and optical modulator 240, or principal points of the sides from which the distances are to be measured of the lenticular lenses 220 and 230.

As shown in FIG. 18, let Lh2 be the distance between the vertical lenticular lens 220 and mask pattern 241 (the optical spacing obtained by converting the distance between the principal point of the vertical lenticular lens 220 on the mask pattern side, and the mask pattern 241 into a value in air), Lh1 be the distance from a predetermined observation position to the vertical lenticular lens 220 (the optical spacing obtained by converting the distance between the observation position and the principal point of the vertical lenticular lens on the observer side into a value in air), Hmw be the horizontal width of each transmitting potion 242 of the mask pattern 241, Hm be the horizontal pitch to the neighboring transmitting portion, Hl be the pitch (width) of the vertical cylindrical lenses that construct the vertical lenticular lens 220, and E be the spacing between the right and left eyes of the observer. Then, these parameters are set to satisfy:

$$2 \times E/Hm = Lh1/Lh2 \quad (1)$$

$$Lh1/(Lh1+Lh2) = Hl/Hm \quad (2)$$

$$2 \times Hmw = Hm \quad (3)$$

Next, a function that allows the observer to always observe a normal stereoscopic image without switching to reversed stereo even when the viewpoint of the observer has changed will be explained below.

In the explanation given so far, an image can be produced in normal stereo when the right and left eyes of the observer fall within the regions where the disparity images corresponding to these eyes are formed. However, when the eyes fall outside these regions, an image in reversed stereo is produced, and an image in normal stereo cannot be produced.

To solve this problem, in the sixth embodiment, as shown in the system block diagram in FIG. 14, the optical modulator drive circuit 320 changes the mask pattern 241 to be displayed on the optical modulator 240 in correspondence with the viewpoint upon receiving the viewpoint information of the observer 280 obtained by the viewpoint detection apparatus 120.

When the viewpoint detection apparatus 120 (to be described in detail later) can successfully obtain viewpoint information, even when the observation position of the observer has changed, the irradiated disparity image regions are controlled to track the changed viewpoints, and a normal stereoscopic image can always be observed without switching to reversed stereo.

This operation will be explained below with reference to FIGS. 25 to 28.

FIG. 25 illustrates the same state as that in FIG. 22. That is, the right and left eyes Er and El respectively observe the disparity images G(2) and G(1), i.e., an image is formed in normal stereo.

At this time, the right and left eyes are located at positions 11 and 8 of the irradiated disparity image 290. When the observer has moved from this state, i.e., when the right and left eyes fall within the left neighboring regions of the three partial regions of the images G(2) and G(1) (positions 10 and 7 of the irradiated disparity image 290), as shown in FIG. 26, the transmitting portions 242 of the mask pattern 241 are moved to the left by one pixel, as shown in FIG. 26, while the synthesized disparity image 211 on the display remains the same. With this movement, the irradiated disparity image 290 moves to the left by a region corresponding to one pixel.

With this control, the observer remains watching the central partial regions of the disparity images G(2) and G(1)

although he or she has moved to the left neighboring regions of the three partial regions of the disparity images G(2) and G(1).

When the observer has moved to the right and the right and left eyes are located at positions 12 and 9 of the irradiated disparity image, as shown in FIG. 27, the transmitting portions 242 of the mask pattern 241 are moved to the right by one pixel, as shown in FIG. 27, while the synthesized disparity image 211 on the display remains the same, thus moving the irradiated disparity image 290 to the right by a region corresponding to one pixel. In the state shown in FIG. 28 wherein the observer has further moved to the right from the state shown in FIG. 27, the mask pattern 241 is further moved by one pixel, as shown in FIG. 28, while the synthesized disparity image 211 remains the same, thus further moving the irradiated disparity image 290 to the right by a region corresponding to one pixel.

The same control is made for the right and left movements of the observer.

As described above, when the synthesized disparity image obtained by synthesizing two original disparity images is used, and the corresponding irradiated disparity image regions are controlled to match the right and left eye positions by switching and displaying the mask pattern in correspondence with the viewpoint position, a stereoscopic image can be stably observed without switching to reversed stereo.

In the above description, the number n of pixels forming each of the transmitting and intercepting portions of the mask pattern is 3. But, the same applies to a case wherein n≧4.

The viewpoint detection apparatus (eyeball detection mechanism) 120 for detecting the viewpoint position of the observer will be explained below with reference to FIGS. 29 to 33.

Figure 29:
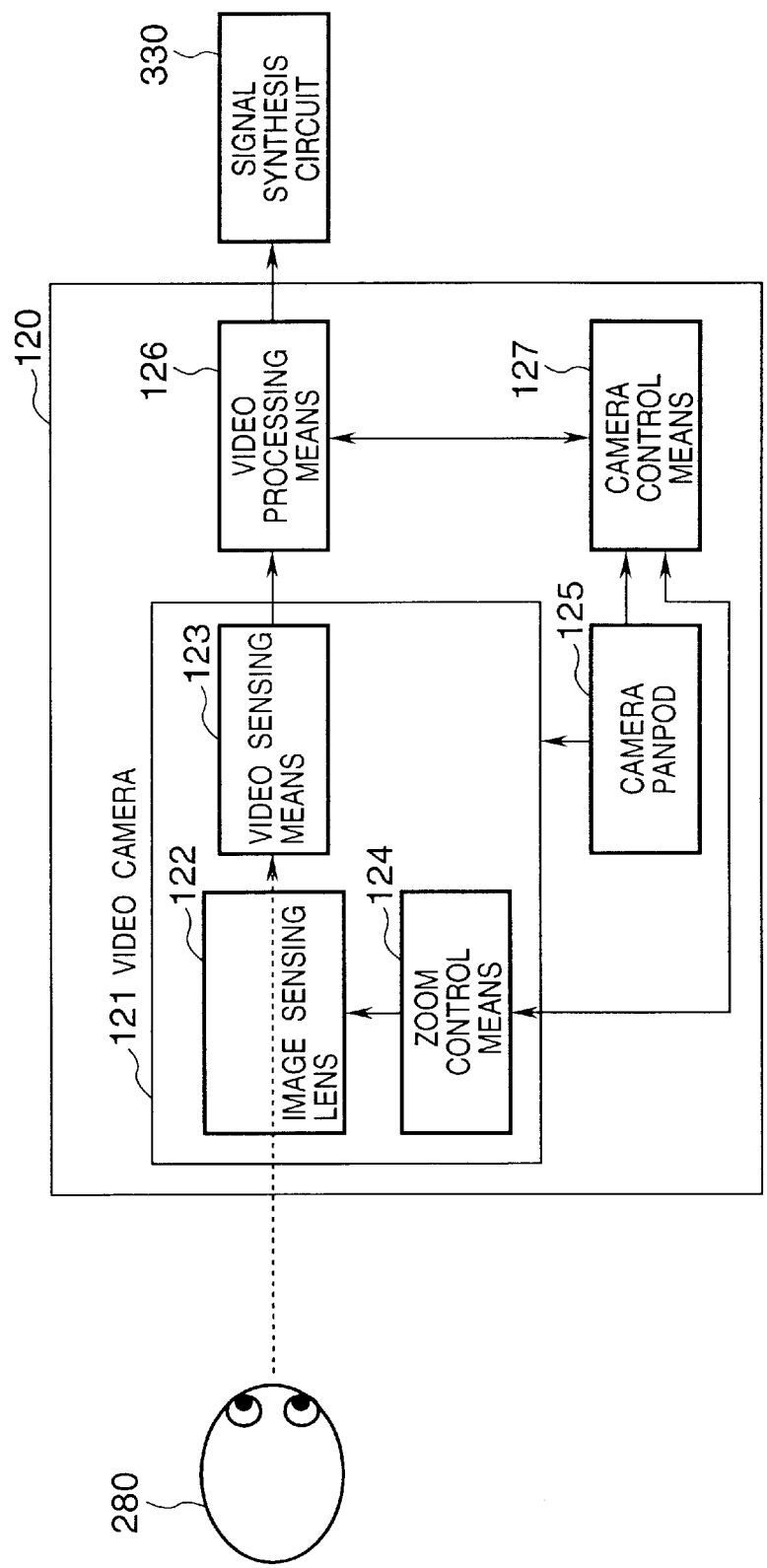
FIG. 29 is a system block diagram of a viewpoint detection apparatus according to the sixth embodiment of the present invention.

The viewpoint position must be obtained by detecting the eye positions of the observer with sufficiently high positional precision required for the tracking control. FIG. 29 is a system block diagram of the viewpoint detection apparatus 120. Referring to FIG. 29, reference numeral 120 denotes the overall viewpoint detection apparatus; and 121, a video camera (image sensing means) for sensing an image of the observer. The video camera 121 comprises an image sensing lens 122, a video sensing means 123 including an image sensing sensor such as a CCD or the like, and the like.

The image sensing lens 122 comprises a zoom lens, the focal length of which is controlled by a zoom control means 124. The zoom control means 124 is controlled by an external control signal, and externally outputs lens information such as focal length information of the image sensing lens and the like.

Reference numeral 125 denotes a panpod of the video camera 121, which has a control means for panning and tilting the video camera 121, and also has a means for outputting information of the pan and tilt positions of the camera.

Reference numeral 127 denotes a camera control means which exchanges information with a video processing means 126 to control camera operations.

Reference numeral 126 denotes a video processing means which executes image processing required for viewpoint detection on the basis of video information from the video sensing means 123 and information from the camera control means 127, and generates information for controlling the zoom lens 122 and panning/tilting the video camera 121 as needed. The viewpoint information obtained by the video processing means 126 is sent to the signal synthesis circuit 330 shown in FIG. 14.

The operation of the viewpoint detection apparatus 120 will be explained below.

Since the video camera 121 is set to capture an image in front of the display, as shown in FIG. 13, it normally senses an image of the face of the observer while the observer is observing the display.

On the other hand, when the observer is not in front of the display, and the face information of the observer is not sensed, the focal length of the image sensing lens 122 is automatically set at a short focal point side, as will be explained later. Hence, if the face of the observer is present within the limited range of the camera on the short focal point side, the image of the observer including the face can be sensed.

Figure 30:
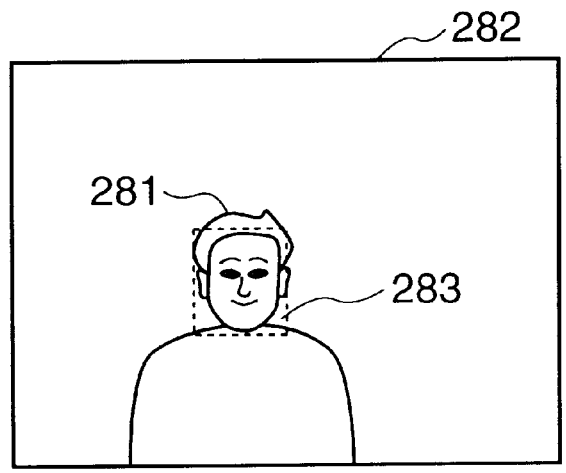
FIG. 30 shows a screen that displays an image of the observer at the near focal point side according to the sixth embodiment of the present invention.

FIG. 30 shows an image 281 of the observer 280 which is sensed by the video camera 121 when the image sensing lens 122 is set at the short focal point side. Reference numeral 282 denotes a sensed frame.

When the viewpoints, i.e., the two eye positions of the observer can be detected from the face image shown in FIG. 30 with sufficiently high precision required for stereovision control, the objective is achieved. However, for this purpose, when a CCD is used as the image sensing element, an element having a large number of pixels is required and is expensive. Also, in order to directly detect the eye positions from video information with a large information size obtained from the image sensing elements having a large number of pixels, image processing requires much time, and such method is not practical.

For this reason, the apparatus of this embodiment uses a known "method of extracting a feature region using color information" for the face image shown in FIG. 30, and the video processing means 126 detects the face position of the observer on the basis of flesh tone information set in advance.

Reference numeral 283 in FIG. 30 denotes a face region detected by this method.

The video processing means 126 supplies control signals to the zoom control means 124 and camera panpod 125 via the camera control means on the basis of the central position and size information of the detected face region 283, so that this face region is displayed at the center of the screen with a predetermined size, thereby panning/tilting the camera.

Figure 31:
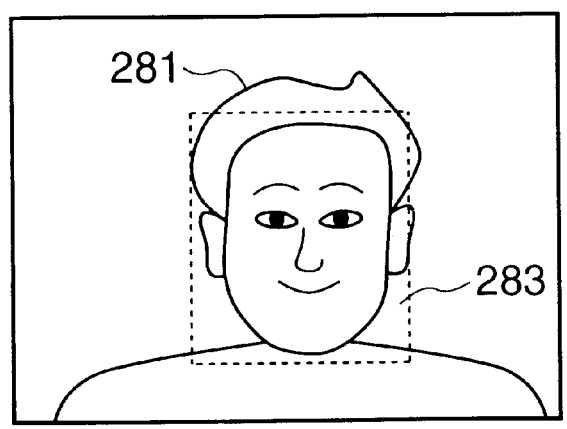
FIG. 31 shows a screen that displays an image of the observer at a prescribed focal point according to the sixth embodiment of the present invention.

FIG. 31 shows the face image of the observer sensed by the camera as a result of the above processes.

After that, while the observer is observing the display, control is made to locate the face region at the center of the frame 282 with a predetermined size.

When the observer has moved largely to fall outside the frame, or when the observer has moved faster than a prescribed speed, and face region detection has failed, the image sensing lens is set at the short focal length side, and a face region search at the short focal length side is redone.

Figure 32:
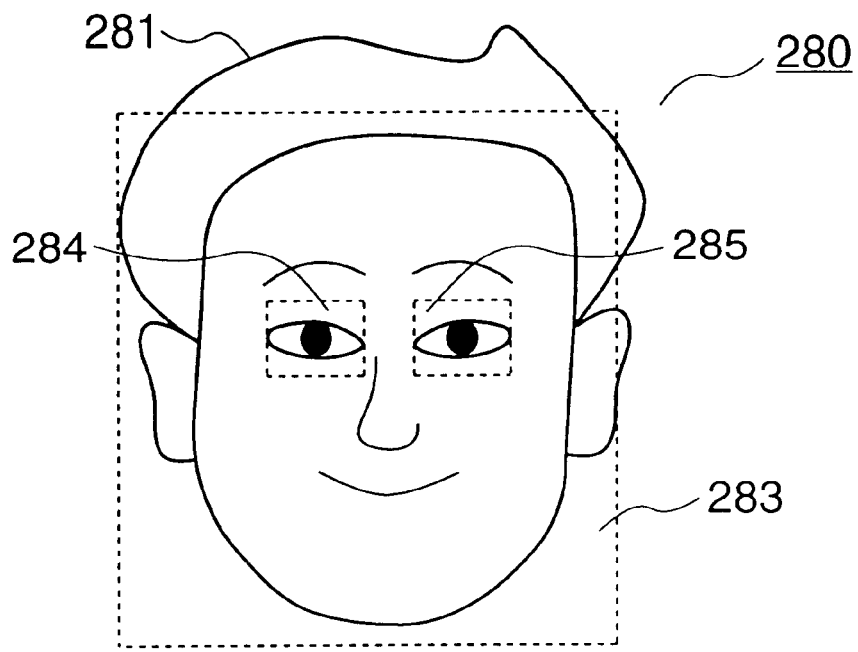
FIG. 32 is an enlarged view of the face region according to the sixth embodiment of the present invention.

FIG. 32 is a partial enlarged view of FIG. 31.

Next, the video processing means having a function exploiting known "pattern matching" detects information of the two eye positions in this face region 283.

Figure 33:
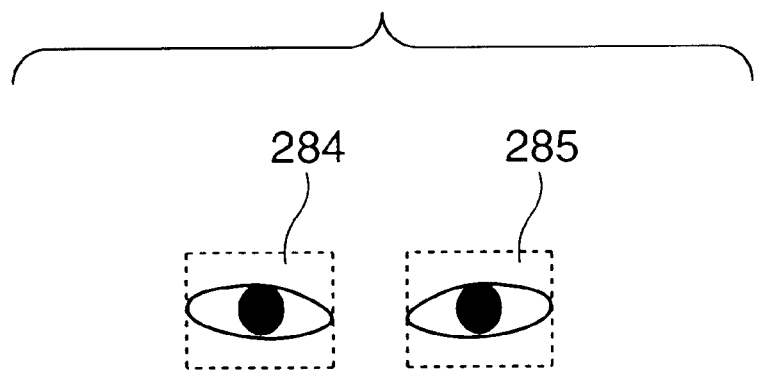
FIG. 33 is an explanatory view of templates of eyes according to the sixth embodiment of the present invention.

FIG. 33 shows templates of the right and left eyes, which are building components of the video processing means. Reference numerals 284 and 285 denote templates for the right and left eyes. These templates 284 and 285 use the images of the two eyes of the observer 280 himself or herself, which are sensed in advance, or images of standard eyes.

Using these templates, matching is executed in the face region 283 shown in FIG. 32 to detect the positions of the two eyes.

FIG. 32 shows the detected state of the two eye positions. In this case, a search for the two eyes is independently made for each eye with a certain degree of freedom, thus absorbing variations in spacing between the two eyes depending on observers and deviations of the two eye positions upon movement of the viewpoints in the back-and-forth direction.

When the eye positions are obtained by search, position information of each eye on the frame 282 is obtained in accordance with movement of the observer by tracking using the eye templates 284 and 285 on the basis of the known "pattern matching".

The viewpoint information with respect to the display is calculated on the basis of the detected information of the two eye positions on the frame 282 and pan/tilt information of the camera from the camera control means 127, and is sent to the signal synthesis circuit 330.

Note that the ranges of the eye templates 284 and 285 may be set to cover the entire eyes including neighboring portions of the eyes, as shown in FIG. 33, or may be set to cover partial regions of the eyes, e.g., the irises of the eyes.

Seventh Embodiment

The sixth embodiment of the present invention is directed to an image display apparatus which allows normal stereo from a broad observation region using a pair of right and left disparity images.

By contrast, the seventh embodiment uses two disparity images to be simultaneously displayed as in the sixth embodiment, but provides a stereoscopic image display apparatus which can attain so-called tracking display, and can always produce an image in normal stereo without switching to reversed stereo, in correspondence with the viewpoint positions of the observer using a large number of disparity images sensed under prescribed image sensing conditions.

The stereoscopic image display apparatus of the seventh embodiment will be explained below using FIGS. 34 and 42. The differences from the sixth embodiment will be mainly described.

In this embodiment, the outer appearance, the system block diagram, the 3D window schematic arrangement, and the front view of the mask pattern are the same as those shown in FIGS. 13, 14, 15, and 16.

FIG. 34 is an explanatory view of a disparity image synthesis method used in the seventh embodiment.

As has been described in the sixth embodiment, each of the transmitting and intercepting portions of the mask pattern consists of n pixels, and two disparity images g(i) and g(i+n) corresponding to the right and left eyes are divided into a large number of horizontal stripe images. Stripe images g(i)i and g(i+n)i obtained from the disparity images g(i) and g(i+n) are rearranged in units of scanning lines to obtain a synthesized disparity image g(i, i+n).

Original disparity images g(i) and g(i+n) to be used in synthesis are prepared as follows.

FIGS. 35(A) and 35(B) are explanatory views of a method of generating original disparity images using, e.g., a plurality of video cameras (the same applies to preparation of disparity images by means of CG).

In general, disparity images used in a binocular disparity type stereoscopic display apparatus use images sensed by setting the optical axes of two cameras G1 and G2 parallel to each other to be separated a distance corresponding to the spacing (inter-eye distance) between the two eyes of human being, as shown in FIG. 35(A). In case of a still image, images may be sensed by translating a single camera.

Note that the distance between the optical axes of the camera or the translation distance is appropriately set on the basis of conditions such as the size of a display screen, the distance from the observer, the magnification between a real object and displayed image, and the like.

When E represents the distance between the cameras used upon sensing original disparity images used in the sixth embodiment, a plurality of images g(1), g(2), g(3), . . . sensed at the distance between the cameras, which is equal to $(1/n)*E$, are used as original disparity images in the seventh embodiment, as shown in FIG. 35(B).

In the following description, a case of n=3 will be explained for the sake of simplicity. The viewpoint information to be used is detected by the method described in the sixth embodiment.

The stereoscopic image display operation is substantially the same as that shown in FIGS. 18 to 21 in the sixth embodiment, except for the shape of the mask pattern 241 displayed on the optical modulator 240 and the contents of the synthesized disparity image displayed on the display 210. Hence, the state corresponding to FIG. 22 in the sixth embodiment is as shown in FIG. 36. Referring to FIG. 36, the left drawing illustrates principal part of the horizontal section of the display, and the right drawing illustrates a synthesized disparity image 211 to be displayed on the display device 210, and an irradiated disparity image 290 formed at the observer position. The irradiated disparity image 290 consists of disparity images g(i) and g(i+3), and FIG. 36 illustrates the state wherein the right and left eyes Er and El of the observer are respectively located at the positions of disparity images g(i+3) and g(i).

Figure 37:
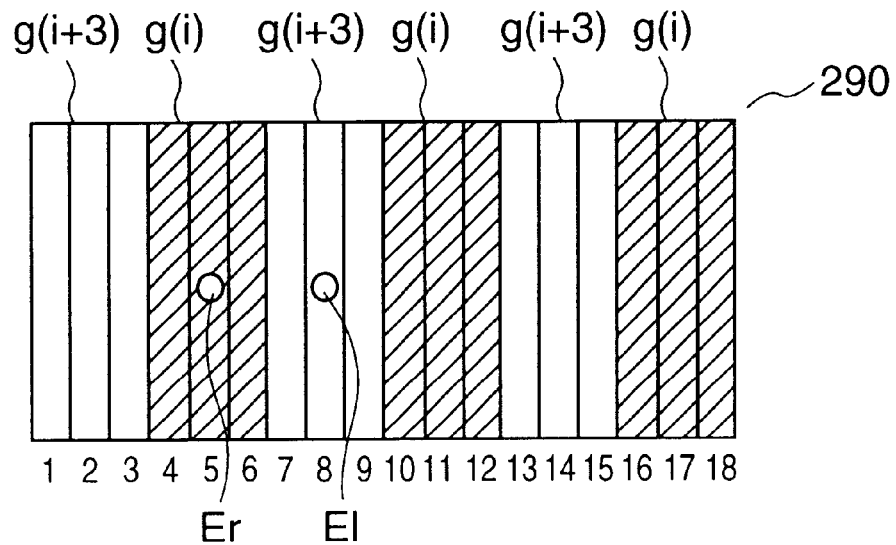
FIG. 37 is an explanatory view of the display method of a synthesized disparity image and mask pattern according to the seventh embodiment of the present invention.
Figure 38:
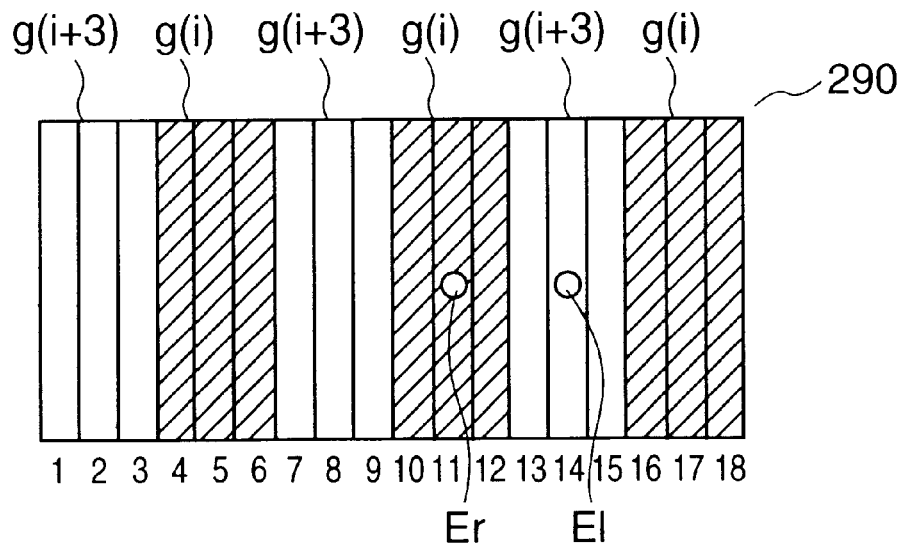
FIG. 38 is an explanatory view of the display method of a synthesized disparity image and mask pattern according to the seventh embodiment of the present invention.

When the observer has moved from this state to the left, i.e., to the state shown in FIG. 37 or to the right, i.e., to the state shown in FIG. 38, i.e., when the disparity images g(i) and g(i+3) are respectively observed by the right and left eyes, an image in reversed stereo is produced, and normal stereoscopic observation is disabled.

A so-called tracking display function which always allows the observer to observe a normal stereoscopic image without switching to any reversed stereo even when the viewpoint position of the observer has changed, and allows the observer to observe a stereoscopic image whose viewpoint changes in correspondence with movement of the observer will be explained below with reference to FIGS. 39 to 42.

FIG. 39 illustrates the same state as that in FIG. 36. In this state, the right and left eyes respectively observe disparity images g(i+3) and g(i), as described above, and an image is formed in normal stereo.

When the observer has moved from a state wherein the right and left eyes are respectively located at positions 11 and 8 of the irradiated disparity image 290, e.g., when the right and left eyes fall within left neighboring regions 10 and 7 of three partial regions, as shown in FIG. 40, images g(i+4) and g(i+1) are displayed on lines where the disparity images g(i+3) and g(i) were displayed as the synthesized disparity image 211 on the display, and the transmitting portions 242 of the mask pattern 241 are moved by one pixel to the left, as shown in FIG. 40. In this manner, the disparity images g(i+4) and g(i+1) are displayed on the irradiated disparity image 290, as shown in FIG. 40.

With this control, the observer sees the images g(i+4) and g(i+1) by the right and left images, i.e., can observe an image whose viewpoint has changed in normal stereo.

On the other hand, when the observer has moved to the right and the right and left eyes are located at positions 12 and 9 of the irradiated disparity image 290, as shown in FIG.

41, images (i+2) and g(i−1) are displayed as the synthesized disparity image 211 on the display, and the transmitting portions of the mask pattern 241 are moved by one pixel to the right, thus displaying images g(i+2) and g(i−1) at the corresponding positions of the irradiated disparity image 290, as shown in FIG. 41. When the observer has moved further to the right, as shown in FIG. 42, images g(i+1) and g(i−2) are displayed as the synthesized disparity image 211, and the mask pattern 241 is switched to the illustrated state, thus displaying the disparity images g(i+1) and g(i−2) at the illustrated positions of the irradiated disparity image 290. The same control is made in correspondence with the right and left movements of the observer.

As described above, since a large number of disparity images are used, and the synthesized disparity image to be displayed on the display, and the mask pattern are switched and displayed in correspondence with the viewpoint, stereoscopic observation that allows tracking display without switching to reversed stereo can be achieved.

In the above description, the number of disparity images to be displayed at the same time is 2, and each of the transmitting and intercepting portions of the mask pattern consists of three pixels. However, even when three or more disparity images are used and each of the transmitting and intercepting portions consists of four or more pixels, the same function can be accomplished by appropriately setting the apparatus arrangement and control method.

Eighth Embodiment

The eighth embodiment is a modification for achieving the same effects as those in the seventh embodiment.

Figure 43:
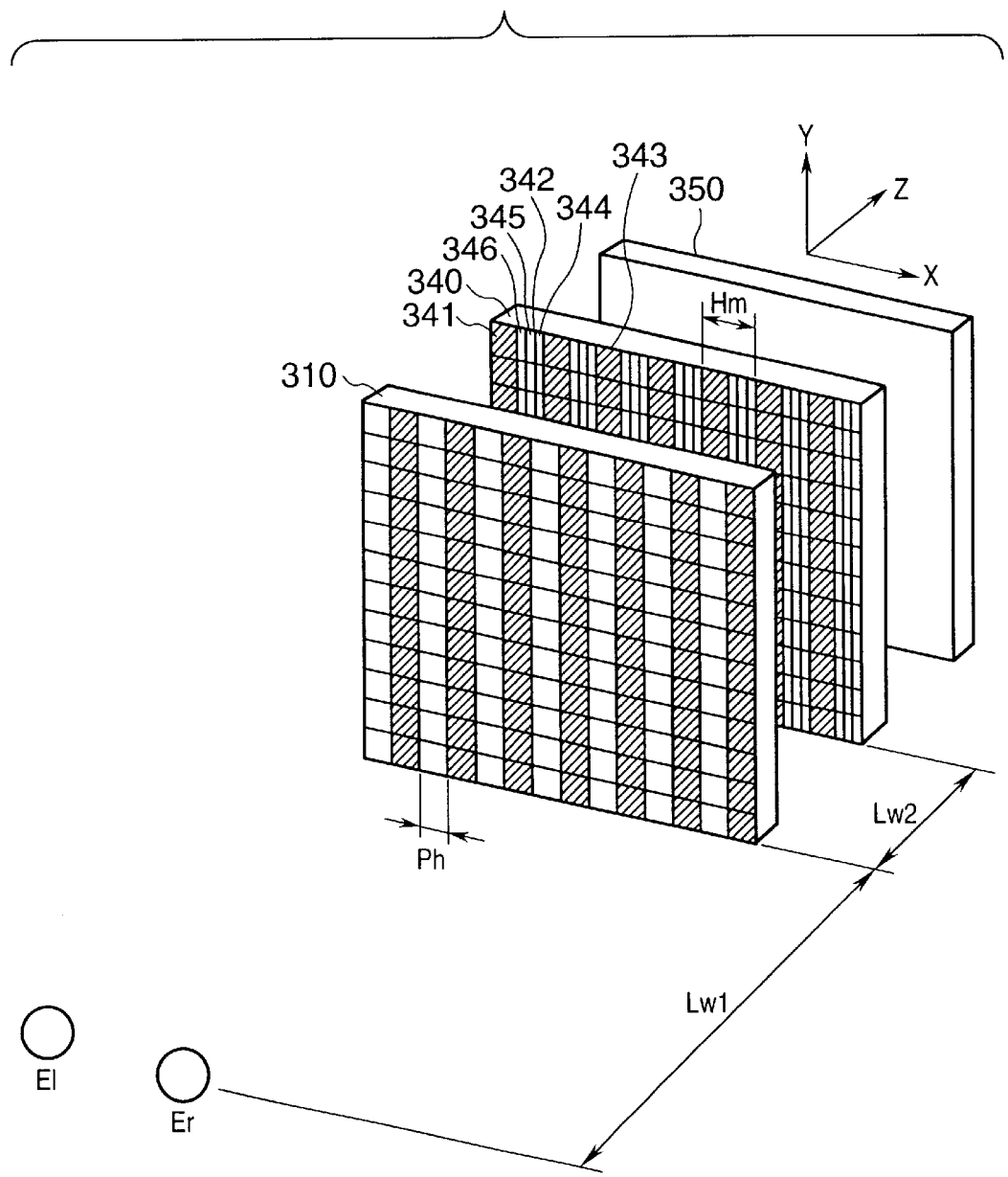
FIG. 43 is a schematic perspective view of a display unit according to the eighth embodiment of the present invention.

FIG. 43 is a schematic perspective view showing principal part of a 3D window of the eighth embodiment.

Referring to FIG. 43, reference numeral 350 denotes a backlight source (light source means); and 340, an optical modulator having a discrete pixel structure. On the display surface of the optical modulator 340, a mask pattern 341 defined by slit-like transmitting portions 342 and intercepting portions 343 is formed. Each transmitting portion 342 consists of three pixels 344, 345, and 346, and each intercepting portion 343 similarly consists of three pixels.

Reference numeral 310 denotes a display device which comprises, e.g., a liquid crystal display panel, and displays, on its display surface, vertical stripe disparity images corresponding to the right and left eyes.

In case of the eighth embodiment, when the display device 310 is a color liquid crystal display panel, r, g, and b color filters for color display having a horizontal stripe shape are used in consideration of normal color balance of the displayed image.

Note that a cover glass, polarization plate, electrodes, and the like of the display device 310 and optical modulator 340 are not shown, and the display image on the display surface and mask pattern are schematically illustrated. Reference symbols Er and El denote the right and left eyes of the image observer.

The mask pattern 341 which consists of transmitting and intercepting portions to be displayed on the optical modulator 340 will be explained below with reference to FIG. 44.

Figure 44:
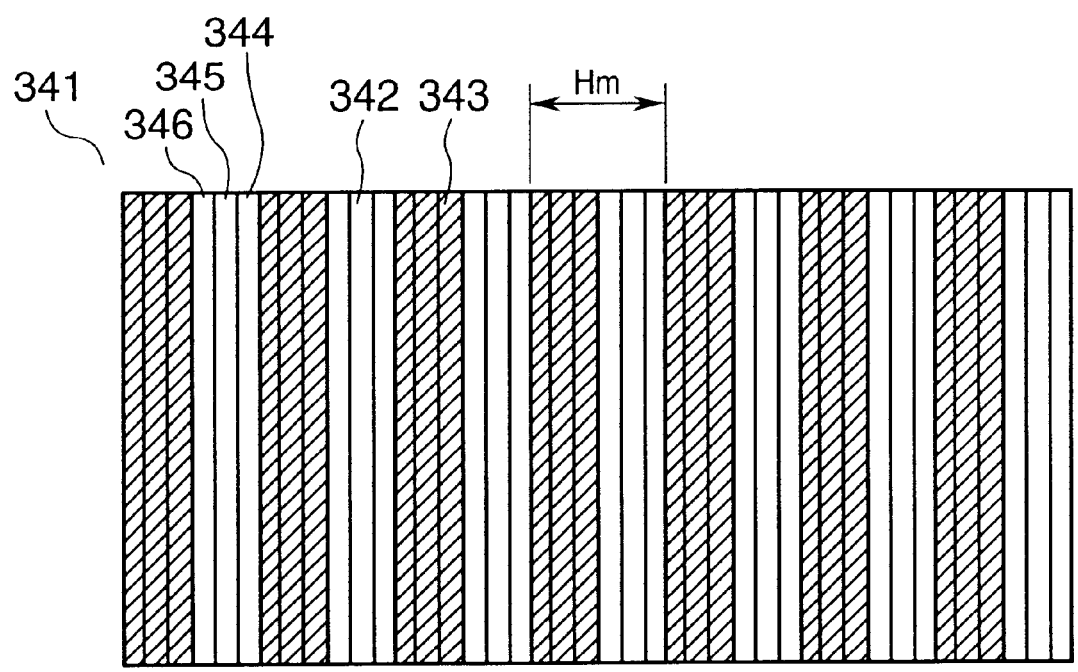
FIG. 44 is an explanatory view of a mask pattern according to the eighth embodiment of the present invention.

FIG. 44 is a front view of the mask pattern 341 shown in FIG. 43.

As shown in FIG. 44, the mask pattern 341 is formed by the transmitting options 342 and intercepting portions 343 having a horizontal pitch Hm. Each transmitting portion 342 is composed of three partial stripes 344, 345, and 346 each having one pixel width, and each intercepting portion 343 is also composed of three stripes. A method of synthesizing disparity images to be displayed on the display device 310 will be described below with reference to FIG. 45.

Figure 45:
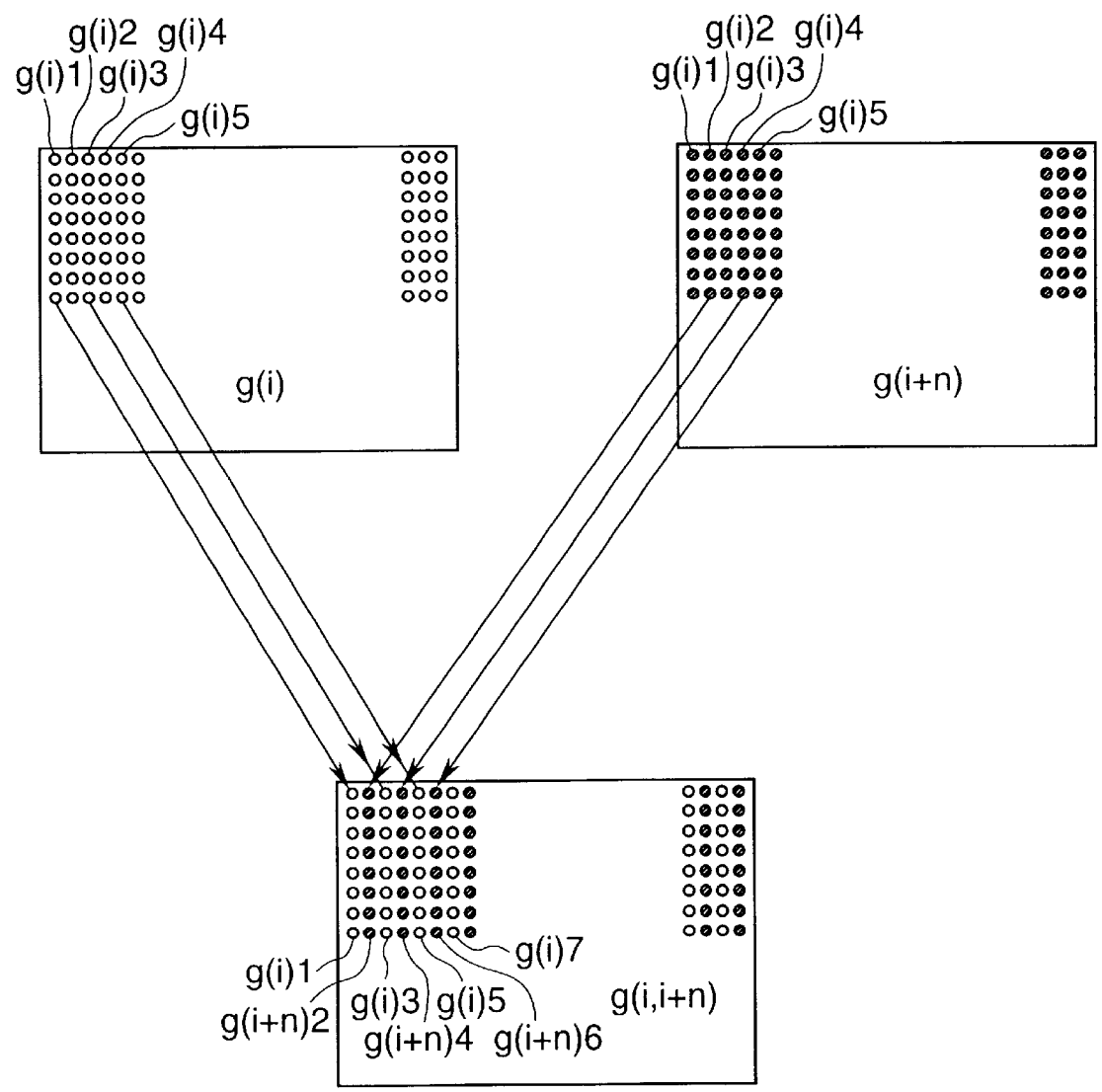
FIG. 45 is an explanatory view of disparity image synthesis according to the eighth embodiment of the present invention.

Referring to FIG. 45, two disparity images g(i) and g(i+n) corresponding to the right and left eyes are segmented into a large number of vertical stripe images, and a synthesized disparity image g(i, j+n) is obtained by rearranging stripe images g(i)j and g(i+n)j obtained from the disparity images g(i) and g(i+n) in units of scanning lines. Note that original disparity images g(i) and g(i+n) to be synthesized use those described in the seventh embodiment.

The stereoscopic image display operation will be explained below using FIG. 46.

Figure 46:
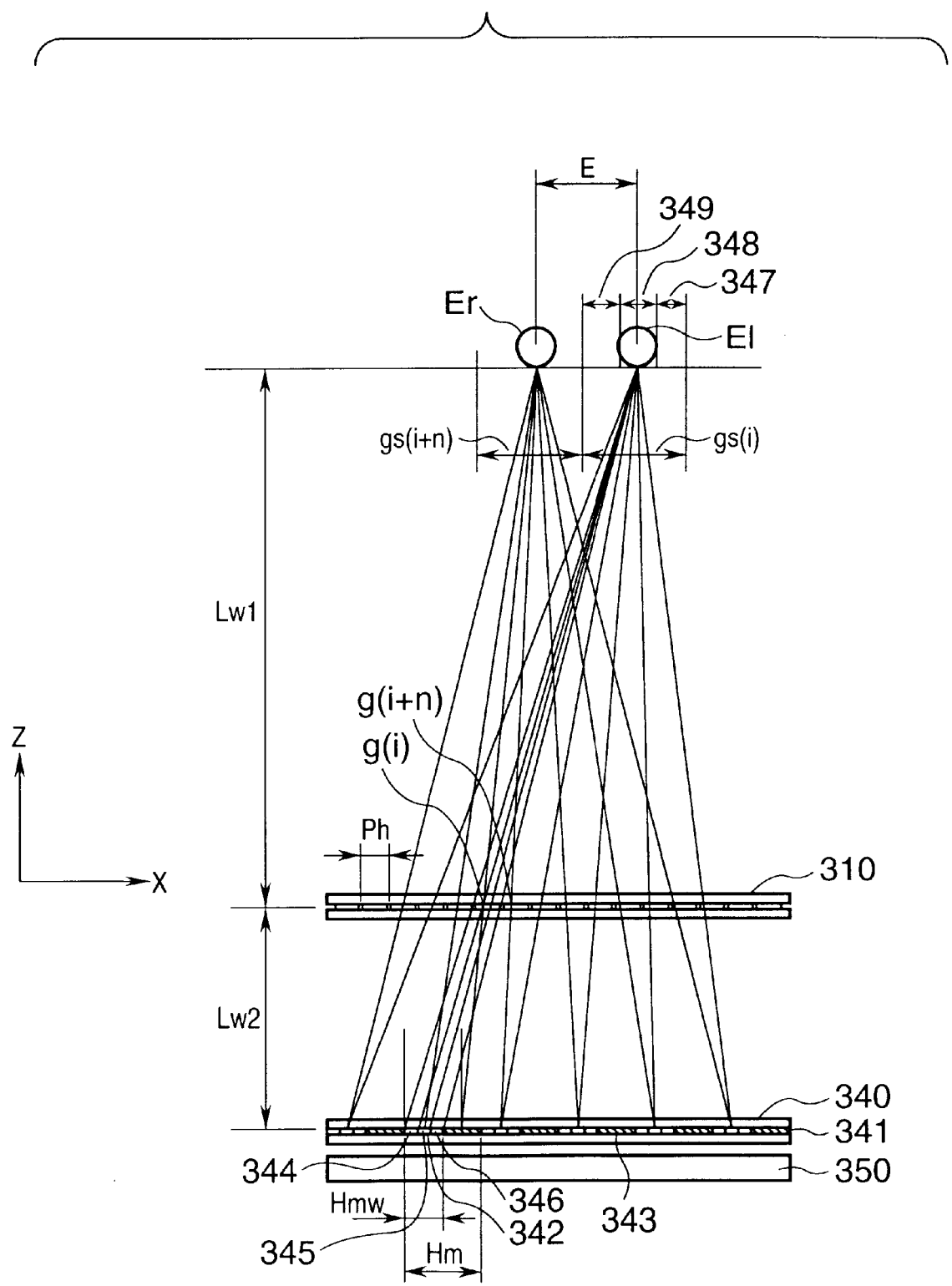
FIG. 46 is an explanatory view of an optical effect according to the eighth embodiment of the present invention.

FIG. 46 is a horizontal sectional view of the 3D window.

Referring to FIG. 46, light emitted by the backlight source 350 emerges from the transmitting portions 342 of the mask pattern 341 on the optical modulator 340, and irradiated disparity image regions gs(i) and gs(i+n) are irradiated with the light at the position of the observer.

The light beam with which the region gs(i) is irradiated is modulated by the synthesized disparity image displayed on the display device 310, which is placed between the optical modulator 340 and the observer. In the state shown in FIG. 46, since light passes through linear stripe images g(i)1, g(i)3, g(i)5, . . . synthesized from the disparity image g(i) shown in FIG. 45, the disparity image g(i) is observed in the region gs(i).

Since each transmitting portion 342 is composed of the three pixels 344, 345, and 346, partial regions 347, 348, and 349 are respectively irradiated with light beams transmitted through these pixels.

Likewise, the light beam with which the region gs(i+n) is irradiated is modulated by the synthesized disparity image displayed on the display device 310, which is placed between the optical modulator 340 and the observer. In this case, since light passes through linear stripe images g(i+n)2, g(i+n)4, g(i+n)6, . . . synthesized from the disparity image g(i+n) shown in FIG. 45, the disparity image g(i+n) is observed in the region gs(i+n).

Therefore, when the disparity images g(i) and g(i+n) are set to be those corresponding to the eyeballs El and Er, and the two eyes are placed in these regions, the observer separately and independently observes the disparity images with the right and left eyes, i.e., can observe a stereoscopic image.

The building conditions of the optical system in the horizontal section will be explained below with reference to FIG. 46.

As shown in FIG. 46, let Lw2 be the distance between the mask pattern 341 and display device 310, Lw1 be the distance from the predetermined observation position to the display device 310, Hmw be the horizontal width of each transmitting portion 342 of the mask pattern 341, Hm be the horizontal pitch to the neighboring transmitting portion, Ph be the pixel width of the display device 310, and E be the spacing between the right and left eyes of the observer. Then, these parameters are set to satisfy:

$$2 \times E/Hm = Lw1/Lw2 \quad (1)$$

$$Lw1/(Lw1+Lw2) = 2 \times Ph/Hm \quad (2)$$

$$2 \times Hmw = Hm \quad (3)$$

Figure 47:
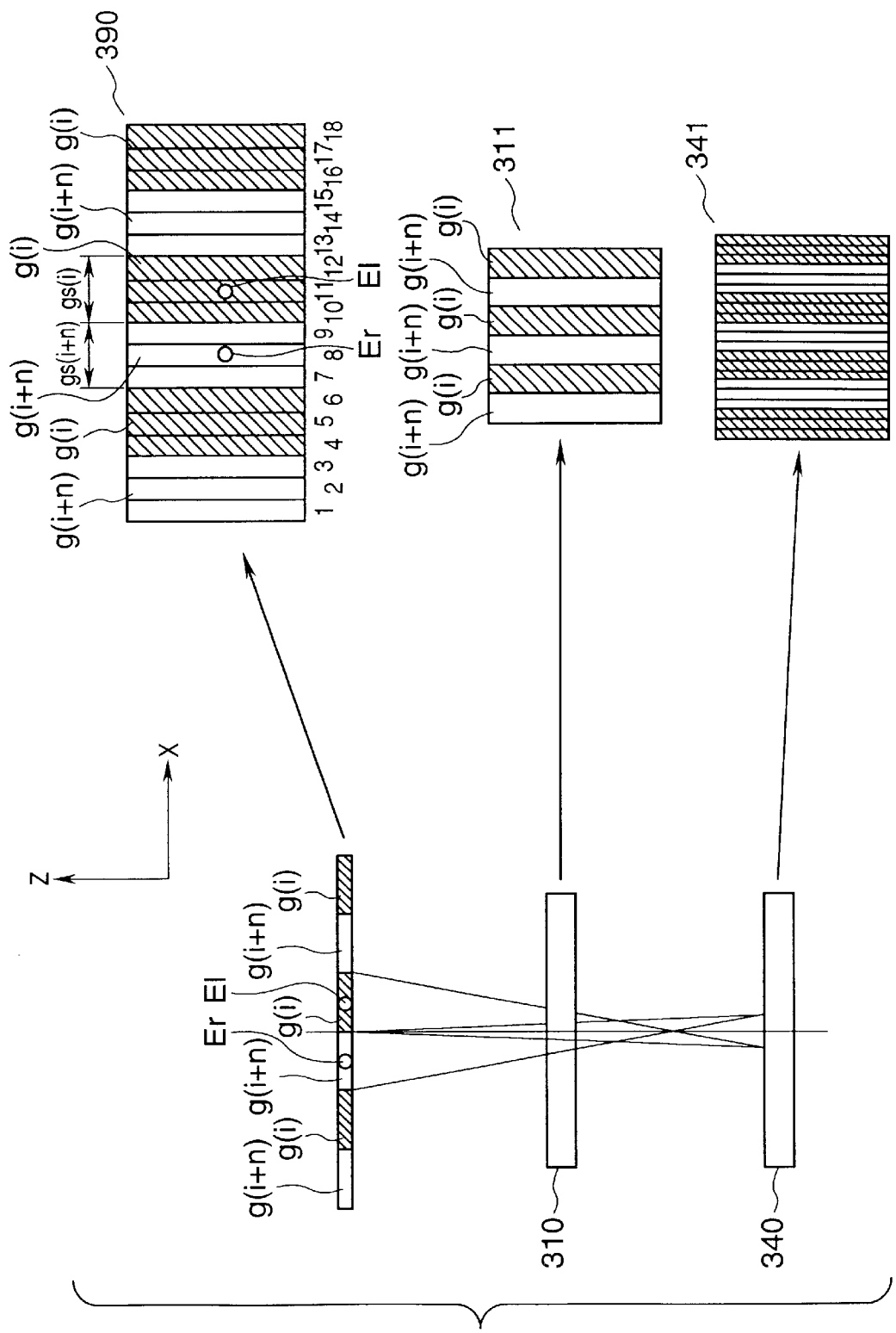
FIG. 47 is an explanatory view of the display method of a synthesized disparity image and mask pattern according to the eighth embodiment of the present invention.
Figure 48:
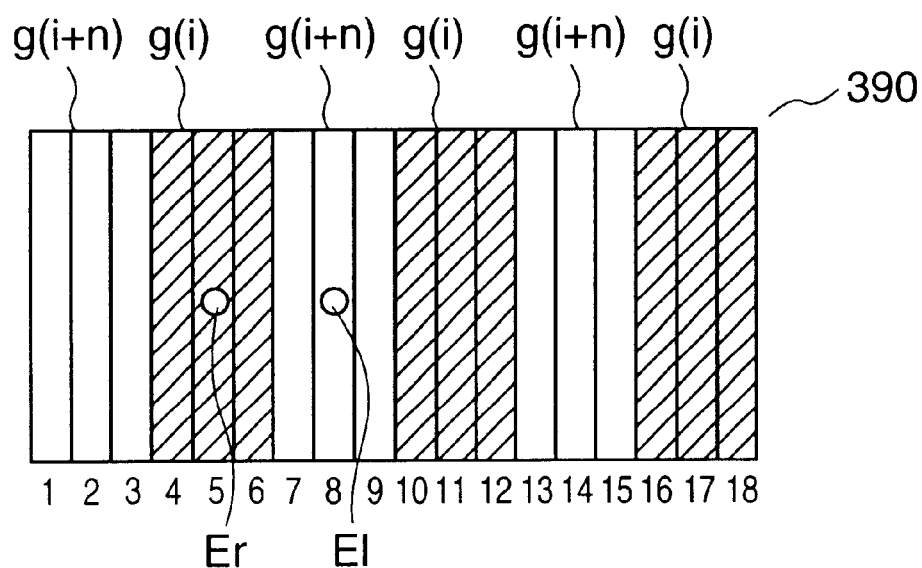
FIG. 48 is an explanatory view of the display method of a synthesized disparity image and mask pattern according to the eighth embodiment of the present invention.
Figure 49:
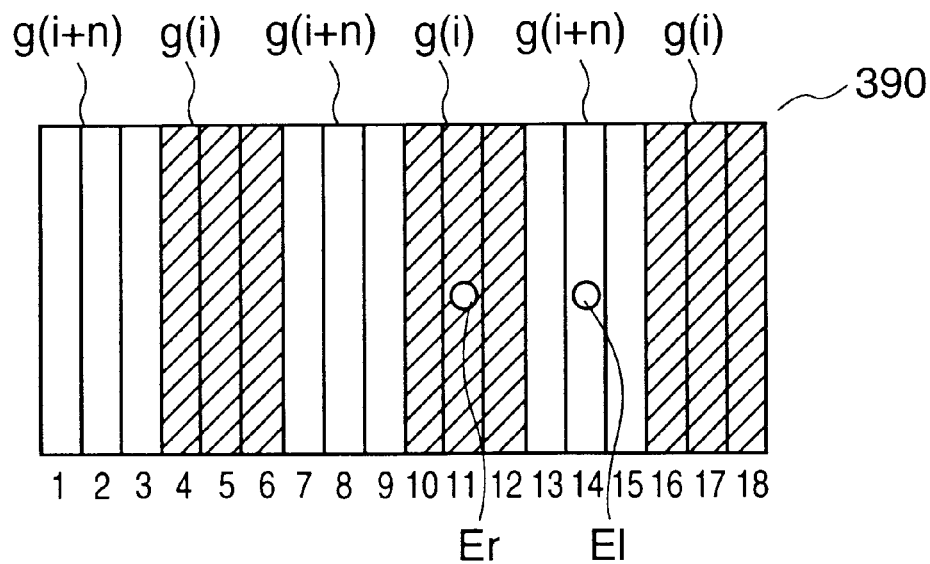
FIG. 49 is an explanatory view of the display method of a synthesized disparity image and mask pattern according to the eighth embodiment of the present invention.

FIGS. 47 to 49 are explanatory views illustrating stereovision states.

Referring to FIG. 47, the left drawing illustrates principal part of the horizontal section (X-Z section) of the display, and the right drawing illustrates the mask pattern 341 of the optical modulator 340, a synthesized disparity image 311 displayed on the display device 310, and an irradiated disparity image 390 formed at the observer position. The irradiated disparity image 390 consists of disparity images g(i) and g(i+n). In the state shown in FIG. 47, the right and left eyes Er and El of the observer are located at the positions of disparity images g(i+n) and g(i).

When the observer has moved from this state to the left, i.e., to the state shown in FIG. 48 or to the right, i.e., to the state shown in FIG. 49, i.e., when disparity images g(i) and g(i+n) are respectively observed by the right and left eyes, an image in reversed stereo is produced, and normal stereoscopic observation is disabled.

A so-called tracking display function which always allows the observer to observe a normal stereoscopic image without switching to reversed stereo even when the viewpoint position of the observer has changed, and allows the observer to observe a stereoscopic image whose viewpoint changes in correspondence with movement of the observer will be explained below with reference to FIGS. 50 to 53.

In the following description, a case of n=3 will be explained for the sake of simplicity. The viewpoint information to be used is detected by the method described in the sixth embodiment.

FIG. 50 illustrates the same state as that in FIG. 47. In this state, the right and left eyes respectively observe disparity images g(i+3) and g(i), as described above, and an image is displayed in normal stereo.

When the observer has moved from a state wherein the right and left eyes are respectively located at positions 11 and 8 of the irradiated disparity image 390, e.g., when the right and left eyes fall within left neighboring regions 10 and 7 of three partial regions, as shown in FIG. 51, images g(i+4) and g(i+1) are displayed on lines where the disparity images g(i+3) and g(i) were displayed as the synthesized disparity image 311 on the display, and the transmitting portions 342 of the mask pattern 341 are moved by one pixel to the right, as shown in FIG. 51. In this manner, the disparity images g(i+4) and g(i+1) are displayed on the irradiated disparity image 390, as shown in FIG. 51.

With this control, the observer sees the images g(i+4) and g(i+1) by the right and left images, i.e., can observe an image whose viewpoint has changed in normal stereo.

On the other hand, when the observer has moved to the right and the right and left eyes are located at positions 12 and 9 of the irradiated disparity image 390, as shown in FIG. 52, images (i+2) and g(i−1) are displayed as the synthesized disparity image 311 on the display, and the transmitting portions of the mask pattern 341 are moved by one pixel to the left, thus displaying images g(i+2) and g(i−1) at the corresponding positions of the irradiated disparity image 390, as shown in FIG. 52. When the observer has moved further to the right, as shown in FIG. 53, images g(i+1) and g(i−2) are displayed as the synthesized disparity image 311, and the mask pattern 341 is switched to the illustrated state, thus displaying the disparity images g(i+1) and g(i−2) at the illustrated positions of the irradiated disparity image 390. The same control is made in correspondence with the right and left movements of the observer.

As described above, since a large number of disparity images are used, and the synthesized disparity image to be displayed on the display, and the mask pattern are switched and displayed in correspondence with the viewpoint, stereoscopic observation that allows tracking display without switching to reversed stereo can be achieved.

In the above description, the number of disparity images to be displayed at the same time is 2, and each of the transmitting and intercepting portions of the mask pattern consists of three pixels. However, even when three or more disparity images are used and each of the transmitting and intercepting portions consists of four or more pixels, the same function can be accomplished by appropriately setting the apparatus arrangement and control method.

Ninth Embodiment

The ninth embodiment improves the sixth to eighth embodiments to make the stereoscopic image display apparatus of the present invention easier to use.

The ninth embodiment will be explained below with the aid of FIGS. 54 to 60. The same reference numerals denote parts having the same functions as those in the sixth to eighth embodiments, and a detailed description thereof will be omitted. The differences from the sixth to eighth embodiments will be mainly explained.

Figure 54:
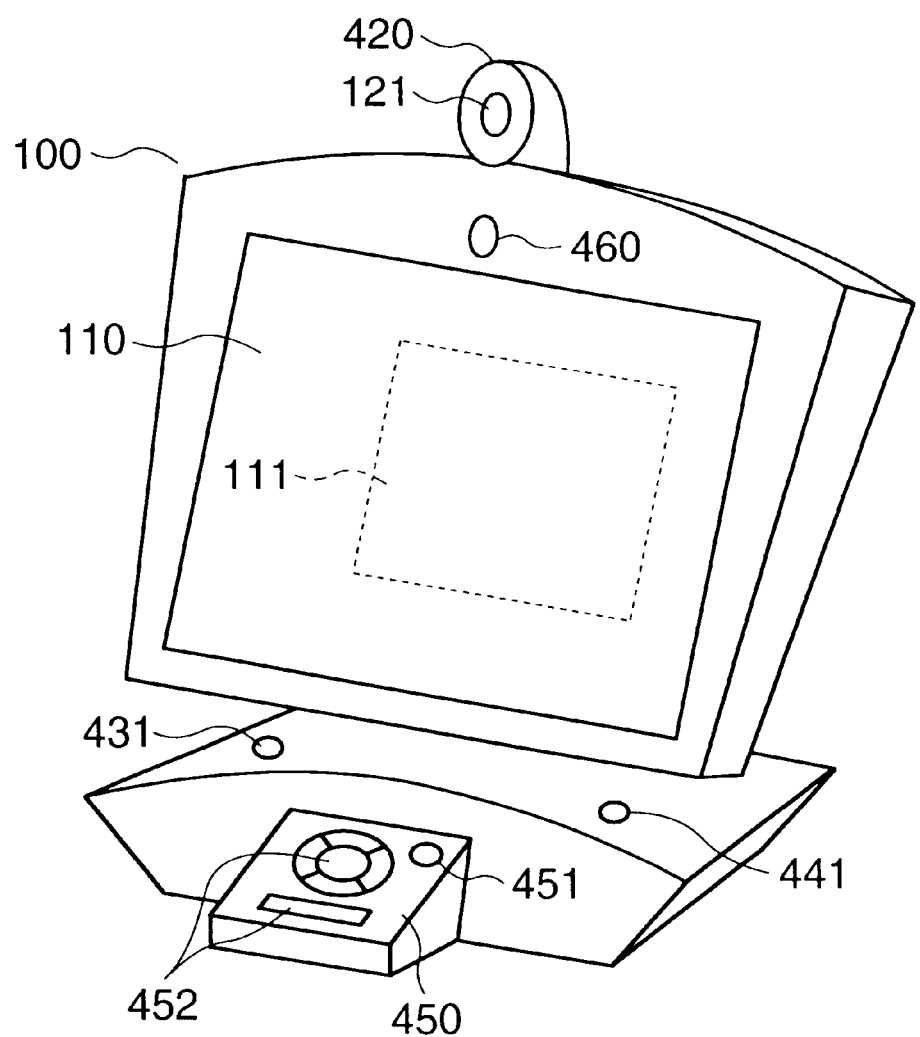
FIG. 54 is a perspective view showing the outer appearance of the ninth embodiment of the present invention.

FIG. 54 shows the outer appearance of the ninth embodiment.

The outer appearance of this embodiment is different from that of the sixth embodiment in that a viewpoint detection apparatus 420 is attached to the upper portion of a display, and the apparatus of this embodiment has selection switches 431 and 441 for switching electrical signals (to be described later), a camera operation means 450 for manually operating the function of a video camera 121 of the viewpoint detection apparatus 420, and an alarm means 460 for generating an alarm to the observer when the observer is located within a stereoscopic observation impossible region or viewpoint detection by the viewpoint detection apparatus 420 is disabled for some reason.

The camera operation means 450 has a save switch 451 for recording an image sensed by the camera, and camera operation buttons 452 for zooming, panning, and tilting the camera.

Figure 55:
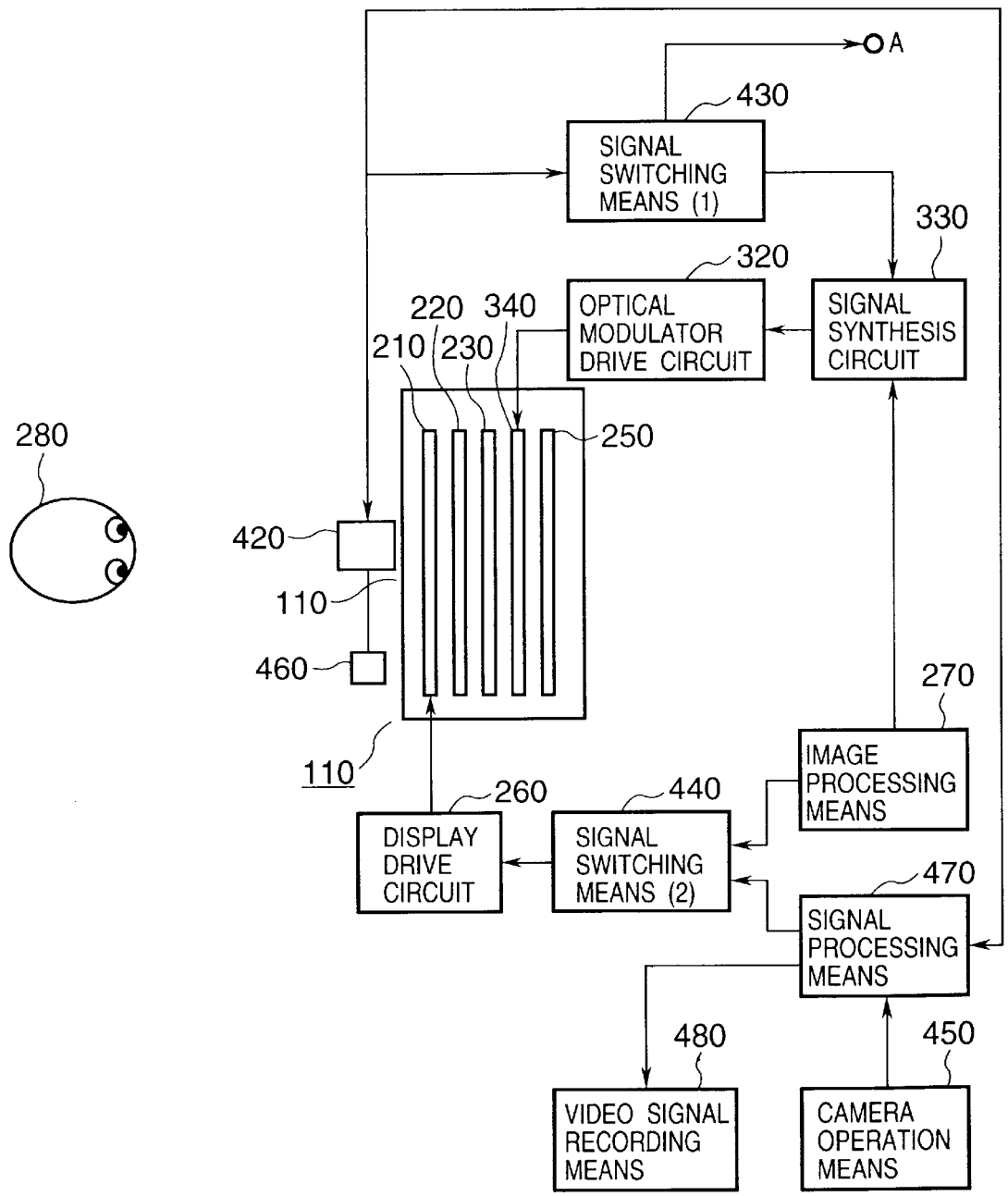
FIG. 55 is a system block diagram of the ninth embodiment of the present invention.

FIG. 55 is a system block diagram of the ninth embodiment.

The differences from the block diagram shown in FIG. 14 of the sixth embodiment are that signal switching means (1) 430 and (2) 440 respectively including the selection switches 431 and 441 shown in FIG. 54 as their building elements, the camera operation means 450, a signal processing means 470 for processing a video signal from the viewpoint detection apparatus 420 and a video signal recording means 480 for recording the processed video signal, and the alarm means 460 operated in response to information from the viewpoint detection apparatus 420 are added.

The viewpoint detection apparatus 420 has the same system as that shown in the system block diagram shown in FIG. 14 of the sixth embodiment. In the ninth embodiment, however, the viewpoint detection apparatus 420 outputs a sensed video information signal together with a viewpoint information signal, and can also input/output information for operating the video camera 121 that constructs the viewpoint detection apparatus 420.

The operations of the respective means will be explained below.

When the observer of the display unit 110 operates the signal selection switch (1) 431 upon using the display, a video signal from the viewpoint detection apparatus 420 and a camera operation signal such as a zoom, pan, tilt signal or the like are output to an external terminal A shown in FIG. 55.

Using these video and operation signals, information can be exchanged with a remote place by a known means (not shown), and the video camera 121 that constructs the viewpoint detection apparatus 420 serves as a TV meeting video camera or monitor camera.

Therefore, in is embodiment, the viewpoint detection apparatus 420 is attached to the upper portion of the display, can sense images in broad application ranges such as those for a TV meeting, monitoring, and the like, and allows remote camera control. The signal selection switch (2) 441 is used for generating eye templates using an image obtained by sensing the observer himself or herself, as described in the sixth embodiment.

Upon operation of the signal selection switch (2) 441, the connection of the display drive circuit 260 is switched from the normal image processing means 270 to the signal processing means 470, and the display 210 displays the signal processing result of the signal processing means 470.

The signal processing means 470 receives a video signal sensed by the video camera 121, and that video signal is displayed on the display 210 upon operation of the signal selection switch (2) 441.

At the same time, markers corresponding to the two eyes of the observer are superimposed at nearly the center of the display 210 by the signal processing means 470.

Also, camera operations such as zooming, panning, tilting, and the like of the video camera 121 of the viewpoint detection apparatus 420 are switched to manual by an internal interlocking switch of the signal processing means 470, which is interlocked with the signal selection switch (2) 441, and the video camera 121 can be controlled via the signal processing means 470 by operating the camera operation means 450.

Figure 56:
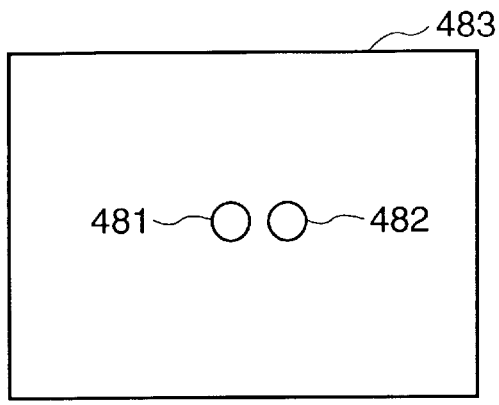
FIG. 56 is an explanatory view of superimposed markers according to the ninth embodiment of the present invention.

FIG. 56 is an explanatory view for explaining the markers to be superimposed on the display 210.

Referring to FIG. 56, reference numeral 483 denotes a display screen of the display; and 481 and 482, for example, circular markers corresponding to the two eyes of the observer.

The size of each of the two markers 481 and 482 is set to be equal to the size of the eye of the observer, a surrounding portion including the eye, or a building component of the eye such as the iris of the eye or the like when the observer observes the display 210 at a prescribed zoom ratio and at a standard position, and the spacing between the two markers is set to be equal to the standard distance between the two eyes of the image of the observer.

In general, when the observer sees the display 210, since he or she is normally located at a position deviating from the standard observation position, the pre-set marker positions do not match the image positions of the two eyes. Hence, the observer operates the camera operation buttons 452 provided to the camera operation means 450, thus adjusting the two eye positions to the marker positions.

Figure 57:
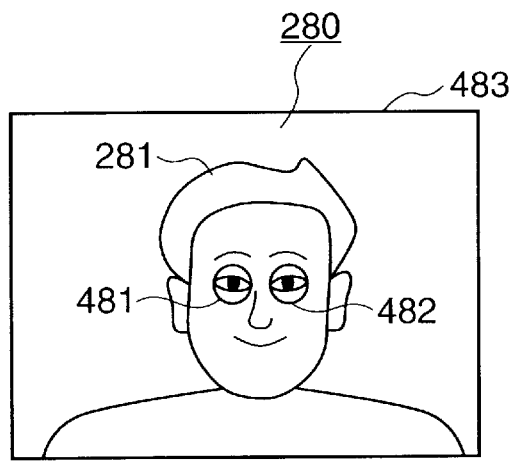
FIG. 57 is an explanatory view of superimposed markers and a sensed image according to the ninth embodiment of the present invention.

FIG. 57 shows the display screen 483 in a state wherein the markers 481 and 482 are superposed on the image of the observer 280, and the eyes of the image 281 of the observer 280 match the markers 481 and 482.

Figure 58:
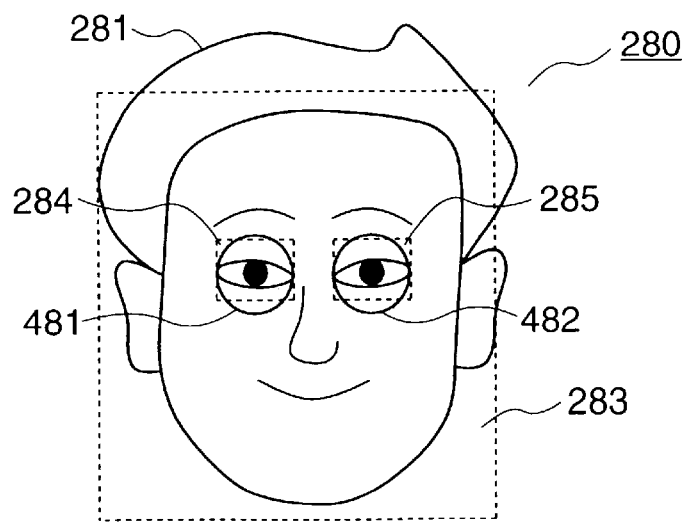
FIG. 58 is an enlarged explanatory view of superimposed markers and a sensed image according to the ninth embodiment of the present invention.

FIG. 58 is an enlarged view of FIG. 57, and illustrates the eye templates 284 and 285 and face region 283 described in the sixth embodiment as a reference.

When the observer confirms that his or her eyes match the markers 481 and 482, and operates the save button 451 provided to the camera operation means 450, the eye images of the observer are recorded in the video recording means 480.

Using the recorded images as the templates 284 and 285, viewpoint information is obtained by the method described in the sixth embodiment.

When the images of the observer 280 himself or herself are used as templates, position information can be detected with higher precision than using general images as templates.

In this embodiment, the display 210 displays the face image of the observer. Alternatively, a dedicated monitor may be used.

The operation of the alarm means 460 shown in FIG. 54 will be described below with reference to FIGS. 59 and 60.

Figure 59:
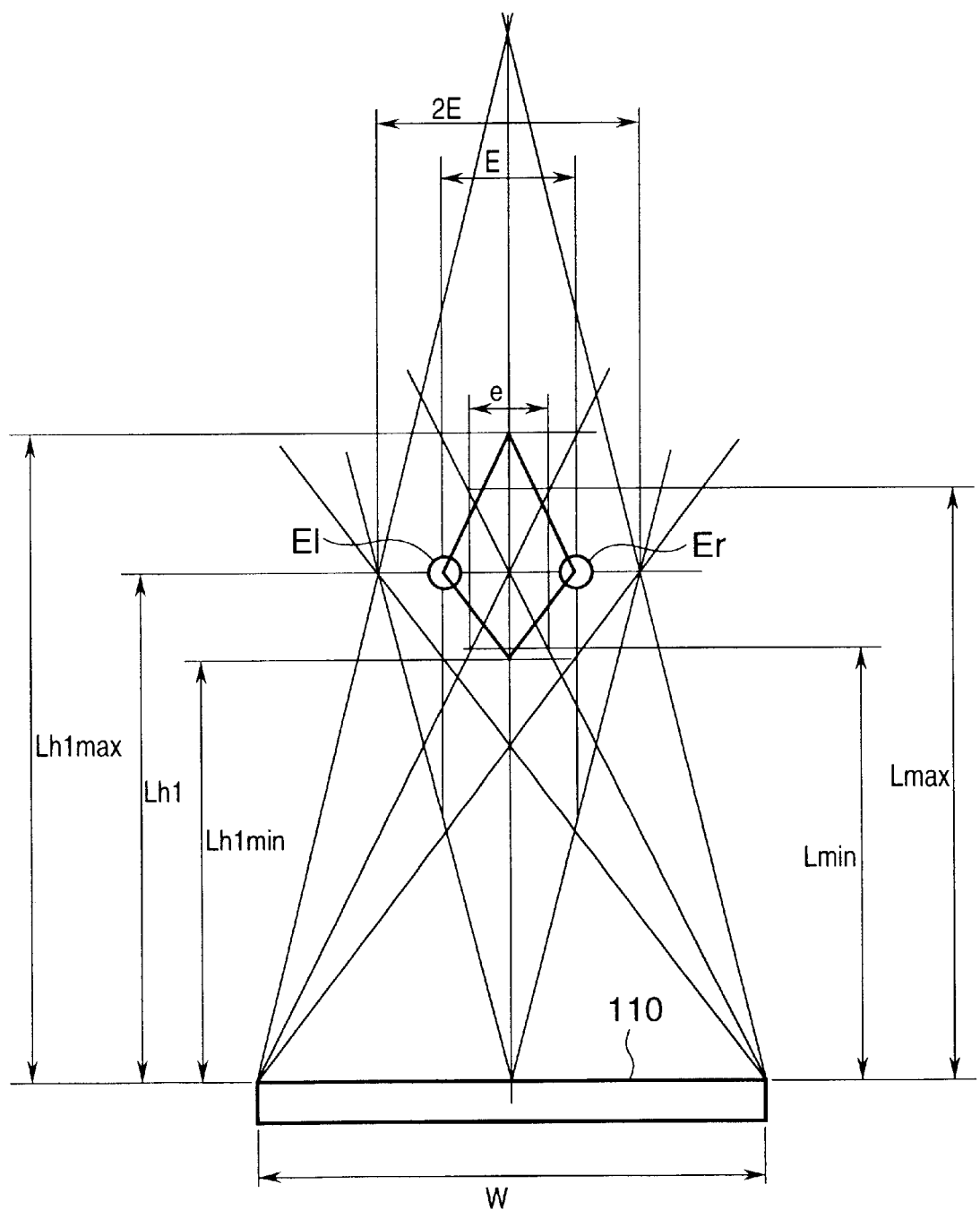
FIG. 59 is an explanatory view of a stereovision range according to the ninth embodiment of the present invention.

FIG. 59 is a top view illustrating a state wherein the observer is observing the display unit 110, i.e., a horizontal sectional view of the display unit 110 and an explanatory view for explaining a normal stereoscopic observation range of the ninth embodiment.

Note that FIG. 59 illustrates the case wherein the operation of the viewpoint detection apparatus 420 is temporarily canceled to disable the stereovision tracking function for the sake of description.

Referring to FIG. 59, reference numeral 110 denotes a display unit; and Er and El, the right and left eyes of the observer at a standard observation position Lh1. Reference symbol E denotes a standard distance between the eyes.

Since the display unit 110 has a width W and has the same internal arrangement as that of the sixth embodiment, when the observer has a distance between the eyes, which is equal to the standard distance between the eyes, the observer can normally observe a stereoscopic image if his or her viewpoint is present within the bold rectangular region in FIG. 59. In a direction perpendicular to the surface of the display unit 110 (in the back-and-forth direction of the observer), stereoscopic observation is disabled when the distance between the observer and display falls outside the range from Lh1max to Lh1min shown in FIG. 59.

When the observer has a distance e between the eyes or the horizontal component of the distance between the eyes equals e upon tilting the face, Lh1max and Lh1min respectively become Lmax and Lmin, as shown in FIG. 59.

When the viewpoint detection apparatus 420 is activated to enable the stereovision tracking function, the stereovision range is broadened within a range that allows viewpoint detection and stereovision tracking control in a direction parallel to the display surface (in the right-and-left direction of the observer), but it remains unchanged in the direction perpendicular to the display surface (back-and-forth direction). Hence, a normal stereo image cannot be formed outside the range from Lmax to Lmin.

Figure 60:
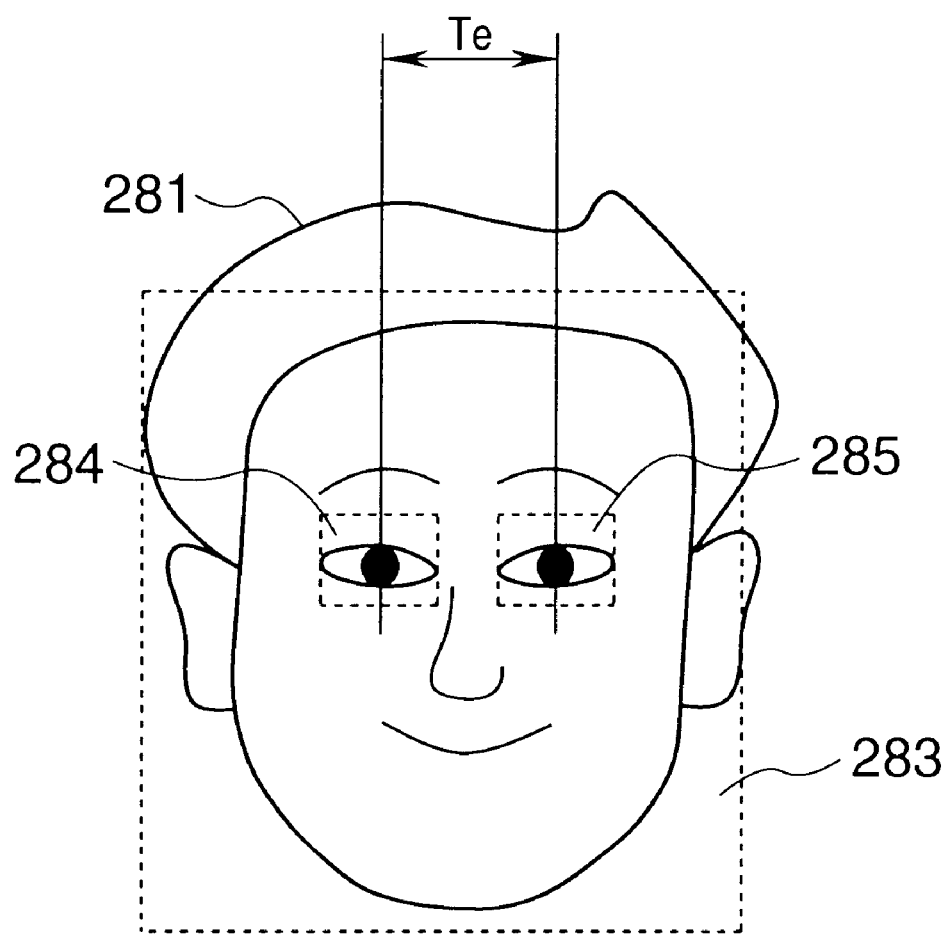
FIG. 60 is an explanatory view of the detected inter-eye distance according to the ninth embodiment of the present invention.

FIG. 60 shows an image sensed by the viewpoint detection apparatus 420 during display operation of the ninth embodiment corresponding to FIG. 32 in the sixth embodiment.

Even when the observer moves back or forth, the size of the face image stays constant by the automatic zoom mechanism. A real space distance e of a horizontal component Te of the spacing between the two eyes of the templates detected at that time is calculated based on the horizontal component Te and zoom, pan, and tilt information of the image sensing camera, and Lmax and Lmin are calculated from the calculated value. Then, the alarm means 460 is operated to generate an alarm informing the observer that no stereovision is available outside the range from Lmax to Lmin.

Also, when face region detection or eye detection using templates described in e seventh embodiment is disabled for some reason, the alarm means 460 is also operated.

In this embodiment, an independent alarm means is provided. Alternatively, an alarm message may be displayed on the display unit 110.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium (recording medium), which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations implemented by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, the storage medium stores a program code corresponding to the aforementioned flow chart (shown in one of FIG. 2, FIG. 6, and FIGS. 8 to 10).

To restate, according to the present invention, a viewpoint position detection apparatus for detecting the viewpoint position of the observer and outputting the viewpoint position information uses an infrared image upon generating templates first, and then executes pattern matching of a visible image. Hence, the observer need not be continuously irradiated with infrared light, and the fear of adverse influences on the observer can be minimized. In addition, since templates can be generated using high-precision position detection information from an infrared image within a short period of time, the load on template generation can be reduced, and high-precision templates can be generated.

Since templates are periodically updated when pattern matching of a visible image has failed, e.g., when the observer has changed to another person or has moved largely, templates with high precision can be maintained, and as a result, high-precision viewpoint position information can be stably obtained.

According to the present invention, a stereoscopic image display apparatus which has the following effects can be achieved:

(1) Since the apparatus has a detection unit for detecting the viewpoint with high precision even when the observer has moved and his or her viewpoint has changed, the observer can always observe a normal stereoscopic image.

(2) Even when disparity images to be simultaneously displayed consist of two disparity images corresponding to the right and left eyes, and when the observer has moved and his or her viewpoint has changed, the observer can always observe a normal stereoscopic image without switching to reversed stereo, and can observe an image in correspondence with his or her viewpoint.

(3) The viewpoint detection video camera can be used in other applications such as a TV meeting video camera, and the like, and when the observer is located at a position falling outside the observation range, an alarm message is displayed, thus improving observer's convenience.

As many apparently widely different embodiments of the present invention can be made without departing from the spirit and scope thereof, it is to be understood that the invention is not limited to the specific embodiments thereof except as defined in the appended claims.

What is claimed is:

1. A viewpoint position detection apparatus for detecting a viewpoint position of a person to be measured, and outputting viewpoint position information, comprising:

infrared image capturing means for capturing an infrared image of the person to be measured;

visible image capturing means for capturing a visible image of the person to be measured;

detection means for detecting a pupil position of the person to be measured from the infrared image captured by said infrared image capturing means;

template generation means for generating a template for pattern matching with the visible image captured by said visible image capturing means using the pupil position detected from the infrared image by said detection means; and matching means for detecting a viewpoint position of the person to be measured by pattern matching with the visible image captured by said visible image capturing means using the template generated by said template generation means, and outputting a result as the viewpoint position information.

2. A viewpoint position detection apparatus for detecting a viewpoint position of a person to be measured, and outputting viewpoint position information, comprising:

infrared image capturing means for capturing an infrared image of the person to be measured;

visible image capturing means for capturing a visible image of the person to be measured;

detection means for detecting a pupil position of the person to be measured from the infrared image captured by said infrared image capturing means;

template generation means for generating a template for pattern matching with the visible image captured by said visible image capturing means using the pupil position detected from the infrared image by said detection means;

matching means for detecting a viewpoint position of the person to be measured by pattern matching with the visible image captured by said visible image capturing means using the template generated by said template generation means, and outputting a detection result as the viewpoint position information; and control means for controlling to generate the template again using said detection means and said template generation means when a predetermined condition is satisfied.

3. The apparatus according to claim 2, wherein said control means evaluates the detection result of said matching means, and when said control means determines that detection has failed a predetermined number of times, said control means controls to generate the template again using said detection means and said template generation means.

4. The apparatus according to claim 2, wherein said control means controls to generate the template again using said detection means or said template generation means at predetermined time intervals.

5. The apparatus according to claim 2, wherein said control means evaluates the detection result of said matching means, and when said control means determines that detection has failed a predetermined number of times and every time a predetermined period of time has elapsed, said control means controls to generate the template again using said detection means and said template generation means.

6. The apparatus according to claim 2, further comprising reception means for receiving an instruction from the person to be measured, and wherein said control means controls to generate the template again using said detection means and said template generation means upon receiving a predetermined instruction via said reception means.

7. The apparatus according to claim 2, wherein said template generation means generates a plurality of templates having different sizes, and said matching means executes pattern matching a plurality of number of times using the plurality of templates in turn.

8. The apparatus according to claim 2, further comprising second template generation means for, when pupil position detection by said detection means has failed a predetermined number of times, generating a template for pattern matching using only the visible image or information obtained from the infrared image, and supplying the generated template to said matching means as the template generated by said template generation means.

9. The apparatus according to claim 8, further comprising reception means for receiving an instruction from the person to be measured, and wherein said control means controls to execute pattern matching using said second template generation means upon receiving a predetermined instruction via said reception means.

10. A viewpoint position detection method for detecting a viewpoint position of a person to be measured, and outputting viewpoint position information comprising:

the infrared image capturing step of capturing an infrared image of the person to be measured;

the visible image capturing step of capturing a visible image of the person to be measured;

the detection step of detecting a pupil position of the person to be measured from the infrared image captured in the infrared image capturing step;

the template generation step of generating a template for pattern matching with the visible image captured in the visible image capturing step using the pupil position detected from the infrared image by said detection step; and the matching step of detecting a viewpoint position of the person to be measured by pattern matching with the visible image captured in the visible image capturing step using the template generated in the template generation step, and outputting a result as the viewpoint position information.

11. A computer readable storage medium storing a method recited in claim 10 as a program that can be executed by a computer.

12. A viewpoint position detection method for detecting a viewpoint position of a person to be measured, and outputting viewpoint position information, comprising:

the infrared image capturing step of capturing an infrared image of the person to be measured;

the visible image capturing step of capturing a visible image of the person to be measured;

the detection step of detecting a pupil position of the person to be measured from the infrared image captured in the infrared image capturing step;

the template generation step of generating a template for pattern matching with the visible image captured in the visible image capturing step using the pupil position detected from the infrared image by said detection step;

the matching step of detecting a viewpoint position of the person to be measured by pattern matching with the visible image captured in the visible image capturing step using the template generated in the template generation step, and outputting a detection result as the viewpoint position information; and the control step of controlling to generate the template again using the detection step and the template generation step when a predetermined condition is satisfied, and repeating the visible image capturing step and the matching step in other cases.

13. The method according to claim 12, further comprising the evaluation step of evaluating the detection result in the matching step, and wherein when it is determined that detection has failed a predetermined number of times, the template is generated again using the detection step and the template generation step.

14. The method according to claim 12, further comprising the time detection step of detecting a predetermined time, and wherein every time the predetermined time is detected in the time detection step, the template is generated again using the detection step and the template generation step.

15. The method according to claim 12, further comprising the evaluation step of evaluating the detection result in the matching step, and the time detection step of detecting a predetermined time, and wherein when it is determined that detection has failed a predetermined number of times, or every time the predetermined time is detected in the time detection step, the template is generated again using the detection step and the template generation step.

16. The method according to claim 12, further comprising the reception step of receiving an instruction from the person to be measured, and wherein the template is generated again using the detection step and the template generation step upon receiving a predetermined instruction in the reception step.

17. The method according to claim 12, wherein the template generation step includes the step of generating a plurality of templates having different sizes, and the matching step includes the step of executing pattern matching a plurality of number of times using the plurality of templates in turn.

18. The method according to claim 12, further comprising the second template generation step of generating a template for pattern matching using only the visible image or information obtained from the infrared image when pupil position detection in the detection step has failed a predetermined number of times, and supplying the generated template to the matching step as the template generated in the template generation step.

19. The method according to claim 18, further comprising the reception step of receiving an instruction from the person to be measured, and wherein pattern matching is executed using the second template generation step upon receiving a predetermined instruction in the reception step.

20. A computer readable storage medium storing a method recited in claim 12 as a program that can be executed by a computer.

21. A stereoscopic image display apparatus for allowing an observer to stereoscopically observe disparity images using a viewpoint detection apparatus for detecting a viewpoint of the observer and a display device for displaying disparity images corresponding to right and left eyes fo the observer while controlling the disparity image to track viewpoint information, wherein said viewpoint detection apparatus is a viewpoint detection apparatus recited in any one of claims 1 to 9.

22. The apparatus according to claim 21, wherein at least said visible image capturing means has a video camera, and further comprising camera control means for controlling said video camera.

23. The apparatus according to claim 22, further comprising signal switching means for externally outputting a video signal from said visible image capturing means and a zoom/pan/tilt control signal from said camera control means.

24. The apparatus according to claim 22, further comprising a video processing means that identifies predetermined color information from the visible image of the observer.

25. The apparatus according to claim 24, wherein the predetermined color information is a face tone of the observer or a standard flesh tone.

26. The apparatus according to claim 24, wherein said video processing means controls said video camera to shorten its focal length when a region corresponding to the color is not detected from the visible image, and to set the focal length to a predetermined focal length when the region is detected.

27. The apparatus according to claim 24, further comprising alarm means for generating an alarm to the observer when said video processing means identifies the predetermined color information, and when a region corresponding to the color is not detected from the captured video information.

28. The apparatus according to claim 24, wherein said video processing means further identifies a specific pattern and wherein said camera control means controls said video camera to track said specific pattern.

29. The apparatus according to claim 21, further comprising switching means for displaying face image information of the observer captured by said visible image capturing means on said display device.

30. The apparatus according to claim 29, further comprising operation means for allowing the observer to manually set the face image of the observer displayed on the display device at a predetermined position and a size on a display screen.

* * * * *

UNITED STATES PATENT AND TRADEMARK OFFICE
CERTIFICATE OF CORRECTION

PATENT NO. : 6,757,422 B1
DATED : June 29, 2004
INVENTOR(S) : Masahiro Suzuki et al.

It is certified that error appears in the above-identified patent and that said Letters Patent is hereby corrected as shown below:

Column 33,
Line 6, "is" should read -- this --.

Column 39,
Line 3, "fo" should read -- of --.

Signed and Sealed this

Twenty-second Day of March, 2005

JON W. DUDAS
*Director of the United States Patent and Trademark Office*